United States Patent
MolavianJazi et al.

(10) Patent No.: US 11,589,396 B2
(45) Date of Patent: Feb. 21, 2023

(54) REPETITION OF PRACH PREAMBLE TRANSMISSION FOR UES

(71) Applicant: Samsung Electronics Co., Ltd., Suwon-si (KR)

(72) Inventors: Ebrahim MolavianJazi, Santa Clara, CA (US); Aris Papasakellariou, Houston, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/658,994

(22) Filed: Apr. 12, 2022

(65) Prior Publication Data

US 2022/0256612 A1 Aug. 11, 2022

Related U.S. Application Data

(63) Continuation of application No. 16/947,575, filed on Aug. 6, 2020, now Pat. No. 11,310,836.

(Continued)

(51) Int. Cl.
*H04W 74/08* (2009.01)
*H04L 1/08* (2006.01)
(Continued)

(52) U.S. Cl.
CPC ...... *H04W 74/0833* (2013.01); *H04B 7/0695* (2013.01); *H04B 17/318* (2015.01);
(Continued)

(58) Field of Classification Search
CPC ............ H04W 74/0833; H04W 24/08; H04W 56/001; H04W 72/042; H04B 7/0695;
(Continued)

(56) References Cited

U.S. PATENT DOCUMENTS

2015/0117233 A1 4/2015 Wong et al.
2016/0165640 A1 6/2016 Yang et al.
(Continued)

FOREIGN PATENT DOCUMENTS

WO 2021029711 A1 2/2021

OTHER PUBLICATIONS

LG Electronics, "Discussion on multi-beam based operations and enhancements", 3GPP TSG RAN WG1 Meeting #98, Prague, CZ, Aug. 26-30, 2019, R1-1908700, 13 pages.

(Continued)

*Primary Examiner* — Joshua Kading

(57) ABSTRACT

Apparatuses and methods for physical random access channel (PRACH) preamble transmissions or receptions. A method of a UE includes receiving a physical downlink shared channel (PDSCH) that provides a system information block (SIB). The SIB includes an indication for (i) a first transmission configuration indication (TCI) state that provides a first set of quasi-collocation (QCL) properties and (ii) for a second TCI state that provides a second set of QCL properties. The method further includes transmitting a first PRACH according to the first TCI state and a second PRACH according to the second TCI state.

20 Claims, 22 Drawing Sheets

Related U.S. Application Data

(60) Provisional application No. 62/969,755, filed on Feb. 4, 2020, provisional application No. 62/969,760, filed on Feb. 4, 2020, provisional application No. 62/895,543, filed on Sep. 4, 2019, provisional application No. 62/888,779, filed on Aug. 19, 2019.

(51) Int. Cl.

| | |
|---|---|
| *H04B 17/318* | (2015.01) |
| *H04W 72/04* | (2009.01) |
| *H04L 1/18* | (2006.01) |
| *H04B 7/06* | (2006.01) |
| *H04W 24/08* | (2009.01) |
| *H04W 56/00* | (2009.01) |
| *H04L 5/00* | (2006.01) |
| *H04L 1/1867* | (2023.01) |

(52) U.S. Cl.
CPC ............... *H04L 1/08* (2013.01); *H04L 1/189* (2013.01); *H04L 5/0048* (2013.01); *H04L 5/0053* (2013.01); *H04L 5/0058* (2013.01); *H04L 5/0094* (2013.01); *H04W 24/08* (2013.01); *H04W 56/001* (2013.01); *H04W 72/042* (2013.01); *H04L 5/0007* (2013.01); *H04L 5/0023* (2013.01)

(58) Field of Classification Search
CPC ......... H04B 7/088; H04B 17/318; H04L 1/08; H04L 1/189; H04L 5/0007; H04L 5/0023; H04L 5/0048; H04L 5/005; H04L 5/0051; H04L 5/0053; H04L 5/0058; H04L 5/0091; H04L 5/0092; H04L 5/0094
See application file for complete search history.

(56) References Cited

U.S. PATENT DOCUMENTS

| | | | |
|---|---|---|---|
| 2016/0353440 A1* | 12/2016 | Lee | .................. H04W 52/48 |
| 2017/0105127 A1 | 4/2017 | Xiong et al. | |
| 2019/0104503 A1 | 4/2019 | Niu et al. | |
| 2019/0387546 A1* | 12/2019 | Li | .................. H04L 27/26025 |
| 2020/0120584 A1 | 4/2020 | Yi et al. | |
| 2020/0221506 A1* | 7/2020 | Jeon | .................. H04W 74/0833 |
| 2020/0351892 A1 | 11/2020 | Yi et al. | |
| 2021/0028843 A1 | 1/2021 | Zhou et al. | |
| 2022/0210841 A1* | 6/2022 | Lin | .................. H04W 72/1263 |
| 2022/0240326 A1* | 7/2022 | Rune | .................. H04W 74/0866 |

OTHER PUBLICATIONS

International Search Report of the International Searching Authority dated Nov. 25, 2020 in connection with International Application No. PCT/KR2020/010987, 3 pages.

"5G; NR; Physical channels and modulation (3GPP TS 38.211 version 15.6.0 Release 15)", ETSI TS 138 211 V15.6.0, Jul. 2019, 100 pages.

"5G; NR; Multiplexing and channel coding (3GPP TS 38.212 version 15.6.0 Release 15)", ETSI TS 138 212 V15.6.0, Jul. 2019, 106 pages.

"5G; NR; Physical layer procedures for control (3GPP TS 38.213 version 15.6.0 Release 15)", ETSI TS 138 213 V15.6.0, Jul. 2019, 110 pages.

"5G; NR; Physical layer procedures for data (3GPP TS 38.214 version 15.6.0 Release 15)", ETSI TS 138 214 V15.6.0, Jul. 2019, 108 pages.

"5G: NR; Medium Access Control (MAC) protocol specification (3GPP TS 38.321 version 15.6.0 Release 15)", ETSI TS 138 321 V15.6.0, Jul. 2019, 80 pages.

"5G; NR; Radio Resource Control (RRC); Protocol specification (3GPP TS 38.331 version 15.6.0 Release 15)", ETSI TS 138 331 V15 6.0, Jul. 2019, 516 pages.

Extended European Search Report dated Jul. 6, 2022 regarding Application No. 20854033.6, 5 pages.

LG Electronics Inc., "Correction on RA resource selection for beam failure recovery", 3GPP TSG-RAN WG2 Meeting #103bis, R2-1818195, Oct. 2018, 6 pages.

Nokia et al., "PRACH CE level selection for feMTC UEs", 3GPP TSG-RAN WG4 Meeting #82, R4-1700922, Feb. 2017, 4 pages.

* cited by examiner

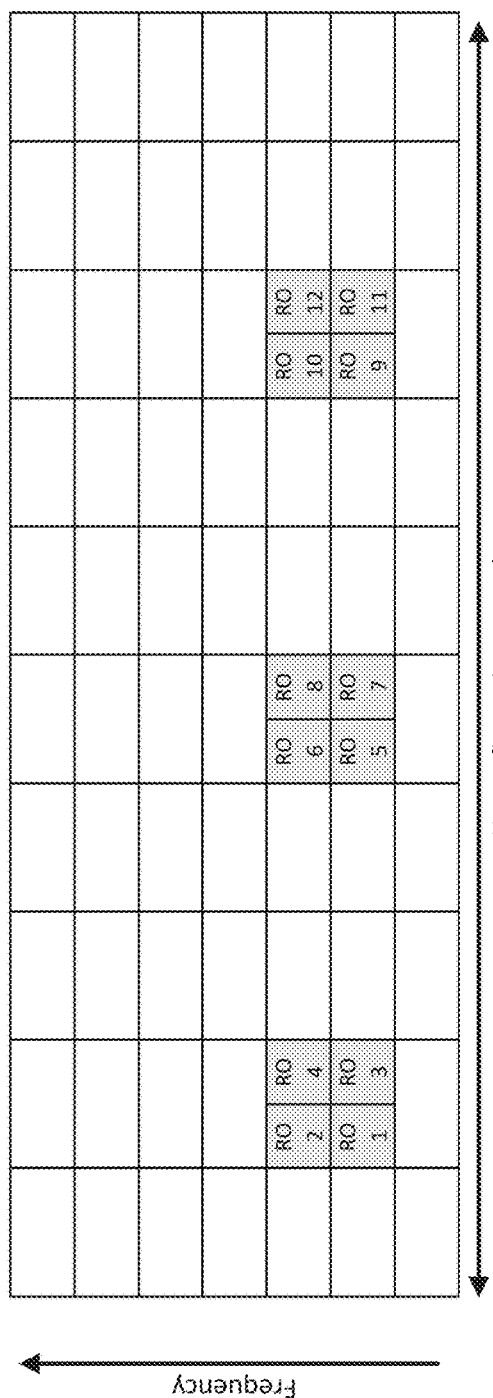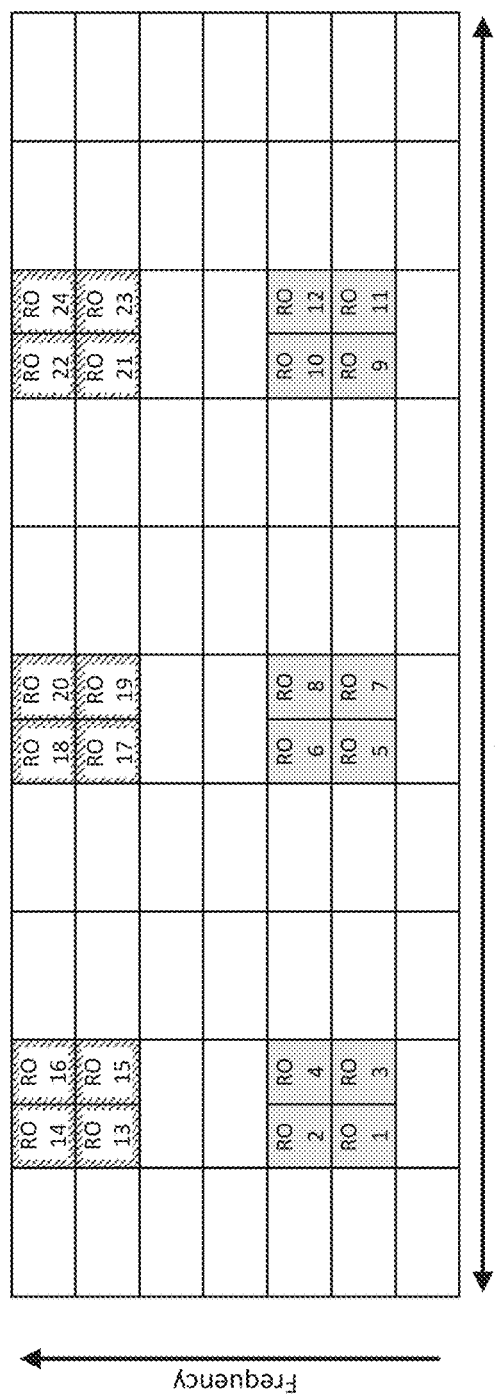

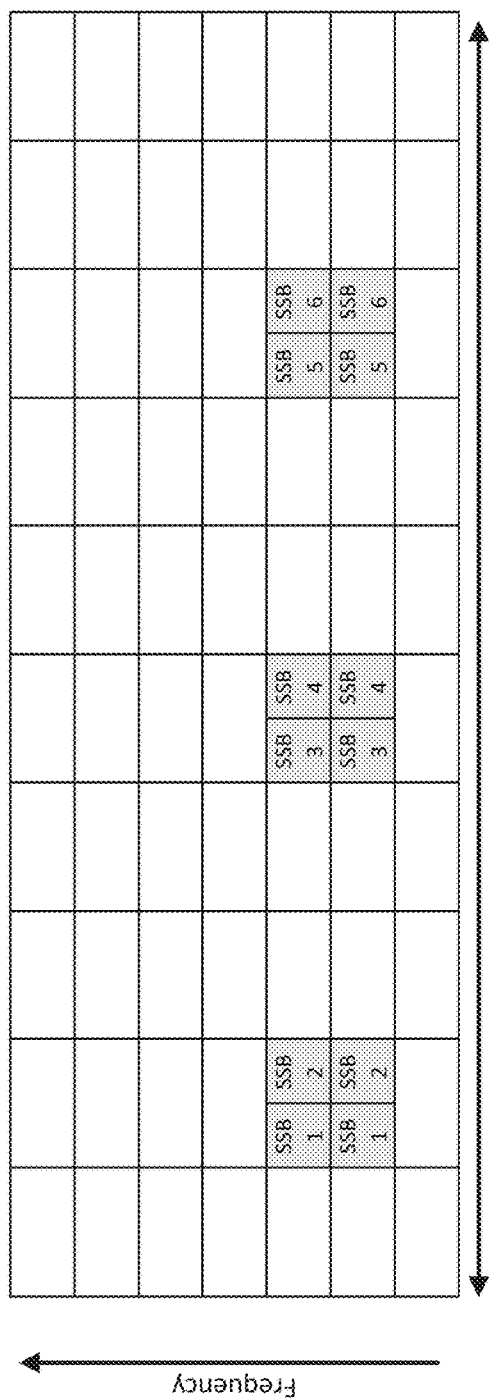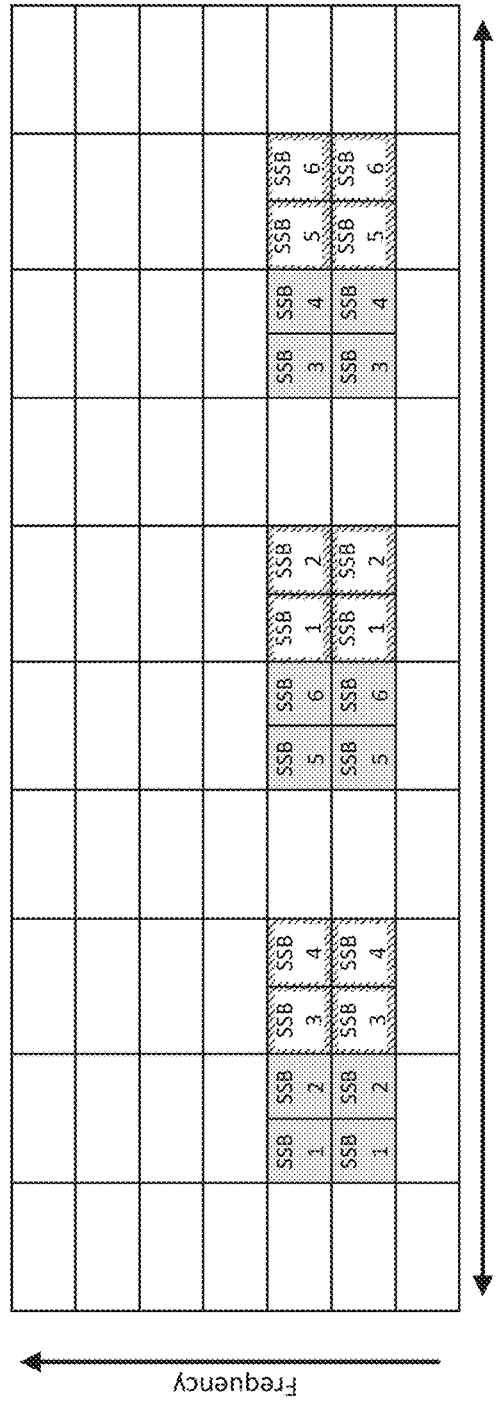

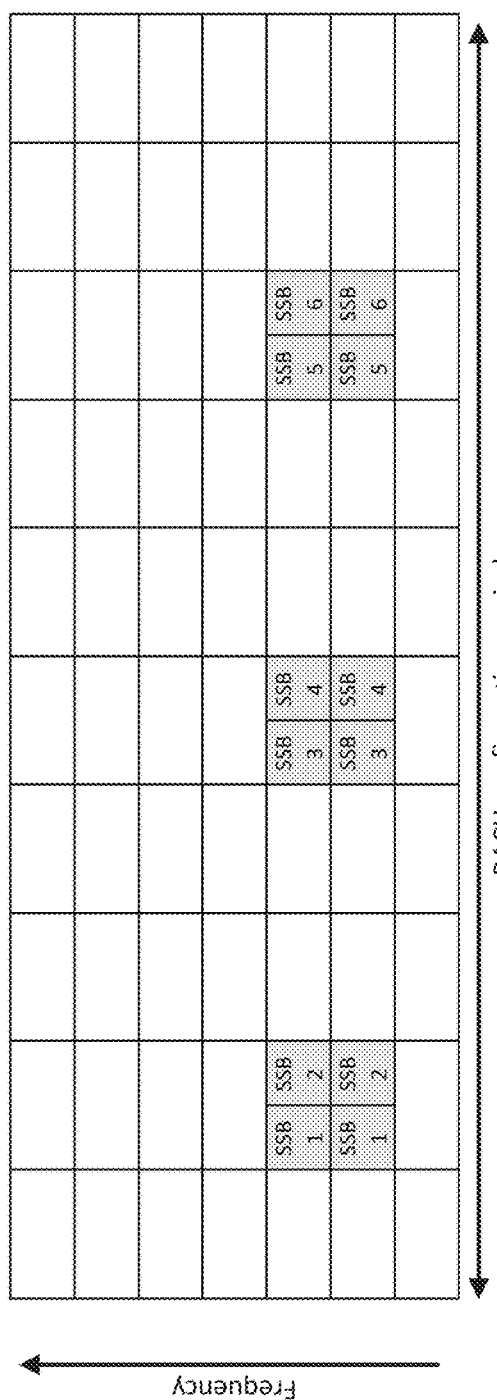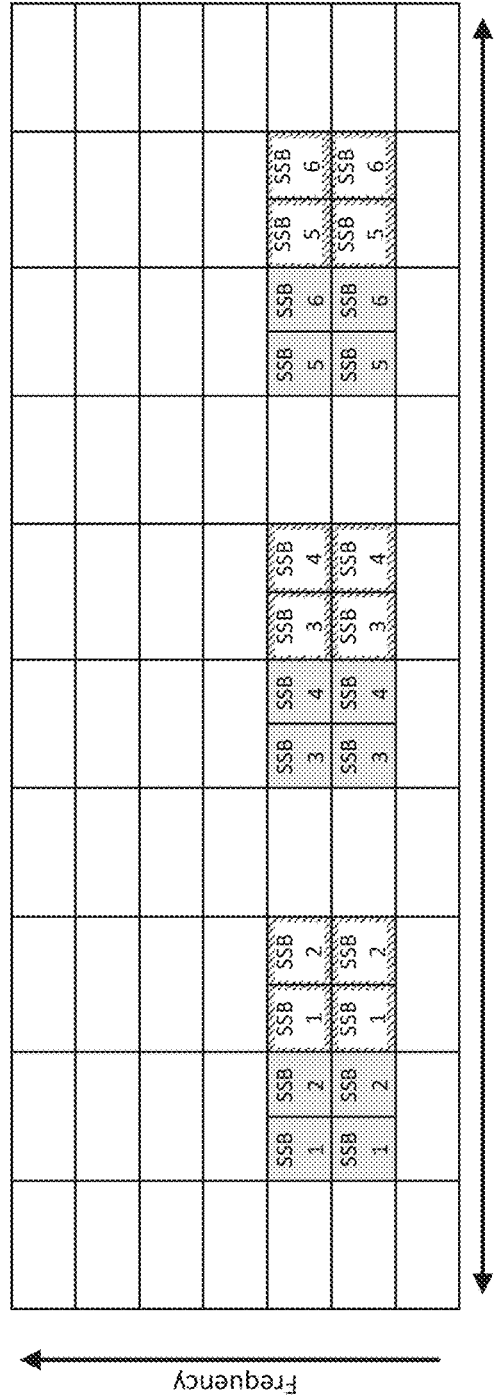

REPETITION OF PRACH PREAMBLE TRANSMISSION FOR UES

CROSS-REFERENCE TO RELATED APPLICATIONS AND CLAIM OF PRIORITY

This application is a continuation of U.S. patent application Ser. No. 16/947,575 filed Aug. 6, 2020, which claims priority to U.S. Provisional Patent Application No. 62/888,779 filed Aug. 19, 2019, U.S. Provisional Patent Application No. 62/895,543 filed Sep. 4, 2019, U.S. Provisional Patent Application No. 62/969,755 filed Feb. 4, 2020, and U.S. Provisional Patent Application No. 62/969,760 filed Feb. 4, 2020, the disclosures of which are incorporated herein by reference in their entireties.

TECHNICAL FIELD

The present disclosure relates to wireless communication systems. More particularly, the present disclosure relates to repetition of physical random access channel (PRACH) preamble transmission for user equipments (UEs) and enhancing transmission of a PRACH preamble for UEs.

BACKGROUND

There is a demand for an improved 5G communication system. The 5G communication system is implemented in higher frequency (mmWave) bands, for example 60 GHz bands, to enable higher data rates. NR-Light UEs can be UEs with a lower, relatively, capability than other UEs. New Radio Interface/Access (NR) light (NR-Light) UEs can face challenges such as low detection/miss probabilities or high collision probabilities due to the reduced capabilities.

SUMMARY

The present disclosure relates to enhancing transmission of a PRACH preamble for UEs.

In one embodiment, a method for a UE is provided. The method includes receiving a physical downlink shared channel (PDSCH) that provides a system information block (SIB). The SIB includes an indication for (i) a first transmission configuration indication (TCI) state that provides a first set of quasi-collocation (QCL) properties and (ii) for a second TCI state that provides a second set of QCL properties. The method further includes transmitting a first PRACH according to the first TCI state and a second PRACH according to the second TCI state.

In another embodiment, a user equipment (UE) is provided. The UE includes a transceiver configured to receive a PDSCH that provides a SIB. The SIB includes an indication for (i) a first transmission configuration indication (TCI) state that provides a first set of quasi-collocation (QCL) properties and (ii) for a second TCI state that provides a second set of QCL properties. The transceiver is further configured to transmit a first PRACH according to the first TCI state and a second PRACH according to the second TCI state.

In yet another embodiment, a base station is provided. The base station includes a transceiver configured to a transceiver configured to transmit a PDSCH that provides a SIB. The SIB includes an indication for (i) a first transmission configuration indication (TCI) state that provides a first set of quasi-collocation (QCL) properties and (ii) for a second TCI state that provides a second set of QCL properties. The transceiver is further configured to receive a first PRACH according to the first TCI state and a second PRACH according to the second TCI state.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate configuration RACH occasions according to various embodiments of the present disclosure;

FIGS. 13A and 13B illustrate configuration RACH occasions according to various embodiments of the present disclosure;

FIGS. 15A and 15B illustrate configuration RACH occasions according to various embodiments of the present disclosure;

DETAILED DESCRIPTION

FIGS. 1 through 22, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented to include higher frequency (mmWave) bands, e.g., 60 GHz bands, so as to accomplish higher data rates, or in lower frequency bands, such as below 6 GHz, to enable robust coverage and mobility support. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Figure 1:
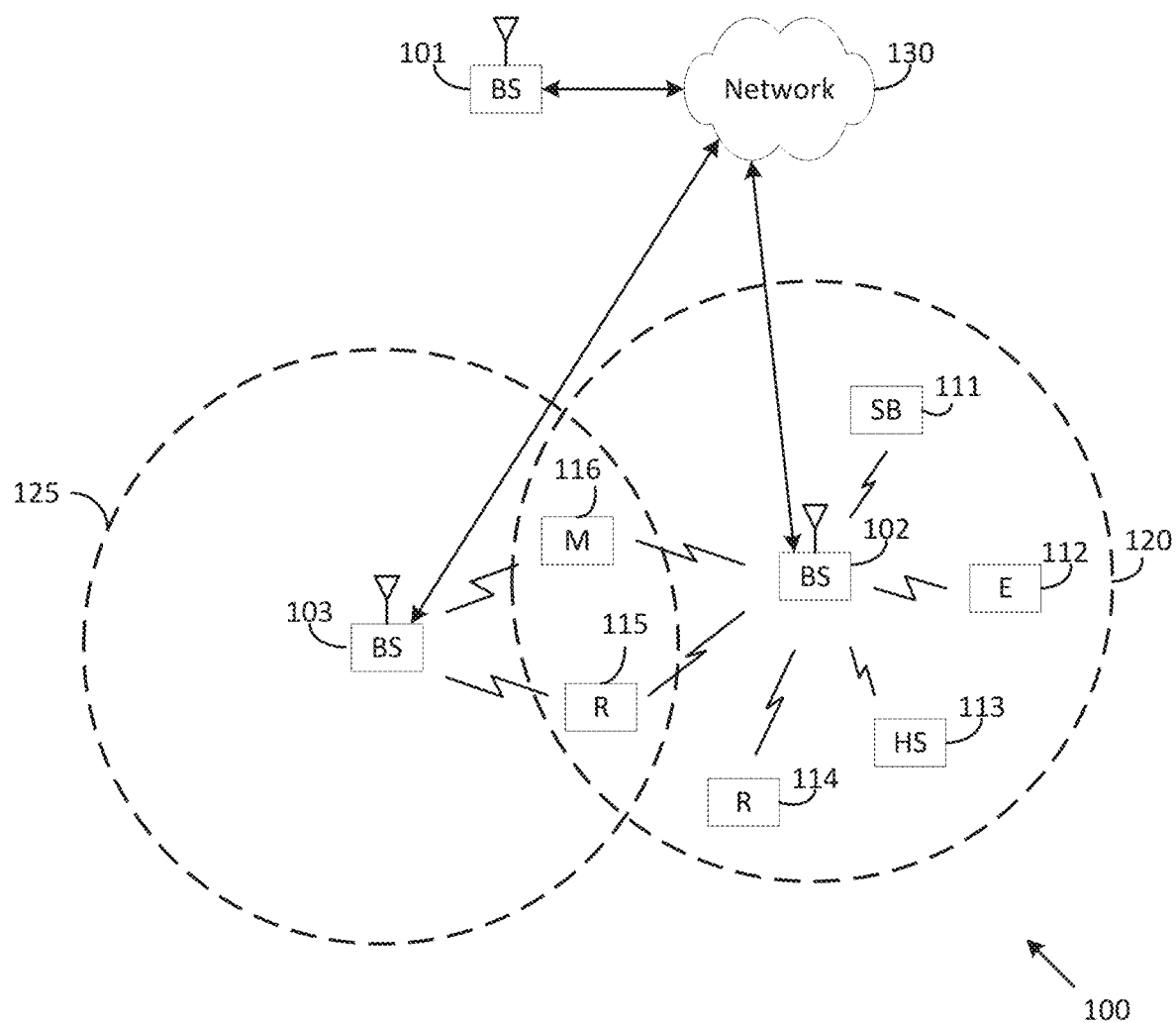
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2:
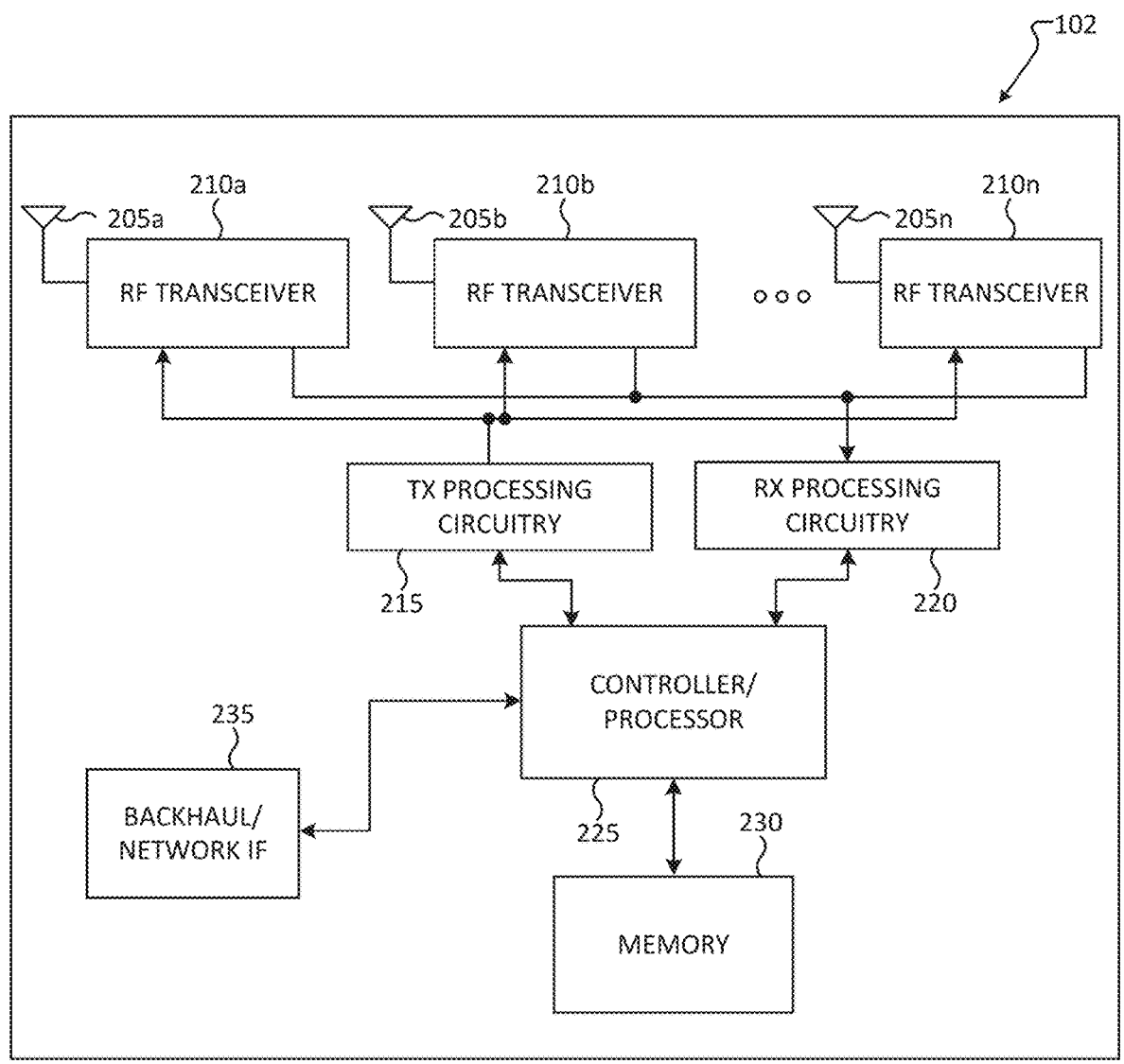
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 transmit downlink control channels for communication with multiple TRPs. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver. The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
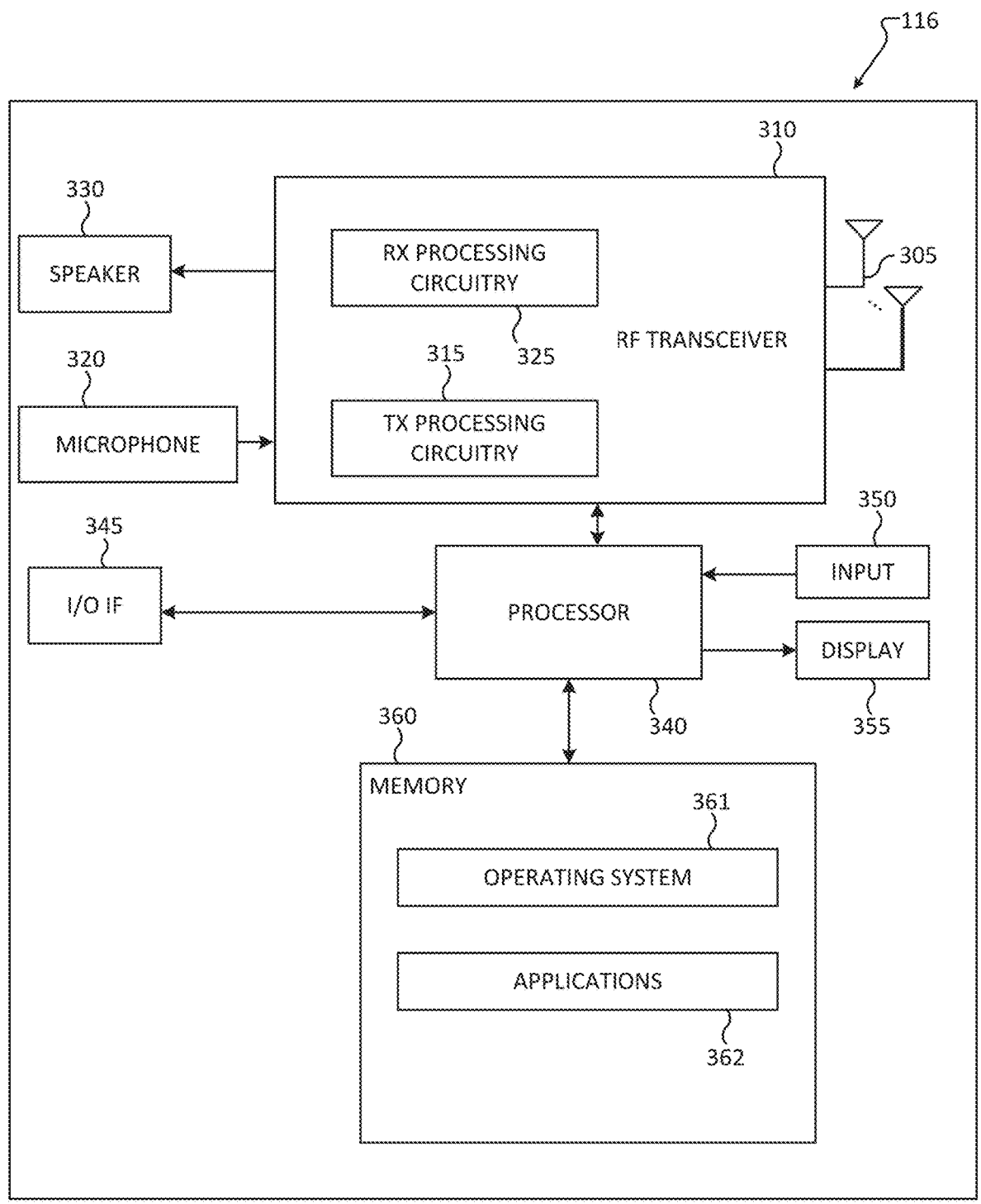
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna array 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna array 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna array 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for monitoring downlink control channels for communication with multiple TRPs. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A bandwidth (BW) unit is referred to as a resource block (RB). One RB includes a number of sub-carriers (SCs), such as 12 subcarriers. A RB in one symbol of a slot is referred to as physical RB (PRB) and includes a number of resource elements (REs). For example, a slot can have a duration of 1 millisecond and a RB can have a BW of 180 kHz and include 12 SCs with SC spacing of 15 kHz. As another example, a slot can have a duration of 0.25 milliseconds and a RB can have a BW of 720 kHz and include 12 SCs with SC spacing of 60 kHz.

Figure 4A:
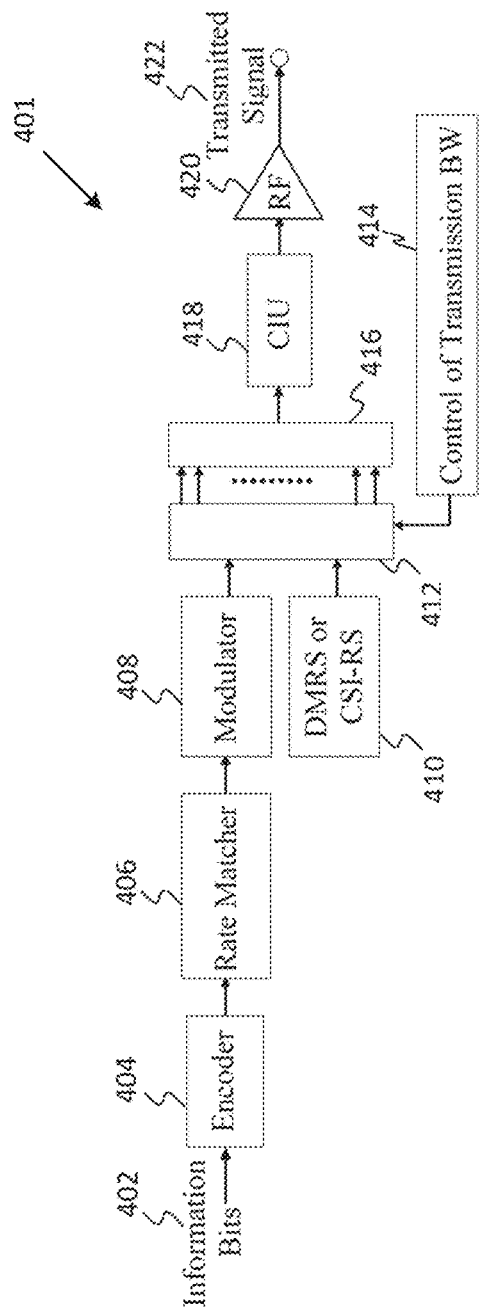
FIG. 4A illustrates an example transmitter structure according to various embodiments of the present disclosure.

FIG. 4A illustrates an example transmitter structure according to various embodiments of the present disclosure. The example transmitter structure 401 illustrated in FIG. 4A is for illustration only and should not be construed as limiting. FIG. 4A does not limit the scope of the present disclosure to any particular transmitter structure. One or more of the components illustrated in FIG. 4A can be implemented in specialized circuitry configured to perform the noted functions or one or more of the components can be implemented by one or more processors executing instructions to perform the noted functions. For example, the transmitter structure 401 can be implemented in a UE 111-116 or a gNB 101-103. Other embodiments can be used without departing from the scope of the present disclosure.

Information bits, such as control bits or data bits 402, are encoded by an encoder 404, rate matched to assigned time/frequency resources by a rate matcher 406 and modulated by a modulator 408. Subsequently, modulated encoded symbols and DMRS 410 are mapped to SCs 412 by SC mapping unit 414, an inverse fast Fourier transform (IFFT) is performed by filter 416, a cyclic prefix (CP) is added by CP insertion unit 418, and a resulting signal 422 is filtered by a filter and transmitted by a radio frequency (RF) unit 420.

Figure 4B:
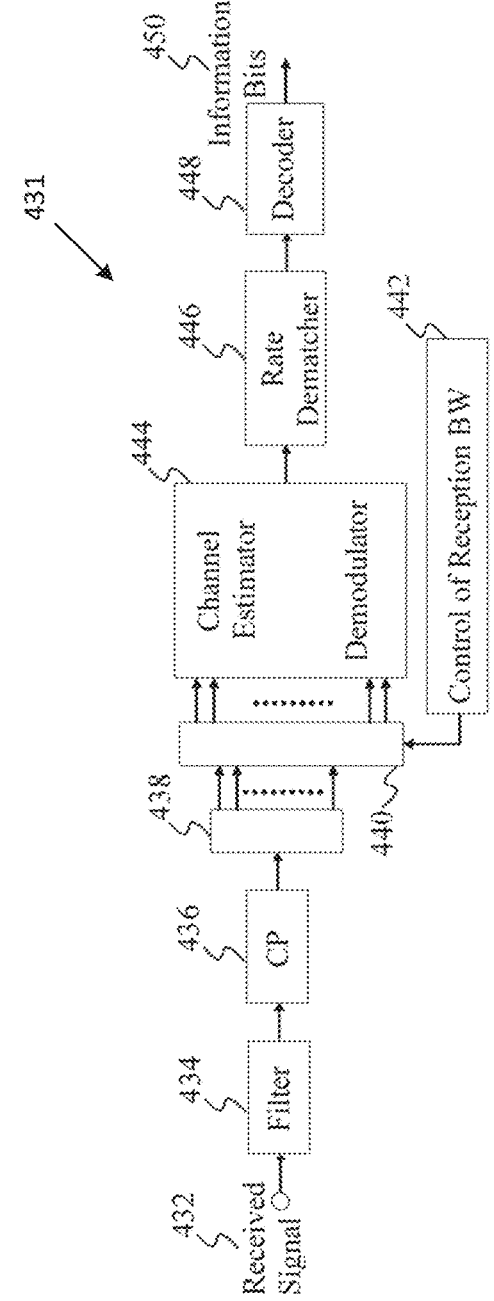
FIG. 4B illustrates an example receiver structure according to various embodiments of the present disclosure.

FIG. 4B illustrates an example receiver structure using OFDM according to various embodiments of the present disclosure. The example receiver structure 431 illustrated in FIG. 4B is for illustration only and should not be construed as limiting. FIG. 4B does not limit the scope of the present disclosure to any particular receiver structure. One or more of the components illustrated in FIG. 4B can be implemented in specialized circuitry configured to perform the noted functions or one or more of the components can be implemented by one or more processors executing instructions to perform the noted functions. For example, the receiver structure 431 can be implemented in a UE 111-116 or a gNB 101-103. Other embodiments can be used without departing from the scope of the present disclosure.

As illustrated in FIG. 4B, a received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

The following standard specification documents are hereby incorporated by reference into the present disclosure: [1] 3GPP TS 38.211 Rel-15 v15.6.0, "NR; Physical channels and modulation," June 2019; [2] 3GPP TS 38.212 Rel-15 v15.6.0, "NR; Multiplexing and channel coding," June 2019; [3] 3GPP TS 38.213 Rel-15 v15.6.0, "NR; Physical layer procedures for control," June 2019; [4] 3GPP TS 38.214 Rel-15 v15.6.0, "NR; Physical layer procedures for data," June 2019; [5] 3GPP TS 38.321 Rel-15 v15.6.0, "NR; Medium Access Control (MAC) protocol specification," June 2019; and [6] 3GPP TS 38.331 Rel-15 v15.6.0, "NR; Radio Resource Control (RRC) protocol specification," June 2019.

A random access (RA) procedure can be initiated by a radio resource control (RRC) for a system information (SI) request if the system information block 1 (SIB1) includes scheduling information for an on-demand SI request, by a medium access control (MAC), or by a Physical Downlink Control Channel (PDCCH) order. The RA procedure can be initiated due to a variety of triggers or purposes. For example, the RA procedure can be initiated for initial access to establish an RRC connection, in other words to go from RRC_IDLE to RRC_CONNECTED, to re-establish an RRC connection after radio link failure (RLF), for an on-demand SI request, or for hand-over. In addition, the RA procedure can be initiated for uplink (UL) synchronization, a scheduling request (SR), positioning, or link recovery, referred to herein as beam failure recovery (BFR).

In various embodiments throughout the present disclosure, an antenna port can be defined such that the channel over which a symbol on the antenna port is conveyed can be inferred from the channel over which another symbol on the same antenna port is conveyed. For a demodulation reference signal (DM-RS) associated with a PDSCH, the channel over which a PDSCH symbol on one antenna port is conveyed can be inferred from the channel over which a DM-RS symbol on the same antenna port is conveyed if the two symbols are within the same resource as the scheduled PDSCH, in the same slot, and in the same precoding resource block group (PRG). For DM-RS associated with a PDCCH, the channel over which a PDCCH symbol on one antenna port is conveyed can be inferred from the channel over which a DM-RS symbol on the same antenna port is conveyed if the two symbols are within resources for which the UE may assume the same precoding being used. For DM-RS associated with a physical broadcast channel (PBCH), the channel over which the PBCH symbol on one antenna port is conveyed can be inferred from the channel over which a DM-RS symbol on the same antenna port is conveyed if the two symbols are within a SS/PBCH block transmitted within the same slot, and with the same block index.

Two antenna ports can be quasi co-located if the large-scale properties of the channel over which a symbol on one antenna port is conveyed can be inferred from the channel over which a symbol on the other antenna port is conveyed. The large-scale properties can include one or more of delay spread, Doppler spread, Doppler shift, average gain, average delay, and spatial Rx parameters. In some embodiments, a UE can assume that SS/PBCH blocks transmitted with the same block index on the same center frequency location are quasi co-located with respect to Doppler spread, Doppler shift, average gain, average delay, delay spread, and, when applicable, spatial Rx parameters. The UE does not assume quasi co-location for any other SS/PBCH block transmissions.

In some embodiments, such as in an absence of CSI-RS configuration and unless otherwise configured, the UE can assume PDSCH DM-RS and the SS/PBCH block to be quasi co-located with respect to Doppler shift, Doppler spread, average delay, delay spread, and, when applicable, spatial Rx parameters. The UE can assume that the PDSCH DM-RS within the same CDM group are quasi co-located with respect to Doppler shift, Doppler spread, average delay, delay spread, and spatial Rx. The UE can also assume that DMRS ports associated with a PDSCH are quasi co-located (QCL'ed) with quasi co-location (QCL) Type A, Type D when applicable, and average gain. The UE can further assume that no DM-RS collides with the SS/PBCH block.

In some embodiments, the UE is configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS and qcl-Type2 for the second DL RS, if configured. For the case of two DL RSs, the QCL types may not be the same, regardless of whether the references are to the same DL RS or different DL RSs. The quasi co-location types corresponding to each DL RS are given by the higher layer parameter qcl-Type in QCL-Info. The quasi co-location types can have a value of QCL-TypeA, corresponding to Doppler shift, Doppler spread, average delay, delay spread, QCL-TypeB, corresponding to Doppler shift and Doppler spread, QCL-TypeC corresponding to Doppler shift and average delay, or QCL-TypeD, corresponding to Spatial Rx parameter.

In some embodiments, the UE receives a MAC-CE activation command to map up to [N] (e.g., N=8) TCI states to the codepoints of the DCI field 'Transmission Configuration Indication'. When the HARQ-ACK corresponding to the PDSCH carrying the activation command is transmitted in slot n, the indicated mapping between TCI states and codepoints of the DCI field 'Transmission Configuration Indication' are applied after a MAC-CE application time, e.g., starting from the first slot that is after slot e.g. $n+3N_{slot}^{subframe,\mu}$.

In various embodiments, a RA procedure can be initiated by an RRC, for an SI request if SIB1 includes scheduling information for an on-demand SI request, MAC, or PDCCH order. The RA procedure can be initiated due to a variety of triggers or purposes. For example, the RA procedure can be initiated for initial access to establish RRC connection (to go from RRC_IDLE to RRC_CONNECTED), to re-establish an RRC connection after radio link failure (RLF), for an on-demand system information (SI) request, for a handover, for UL synchronization, for a SR, for positioning, or for link recovery, which is also referred to herein as BFR.

RA can operate in at least two modes. A first mode is contention-based random access (CBRA) where UEs within a serving cell can share the same RA resources and, accordingly, there is a possibility of collision among RA attempts from different UEs. A second mode is contention-free random access (CFRA) where the UE has dedicated RA resources that are indicated by a serving gNB and may not be shared with other UEs so that RA collisions can be avoided. For example, CBRA can be used for any of the aforementioned triggers or purposes whereas the CFRA can be used for uplink (UL) synchronization, a scheduling request (SR), positioning, or link recovery, also referred to as BFR.

A four-step RA procedure, also known as a Type-1 (L1) random access procedure, includes the transmission of a PRACH preamble (Msg1), the attempt to receive a random access response (RAR or Msg2), the transmission of a contention resolution message (Msg3), and the attempt to receive a contention resolution message (Msg4). An alternative RA procedure can include only two steps, referred to herein as two-step RACH or a Type-2 L1 random access procedure. In two step RACH, Msg1 and Msg3 are combined into a MsgA transmission and Msg2 and Msg4 above are combined into a MsgB reception. MsgA combines a PRACH preamble transmission in a RACH occasion (RO) along with a PUSCH transmission in a so-called PUSCH occasion (PO). The mapping between ROs and POs can be one-to-one, many-to-one, or one-to-many. The present disclosure considers both four-step and two-step RACH procedures and the embodiments herein can generally apply to both RACH modes. Embodiments of the present disclosure use both 4-step RACH and 2-step RACH, and the embodiments herein can generally apply to both RACH types/modes and individual descriptions are typically omitted for brevity, unless explicitly mentioned otherwise.

A PRACH preamble transmission, for both CBRA and CFRA modes, is associated with a downlink (DL) RS. This association can help a serving gNB to identify an uplink spatial reception filter or beam to receive a PRACH and can help a UE to identify an uplink spatial transmission filter or beam to transmit a PRACH. For example, a UE can use a same or a related, such as with QCL properties or same direction but narrower width, uplink transmission filter or beam as that used for DL reception of the indicated DL RS for Msg1 transmission. This association can also be used to provide a DL RS resource for pathloss estimation for determining a PRACH preamble transmission power. A DL RS for Msg1 transmission can be one of the following options based on a first PRACH scenario, where an SS/PBCH block (SSB) is used for BFR, CFRA, PDCCH-order PRACH, SI request, and CBRA, or a second PRACH scenario, where CSI-RS is used for BFR, CFRA, CBRA. As used herein, "SSB" can be used as a short form for "SS/PBCH block." The terms "SSB" and "SS/PBCH block" can be used interchangeably in this patent document.

A serving cell can be configured with both SSB and CSI-RS for PRACH transmissions. For example, some PRACH preambles can be associated with an SSB for QCL determination and some PRACH preambles are can be associated with a CSI-RS for QCL determination. Further, a secondary serving cell (SCell) may not have any SSB configuration/transmission and only supports PRACH transmissions from UEs using CSI-RS for QCL determination, making certain random access triggers or modes, such as for PDDCH-order PRACH or for SI request, no longer applicable.

A RACH configuration can include RACH occasions (ROs) in indicated/configured RACH slots and indicated/configured frequency resource blocks that repeat with an indicated/configured periodicity.

A configuration of ROs in time domain can include a periodicity for RACH configuration, a configuration for the slots within a PRACH configuration period that can be used for PRACH transmission, and a corresponding PRACH preamble format. A temporal configuration for RACH can be provided by a higher layer parameter prach-ConfigurationIndex that has an integer value between 0 and 255. For example, a mapping of prach-ConfigurationIndex to RACH configuration is provided for different scenarios, such as for frequency range 1 (FR1), FDD/SUL; FR1, TDD; and FR2, TDD. Each prach-ConfigurationIndex is associated with a certain preamble format, 4 long formats and 9 short formats. For example, for FR1, both short and long PRACH preambles can be used while for FR2, only short PRACH preambles can be used. A prach-ConfigurationIndex can be associated with two preamble formats, e.g., A1/B1 or A2/B2 wherein all corresponding ROs except the last RO follow preamble format A, while the last RO follows preamble format B.

ROs occur periodically in system frame numbers (SFNs) n_SFN that satisfy [n_SFN mod x=y]. Therefore, ROs repeat every x SFNs (x radio frames) where, for example, x belongs to the set {1, 2, 4, 8, 16}. Therefore, a RACH configurations periodicity is [10*x]={10, 20, 40, 80, 160} msec. Within each RACH configuration periodicity, ROs only occur in SFN indices determined by the value y above. Y is a single value, such as y=0 or y=1. Therefore, only one radio frame within a RACH period includes ROs. For a few RACH configurations, y=2 so that two radio frames within each RACH configuration period include ROs.

Within each radio frame that includes ROs, one or multiple subframes/slots are specified where ROs can occur. For FR1, a numbering of slots is based on a 15 kHz subcarrier spacing (SCS). Then, each slot is 1 msec or, equivalently, $\frac{1}{10}$th of a radio frame and the set of possible slot numbers within a radio frame is a subset of {0, 1, ..., 9}. For FR2, a numbering of slots is based on a 60 kHz SCS. Then, each slot is ¼ of a msec or, equivalently, $\frac{1}{40}$th of a radio frame and the set of possible slot numbers within a radio frame is a subset of {0, 1, ..., 39}. In general, a longer PRACH periodicity may support "sparse" PRACH configurations so that there are fewer subframes/slots available for PRACH transmissions such as, for example, only 1 subframe per SFN for x=16 (160 msec PRACH period). A shorter PRACH periodicity can support both "sparse" and "dense" PRACH configurations such as from 1 subframe to 5 subframes or even the maximum of 10 subframes per SFN for x=1 (10 msec PRACH period), i.e., all subframes can include PRACH. ROs in a subframe/slot can start at the beginning or in the middle of the subframe/slot as indicated by the Starting Symbol in the corresponding prach-ConfigurationIndex.

Within each subframe/slot that includes ROs, there can be 1 or 2 RACH slots that contain the ROs. Each RACH slot can contain one or multiple TDMed ROs. Each preamble from a given preamble format contains a number of N repetitions in time of same sequences. For long preambles, N belongs, e.g., to the set {1,2,4}. For short preambles, N belongs, e.g., to the set {1,2,4,6,12}. The value of N for each preamble format can be extracted from the value of N_u (preamble length) and also, for long preambles, from the parameter "PRACH duration N_dur^RA". In one example, for long preambles, N can be considered to be the number of (15 kHz) subframes that the preamble occupies, and for short preambles, N can be considered as the number of OFDM symbols that the preamble occupies.

A configuration of ROs in frequency indicates frequency resource blocks that can be used for PRACH transmission. A RACH resource starts in frequency in a PRB, with offset compared to the lowest PRB in the UL bandwidth part (BWP), as indicated by the higher layer configured parameter msg1-FrequencyStart. Each RACH resource may contain a number of FDMed ROs as indicated by parameter msg1-FDM which can be one of {1, 2, 4, 8}. Therefore, a RACH resource spans a bandwidth equal to K*L subcarriers, where K is the number of FDMed ROs, and L is the bandwidth of the preamble in terms of the number of subcarriers. Each RACH preamble spans a number L of subcarriers. Long preambles can have L=839 with SCS=1.5 kHz or SCS=5 kHz and short preambles can have L=139 subcarriers with a SCS=15 or 30 kHz for FR1 and SCS=60 or 120 kHz for FR2.

There are 64 preambles defined in each time-frequency PRACH occasion, enumerated in increasing order of first increasing cyclic shift of a logical root sequence, and then in increasing order of the logical root sequence index, starting with the index obtained from the higher-layer parameter prach-RootSequenceIndex. Additional preamble sequences, in case 64 preambles cannot be generated from a single root Zadoff-Chu sequence, are obtained from the root sequences with the consecutive logical indexes until all the 64 sequences are found.

Actually transmitted SSBs within a half radio frame/"SSB burst set" that are indicated via SIB1 or by RRC (serving cell common configuration) can be mapped to a set of ROs and PRACH preambles based, for example, on the following configuration. The RRC parameter ssb-perRACH-OccasionAndCB-PreamblesPerSSB provides a number N of SSBs that map to an RO and a number R of PRACH preambles that map to a given SSB per RO. N belongs to the set {⅛, ¼, ½, 1, 2, 4, 8, 16}. The value of R depends on N. For N={⅛, ¼, ½, 1}, R belongs to 4*(1:16). For N=2, R belongs to 4*(1:8). For N={4,8,16}, R belongs to {1, . . . , 64/N}. Each RO is mapped to max(1,N) SSBs. Each RO is mapped to R*max(1,N) PRACH preambles. Based on the above, R always satisfies R*max(1,N)≤64. Therefore, each RO can map to no more than 64 PRACH preambles. For an integer m≥1, the notation (1:m) is defined as the set of integer numbers k satisfying 1≤k≤m.

To identify preambles (out of a maximum of 64 PRACH preambles) that are mapped to a certain SSB and a certain RO, various factors can be considered. When N<1, then 1 SSB maps to (1/N) consecutive ROs as is subsequently discussed. Each of the (1/N) ROs map to PRACH preambles with index {0, 1, . . . , R−1}. When N≥1, then N SSBs map to a single RO as is subsequently discussed. When there are a total of N_total PRACH preambles available, wherein N_total or $N_{preamble}^{total}$ provided by a higher layer parameter totalNumberOfRA-Preambles and is an integer multiple of N, and by re-indexing the associated SSBs as {0, 1, . . . , N−1}, which is separate from the SSB time index for SSBs in in a half radio frame/the SSB burst set which belongs to the set {0, 1, . . . , 63}), then SSB #0 (i.e., the first associated SSB) is mapped to PRACH preambles {0, 1 . . . , R−1}, SSB #1 (i.e., the second associated SSB) is mapped to PRACH preambles N_total/N+{0, 1 . . . , R−1}, . . . , SSB #n (i.e., the (n+1)st associated SSB) is mapped to PRACH preambles n*N_total/N+{0, 1 . . . , R−1}, . . . , and SSB #(N−1) (i.e., the last or N-th associated SSB) is mapped to PRACH preambles (N−1)*N_total/N+{0, 1 . . . , R−1}.

A UE can transmit PRACH only in valid ROs, which allows capture a UL/DL transmission direction in a TDD operation to be captured. Therefore, for paired spectrum all PRACH occasions are valid. For unpaired spectrum, if a UE is not provided with tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol. If a UE is provided tdd-UL-DL-ConfigurationCommon, a PRACH occasion in a PRACH slot is valid if it is within UL symbols or it does precede a SS/PBCH block in the PRACH slot and starts at least $N_{gap}$ symbols after a last downlink symbol and at least $N_{gap}$ symbols after a last SS/PBCH block transmission symbol. In each instance, $N_{gap}$ can be predetermined in the system specifications and can depend on preambles SCS and/or PRACH preamble format, for example, $N_{gap}$ belongs to {0,2}.

A mapping among actually transmitted SSBs and valid ROs can be identified by an SSB-to-RO association rule and an SSB-to-RO association period as well as an SSB-to-RO association pattern period. The SSB-to-RO association rule includes first, in increasing order of PRACH preambles within a valid RO when N>1; second, in increasing order of valid FDMed ROs within a PRACH resource; third, increasing order of valid TDMed ROs within a PRACH slot; and fourth, in the increasing order of PRACH slots. When a number of actually transmitted SSBs is larger than a number of ROs within a PRACH configuration period (parameter x above in n_SFN mod x=y) and/or when one SSB is mapped to multiple ROs or when some configured ROs are invalidated (in a TDD operation) as described above, it may not be possible to map all SSBs to valid ROs within a single PRACH configuration period. Therefore, to map all actually transmitted SSBs to valid ROs, multiple PRACH configuration periods may be collectively considered to complete the SSB-to-RO association and a corresponding number is referred to as SSB-to-RO association period. This can be referred to herein as an SSB association period. An SSB-to-RO association period includes the smallest number of PRACH configuration periods such that all actually transmitted SSBs can be mapped at least once to valid ROs within the association period. Within an SSB-to-RO association period, each mapping that includes a single complete mapping of all actually transmitted SSBs to valid ROs is referred to an SSB-to-RO mapping cycle. An SSB-to-RO mapping cycle can cross the boundaries of a PRACH configuration period. After an integer number of SSB-to-RO mapping cycles, any leftover ROs in the association period are discarded, i.e., considered invalid. To simplify the UE operation and attempt to avoid a continuous/ever-ongoing determination of SSB-to-RO association periods in TDD operation, 5G NR standards defines an SSB-to-RO association pattern period that includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions. Therefore, once a UE determines SSB-to-RO association period(s) within a period of at most 160 msec, the UE (and gNB) can stop determination of any further SSB-to-RO association period(s) and can assume a repetition of the same SSB-to-RO association period(s) within the next periods, thereby an SSB-to-RO association pattern period.

An SSB-to-RO association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions. Therefore, once a UE determines SSB-to-RO association period(s) within a period of at most 160 msec, the UE and gNB can stop determination of any further SSB-to-RO association periods and can assume a repetition of the same SSB-to-RO association periods within the next periods, thereby an SSB-to-RO association pattern period.

Table 1 shows a mapping between a PRACH configuration period and SS/PBC block to PRACH occasion association period.

TABLE 1

| PRACH configuration period (msec) | Association period (number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

For a PDCCH-ordered PRACH transmission, as provided for example by a DCI format 1_0 with a frequency domain resource allocation (FDRA) field set to all is and using a C-RNTI, the following information is indicated: PRACH preamble index (6 bits), SSB index (6 bits), PRACH Mask index, i.e., the RACH occasion shown in Table 2, (4 bits), UL/SUL indicator (1 bits)+10 reserved bits.

TABLE 2

| PRACH Mask Index | Allowed PRACH occasion(s) of SSB |
| --- | --- |
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

For a PRACH transmission triggered by a PDCCH order, the PRACH mask index field, if the value of the random access preamble index field is not zero, indicates the PRACH occasion for the PRACH transmission where the PRACH occasions are associated with the SS/PBCH block index indicated by the SS/PBCH block index field of the PDCCH order. The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle. For the indicated preamble index, the ordering of the PRACH occasions is first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

The transmission of Msg1 can include several steps. The first step includes the selection of the carrier, such as SUL v. NUL. For non-PDCCH-order PRACH: per comparison of RSRP with a configured threshold provided by a SIB1. For PDCCH-order PRACH: explicit indication by NUL/SUL indicator.

The second step includes the selection of the BWP. For Initial Access (i.e., establishing, or re-establishing RRC connection, RACH is performed on the Initial UL BWP of the PCell/SpCell and the Initial DL BWP of the PCell/SpCell. For other RA triggers/purposes, RACH is performed on the active UL BWP of the serving cell and the active DL BWP (with the same BWP index) of an SpCell. If no RACH occasions are configured on the active UL BWP of the serving cell, the active UL BWP of the serving cell is switched to the Initial UL BWP. If the active DL BWP index (of the SpCell) is not equal to active UL BWP index (of the serving cell), the active DL BWP is switched to one with the same BWP index. In addition, there can be additional guidelines for how to handle BWP switching in the case of colliding commands.

The third step includes the selection of the DL RS (SSB or CSI-RS) for PRACH. For non-PDCCH-order PRACH, per detection based on comparison with a configured RSRP threshold of the DL-RS, for the BFR and CFRA behavior is not defined if no DL RS passes the threshold. In one example, no random access may be initiated if no DL RS passes the threshold. In another example, for BFR, an SSB or CSI-RS associated with $q_{new}$ is considered. For an SI request and CBRA, if no SSB passes the threshold, any SSB can be chosen. For PDCCH-order PRACH, the DL RS can be selected by an explicit indication of the SSB.

The fourth step includes the selection of the PRACH preamble. For BFR, CFRA, and SI request, the PRACH preamble is selected by an explicit indication, by RRC configuration, of the preamble index associated with the DL RS selected for PRACH. For BFR with CSI-RS, if a selected CSI-RS does not have a corresponding RRC-indicated preamble index, the preamble index corresponding to an/the SSB which is QCL with that CSI-RS is used. For an SI request, the indicated preamble index is directly used for the case that N≤1 SSB are mapped to a RO. For the case that N>1 SSBs are mapped to a RO, select the [preamble index]=[indicated (starting) preamble index]+[associated SSB index], where [associated SSB index] belongs to {0, . . . , N–1}. This [associated SSB index] is a re-indexing to enumerate the associated SSBs; not to be confused with the SSB time index in the SSB burst set which belongs to the set {0, 1, . . . , 63}. For CBRA, a preamble associated with the selected SSB uniformly is picked at random.

The fifth step includes the selection of the PRACH occasion. For an SI request, a PRACH occasion is picked uniformly at random from among the consecutive PRACH occasions associated with the selected SSB. The next available PRACH occasion is determined based on the Association Period whose index is explicitly indicated by ra-AssociationPeriodIndex in the si-RequestPeriod (in SIB1) and by following Occasion Mask whose index is explicitly indicated (by SIB1). For a PDCCH-order PRACH and CBRA and for BFR and CFRA when SSB is the DL RS for PRACH, a PRACH occasion is picked uniformly at random from among the consecutive PRACH occasions associated with the selected SSB. The next available PRACH occasion is determined based on following the Occasion Mask whose index is explicitly indicated by RRC or by PDCCH-order.

This does not apply to CB-RA. For a BFR when the CSI-RS is the DL RS for PRACH, but no CFRA resource is associated with the selected CSI-RS, a PRACH occasion is picked uniformly at random from among the consecutive PRACH occasions associated with an SSB which is QCL with the selected CSI-RS. The next available PRACH occasion is determined by following Occasion Mask whose index is explicitly indicated by RRC. For CF-RA, when CSI-RS is the DL RS for PRACH, and some CFRA resource or resources associated with the selected CSI-RS, a PRACH occasion is picked uniformly at random from among the PRACH occasions occurring simultaneously but on different subcarriers, i.e., FDMed, corresponding to the selected CSI-RS.

Upon failure of a RACH attempt, due to either no RAR reception, no match for RAPID in RAR with that in Msg1, or failure of contention resolution Msg3/4, the UE repeats the RACH resource selection, including selection of the DL RS for PRACH, selection of the PRACH preamble, selection of RACH occasion, and PRACH transmission. Therefore, it is possible that a different SSB/CSI-RS and/or a different PRACH preamble and/or a different RACH occasion is/are used for the next PRACH attempt compared to the previous PRACH attempt. However, power ramping may only be applied if the same DL RS is used in the next PRACH attempt compared to the previous PRACH attempt.

The ra-ResponseWindow configured in BeamFailureRecoveryConfig can expire and a PDCCH transmission on the search space indicated by recoverySearchSpaceId addressed to the C-RNTI may not be received on the Serving Cell where the preamble was transmitted, or the ra-ResponseWindow configured in RACH-ConfigCommon can expire and the Random Access Response containing Random Access Preamble identifiers that matches the transmitted PREAMBLE_INDEX may not be received. If the RA procedure is not completed, a random backoff time can be selected according to a uniform distribution between 0 and the PREAMBLE_BACKOFF. If the RA procedure is not completed and if the criteria to select contention-free Random Access Resources is met during the backoff time, the Random Access Resource selection procedure can be performed. If the RA procedure is not completed, the Random Access Resource selection procedure can be performed after the backoff time.

The contention resolution may be considered not successful and the Random Access procedure may not be completed. A random backoff time can be selected according to a uniform distribution between 0 and the PREAMBLE_BACKOFF. If the criteria to select contention-free Random Access Resources is met during the backoff time, the Random Access Resource selection procedure can be performed. If the criteria to select contention-free Random Access Resources is met during the backoff time, the Random Access Resource selection procedure can be performed after the backoff time.

For each Random Access Preamble, the MAC entity, if PREAMBLE_TRANSMISSION_COUNTER is greater than one, the notification of suspending power ramping counter has not been received from lower layers, and SSB or CSI-RS selected is not changed from the selection in the last Random Access Preamble transmission, can increment the PREAMBLE_POWER_RAMPING_COUNTER by 1. or each Random Access Preamble, the MAC entity selects the value of DELTA_PREAMBLE and sets PREAMBLE_RECEIVED_TARGET_POWER to preambleReceivedTargetPower+DELTA_PREAMBLE+(PREAMBLE_POWER_RAMPING_COUNTER−1)× PREAMBLE_POWER_RAMPING_STEP.

Various embodiments of the present disclosure provide PRACH and PUSCH transmission for a 2-step RACH (Type-2 random access procedure). As used herein, the terms "4-step RACH" and "Type-1 random access procedure" and "Type-1 L1 random access procedure" may be used interchangeably. As used herein, the terms "2-step RACH" and "Type-2 random access procedure" and "Type-2 L1 random access procedure" may be used interchangeably.

Prior to initiation of the physical random access procedure, Layer 1 receives from higher layers an indication to perform a Type-1 random access procedure (4-step RACH) or a Type-2 random access procedure (2-step RACH). From the physical layer perspective, the Type-2 L1 random access procedure includes the transmission of random access preamble in a PRACH and of a PUSCH (MsgA) and the reception of a RAR message with a PDCCH/PDSCH (MsgB). When random access response for a 2-step RACH indicates a fall-back to 4-step RACH (namely, a fallback-RAR), a 2-step RACH procedure continues similar to a 4-step RACH procedure, namely, the transmission of a PUSCH scheduled by a RAR UL grant, and PDSCH for contention resolution.

PRACH preambles for a 2-step RACH is separate from those for 4-step RACH, for example, The R contention based preambles per SS/PBCH block per valid PRACH occasion for Type-2 random access procedure start after the ones for Type-1 random access procedure. RACH occasions (ROs) for a 2-step RACH can be common/shared with or can be separate from those for 4-step RACH. For a Type-2 random access procedure, a UE transmits a PUSCH, when applicable, after transmitting a PRACH. The UE encodes a transport block provided for the PUSCH transmission using redundancy version number 0. If useInterlacePUSCH-Common is not provided, the PUSCH transmission is after the PRACH transmission by at least N symbols where N=2 for $\mu=0$ or $\mu=1$, N=4 for $\mu=2$ or $\mu=3$, and $\mu$ is the SCS configuration for the active UL BWP.

A PUSCH occasion for PUSCH transmission in an active UL BWP is defined by a set of frequency resources, time resources, and is associated with a DMRS configuration, from a number $N_{DMRS}$ of DMRS configurations provided by msgA-DMRS-Configuration. A UE determines time resources and frequency resources for PUSCH occasions in an active UL BWP from msgA-PUSCH-config for the active UL BWP. If the active UL BWP is not the initial UL BWP and msgA-PUSCH-config is not provided for the active UL BWP, the UE uses the msgA-PUSCH-config provided for the initial active UL BWP.

A UE determines a first interlace or first RB for a first PUSCH occasion in an active UL BWP respectively from interlaceIndexFirstPOMsgAPUSCH or from frequencyStartMsgAPUSCH that provides an offset, in number of RBs in the active UL BWP, from a first RB of the active UL BWP. A PUSCH occasion includes a number of interlaces or a number of RBs provided by nrofInterlacesPerMsgAPO or by nrofPRBsperMsgAPO, respectively. Consecutive PUSCH occasions in the frequency domain of an UL BWP are separated by a number of RBs provided by guardBandMsgAPUSCH. A number $N_f$ of PUSCH occasions in the frequency domain of an UL BWP is provided by nrMsgAPO-FDM.

If a UE does not have dedicated RRC configuration, or has an initial UL BWP as an active UL BWP, or is not provided startSymbolAndLengthMsgAPO, msgA-timeDomainAllocation provides a SLIV and a PUSCH mapping type for a PUSCH transmission by indicating—first maxN-rofUL-Allocations values from PUSCH-TimeDomainResourceAllocationList, if PUSCH-TimeDomainResourceAllocationList is provided in PUSCH-ConfigCommon and second entries from table 6.1.2.1.1-2 in TS 38.214, if PUSCH-TimeDomainResourceAllocationList is not provided in PUSCH-ConfigCommon; else, the is provided a SLIV by startSymbolAndLengthMsgAPO, and a PUSCH mapping type by mappingTypeMsgAPUSCH for a PUSCH transmission.

For mapping one or multiple preambles of a PRACH slot to a PUSCH occasion with a DMRS resource, a UE determines a first slot for a first PUSCH occasion in an active UL BWP from msgAPUSCH-timeDomainOffset that provides an offset, in number of slots in the active UL BWP, relative to the start of each PRACH slot. The UE expects that a first PUSCH occasion in each slot has a same SLIV for a PUSCH transmission that is provided by startSymbolAndLengthMsgAPO. Consecutive PUSCH occasions within each slot are separated by guardPeriodMsgAPUSCH symbols and have same duration. A number $N_t$ of time domain PUSCH occasions in each slot is provided by nrofMsgAPOperSlot and a number of consecutive slots that include PUSCH occasions is provided by nrofSlotsMsgAPUSCH. A UE is provided an MCS for data information in a PUSCH transmission for a PUSCH occasion by msgA-MCS.

For a PUSCH transmission with frequency hopping in a slot, when indicated by msgA-intraSlotFrequencyHopping for the active UL BWP, the frequency offset for the second hop is determined as described in Subclause 8.3, Table 8.3-1 of TS 38.214 using msgA-HoppingBits instead of $N_{UL,hop}$. If guardPeriodMsgAPUSCH is provided, a first symbol of the PUSCH transmission after frequency hopping is separated by guardPeriodMsgAPUSCH symbols from a last symbol of the PUSCH transmission before frequency hopping; otherwise, there is no time separation of the PUSCH transmission before and after frequency hopping. A PUSCH transmission uses a same spatial filter as an associated PRACH transmission. A UE determines whether or not to apply transform precoding for a PUSCH transmission as described in TS 38.214.

A PUSCH occasion is valid if it does not overlap in time and frequency with any PRACH occasion associated with either a Type-1 random access procedure or a Type-2 random access procedure. Additionally, if a UE is provided tdd-UL-DL-ConfigurationCommon, a PUSCH occasion is valid if (i) it is within UL symbols, or (ii) it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is provided in TS 38.213: Table 8.1-2. A UE does not transmit a PUSCH in a PUSCH occasion if the PUSCH occasion is not mapped to a valid PRACH occasions. A UE can transmit a PRACH in a valid PRACH occasion if the PRACH occasion is not mapped to a valid PUSCH occasion.

A mapping between PRACH occasions and PUSCH occasions is per PUSCH configuration. A consecutive number of $N_{preamble}$ preamble indexes from valid PRACH occasions in a slot (i) first, in increasing order of preamble indexes within a single PRACH occasion, (ii) second, in increasing order of frequency resource indexes for frequency multiplexed PRACH occasions, and (iii) third, in increasing order of time resource indexes for time multiplexed PRACH occasions within a PRACH slot; are mapped to a valid PUSCH occasion: (i) first, in increasing order of frequency resource indexes $f_{id}$ for frequency multiplexed PUSCH occasions, (ii) second, in increasing order of DMRS indexes within a PUSCH occasion, where a DMRS index $DMRS_{id}$ is determined first in an ascending order of a DMRS port index and second in an ascending order of a DMRS sequence index, (iii) third, in increasing order of time resource indexes $t_{id}$ for time multiplexed PUSCH occasions within a PUSCH slot, and (iv) fourth, in increasing order of indexes for PUSCH slots. Here, $N_{preamble}=ceil(T_{preamble}/T_{PUSCH})$ $T_{preamble}$ is a total number of preambles in valid PRACH occasions per association pattern period, and $T_{PUSCH}$ is a total number of valid sets of PUSCH occasions per association pattern period multiplied by the number of DMRS indexes per valid PUSCH occasion.

Commands for BWP switching for PRACH can collide. If the MAC entity receives a PDCCH for BWP switching for a Serving Cell while a Random Access procedure associated with that Serving Cell is ongoing in the MAC entity, it is up to UE implementation whether to switch BWP or ignore the PDCCH for BWP switching, except for the PDCCH reception for BWP switching addressed to the C-RNTI for successful Random Access procedure completion in which case the UE shall perform BWP switching to a BWP indicated by the PDCCH. Upon reception of the PDCCH for BWP switching other than successful contention resolution, if the MAC entity decides to perform BWP switching, the MAC entity stops the ongoing Random Access procedure and initiates a Random Access procedure after performing the BWP switching. If the MAC decides to ignore the PDCCH for BWP switching, the MAC entity continues with the ongoing Random Access procedure on the Serving Cell.

Upon reception of RRC configuration or re-configuration for BWP switching for a Serving Cell while a Random Access procedure associated with that Serving Cell is ongoing in the MAC entity, the MAC entity stops the ongoing Random Access procedure and initiates a Random Access procedure after performing the BWP switching. If the MAC entity receives a UL grant indicating a SUL switch while a Random Access procedure is ongoing, the MAC entity determines to ignore the UL grant.

As described herein, the terms "NR-Light UE," "Reduced capability UE," "RedCap UE", and "BL/CE UE" are used interchangeably to refer to a UE or a group of UEs with reduced cost and/or complexity, such as reduced bandwidth, reduced number of Rx and/or Tx RF chain, reduced power class, compared to a UE or UE group/category such as one as defined by 3GPP 5G NR Rel-15. Such a UE or UE group may be recognized as a UE category (or multiple UE categories) satisfying certain radio/service requirements, similar to 3GPP LTE UE Cat-M1. In addition, such a UE or UE group/category may also support features for coverage enhancement. Examples of such an NR-Light UE may include wearables, smart watches, surveillance cameras, and other mid-tier wireless sensors used in industrial, residential, health or public safety, etc. In certain scenarios and deployments, there may be hundreds or thousands NR-Light UEs within a serving cell in the RRC_CONNECTED state. Unless specifically mentioned otherwise, throughout the present disclosure the term 'UE' is also used to refer to a NR-Light UE as a realization, or in general, to any UE that aims for or uses coverage recovery or coverage enhancement for PRACH and/or other UL/DL transmissions, e.g., any category of low-capability UEs such as feature phones, etc. Additionally, while embodiments may refer to NR-Light UE or reduced capability (RedCap) UEs with reduced capability, cost, and/or complexity compared to legacy UEs, any embodiments of the present disclosure may be also implemented in any type of UE including, for example, UEs with the same, similar, or more capabilities compared to legacy UEs that seek coverage enhancements for fast beam management, etc.

Various embodiments of the present disclosure recognize and take into account that a key element for improving a detection/miss probability for a PRACH transmission from NR-Light UEs or low-capability UEs is improving a receiving SINR by repeating the PRACH transmission in multiple occasions to increase the probability of correct detection of the PRACH preamble by the gNB and/or to reduce the collision probability among numerous NR-Light UEs as well as other coexisting UEs, e.g., "legacy" Rel-15 UEs. Accordingly, this can help with faster initial access, connection setup, and UL synchronization.

Although the use of repetitions for a PRACH transmission is considered in LTE MTC, PRACH operates with omnidirectional transmissions. Beamforming-based operation has been considered where all DL/UL transmissions including the PRACH can use different spatial transmission filters corresponding to DL/UL RS resources. In particular, UE behavior for association of RACH occasions (ROs) with PRACH preambles and DL RS resources (SSB or CSI-RS) for PRACH has been considered. However, various embodiments of the present disclosure recognize and take into account the need for a use of repetitions for a PRACH transmission. Furthermore, 2-step RACH in addition to the legacy 4-step RACH has been considered, but various embodiments of the present disclosure recognize and take into account the need for PRACH repetitions for 2-step RACH.

Accordingly, various embodiments of the present disclosure address challenges in considering PRACH repetitions in a beamforming based operation, including determining the number of PRACH repetitions, configuring RACH occasions (ROs) in time and frequency for PRACH repetitions and whether or not new ROs (compared to Rel-15 configuration) are needed to enable PRACH repetitions, whether SSB-to-RO association in NR Rel-15 is sufficient to capture PRACH repetitions or whether that association needs to be modified, e.g., whether PRACH repetitions need to map to same DL RS or can they map to different RL RS resources, re-interpreting or modifying the fields in PDCCH order to accommodate PRACH repetitions, and setting the transmission power for PRACH repetitions. Various embodiments of the present disclosure further provide additional design aspects for supporting a PRACH transmission with repetitions and supporting a random access procedure where associated messages are transmitted with repetitions.

Various embodiments of the present disclosure provide methods for repetition of PRACH transmission. For example, various embodiments of the present disclosure address coverage enhancement (CE) levels based on RSRP ranges for associated DL RS and/or UE power class, a number of PRACH repetitions to depend upon the CE level based on RSRP range and/or UE power class, and a configuration of common or UE-specific NR-Light-Valid slots for flexible gNB operation and reducing the collision probability among multiple NR-Light UEs performing random access. Various embodiments of the present disclosure further address a configuration of RACH occasions to enable repetitions of PRACH transmission including: reusing Rel-15 ROs and/or configuring additional/extended/replicated ROs in time and/or frequency, where configuration of additional/extended/replicated ROs across different CE levels can be arbitrary or in a nested/scalable manner. The present disclosure further addresses new PRACH parameters such as the RSRP ranges, the number of repetitions, RO extensions, and so on by scheduling a separate SIB-light in a new CORESET or in the same CORESET as in Rel-15 but different RNTI (e.g., L-RNTI), the association of ROs with DL RS such that consecutive TDMed ROs that map to same DL RS are used for PRACH repetitions, and a configuration of number of SSBs per RO and/or number of preambles per SSB per RO and/or total number of ROs to depend on the CE level/RSRP range/UE power class.

Various embodiments of the present disclosure further address SSB-to-RO association such that SSBs are only mapped to the original Rel-15 ROs, and the same can be applied to corresponding replicated/extended ROs, or such that SSBs are mapped to all ROs including original Rel-15 ROs as well as extended ROs. The present disclosure further addresses whether SSB association periods need to be extended or multiple 160-msec periods need to be linked to accommodate SSB-to-RO association for PRACH repetition, modifications of PDCCH order such that number of PRACH repetitions is indicated in the PDCCH order, and re-interpretation and/or medication of PDCCH order such so that mask field in PDCCH order applies to the first repetition or all repetitions and RO index field in PDCCH order applies to original ROs only or to extension ROs also. The present disclosure further addresses a structure for PRACH preamble for NR-light, e.g., longer sequence, new root sequences, new cyclic shift, disabling or limiting certain features, e.g., number of FDMed ROs, and full power PRACH transmission for largest CE level and CE-level-specific configuration for power control parameters.

Various embodiments of the present disclosure provide a configuration of PRACH repetition. For example, a UE, such as the UE 116, can be configured to operate in multiple different coverage enhancement (CE) levels, such as CE levels {0,1} or CE levels {0,1,2,3}. The configuration of PRACH repetition can be used to enhance transmissions of PRACH preambles for NR-Light UEs.

In some embodiments, a UE, such as the UE 116, can determine a CE level for a PRACH transmission based on an unfiltered L1-RSRP and/or a filtered L3-RSRP measurement obtained from a DL RS resource associated with the PRACH transmission. For example, the DL RS resource can be an SSB or a CSI-RS resource that the UE 116 can use for pathloss estimation. The UE 116 can be indicated a number of RSRP ranges, such as 2 or 4 RSRP ranges, by higher layer signaling, such as by a system information block (SIB) or by UE-specific higher layer signaling. Alternatively, a number of RSRP ranges can be specified in the system operation. A mapping of RSRP ranges to the CE levels can also be provided by higher layer signaling or be specified in the system operation. The UE 116 transmits a PRACH according to a CE level that corresponds to a RSRP range that includes a RSRP that the UE 116 measures using the DL RS resource.

In some embodiments, an indication/configuration/specification of RSRP ranges can depend on the NR-Light UE power class, such as one of 14 dBm, 17 dBm, 20 dBm, and 23 dBm, and different RSRP ranges can be defined for different UE power classes. In yet another example, the UE 116 can determine a CE level based on both a measured RSRP and a corresponding UE power class. Alternatively, a mapping of a CE level for a PRACH transmission by a NR-Light UE 116 can depend on both the RSRP range and the corresponding UE power class.

Figure 5:
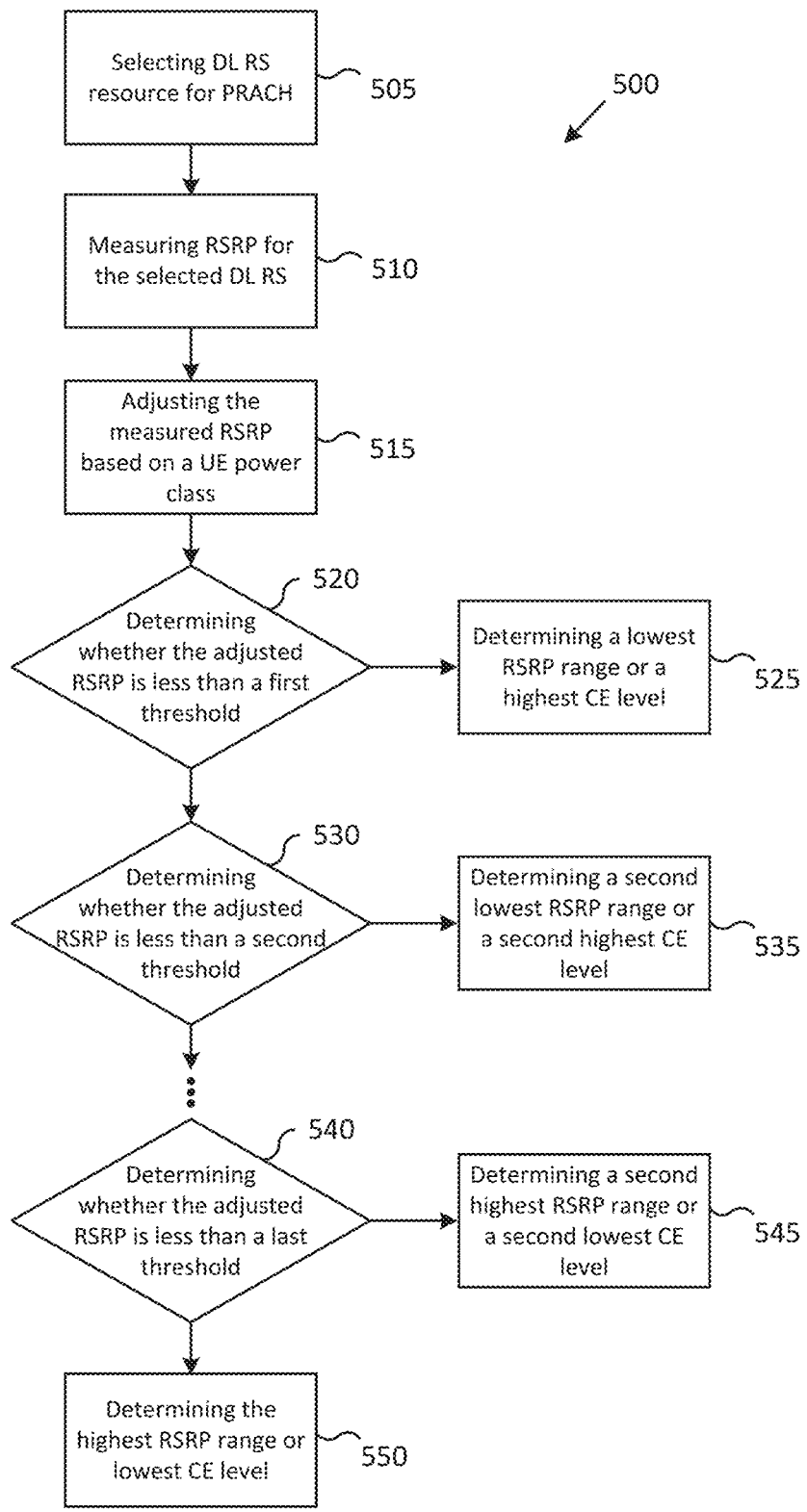
FIG. 5 illustrates a method of determining an RSRP range/CE level based on a UE power class according to various embodiments of the present disclosure.

FIG. 5 illustrates a method of determining an RSRP range/CE level based on a UE power class according to various embodiments of the present disclosure. Although described herein as being implemented by the UE 116, the method 500 illustrated in FIG. 5 can be implemented by one or more of the UEs 111-116 and a corresponding method can be performed by one or more of the gNBs 101-103 described in FIG. 1. Other embodiments can be used without departing from the scope of the present disclosure.

In operation 505, a UE, such as the UE 116, selects a DL RS resource for PRACH transmission. For example, the DL RS resource can be an SSB or a CSI-RS. In operation 510, the UE 116 measures the RSRP for the selected DL RS resource.

In operation 515, the UE 116 adjusts the measured RSRP value based on the UE power class. For example, the UE 116 can adjust the measured RSRP value based on a difference of the UE power class with a reference UE power class. In operation 520, the UE 116 compares the adjusted RSRP with a first threshold. The first threshold can be indicated by an SIB or configured by RRC. If the UE 116 determines the adjusted RSRP is less than the first threshold, the UE 116 proceeds to operation 525. If the UE 116 determines the adjusted RSRP is not less than the first threshold, the UE 116 proceeds to operation 530.

In operation 525, based on the UE 116 determining the adjusted RSRP is less than the first threshold, the UE 116 determines a lowest RSRP range, a highest CE level, or both. In operation 530, based on the UE 116 determining the adjusted RSRP is not less than the first threshold, the UE 116 compares the adjusted RSRP with a second threshold. The second threshold can be indicated by an SIB or configured by RRC. If the UE 116 determines the adjusted RSRP is less than the second threshold, the UE 116 proceeds to operation 535. If the UE 116 determines the adjusted RSRP is not less than the second threshold, the UE 116 proceeds to operation 540.

In operation 535, based on the UE 116 determining the adjusted RSRP is less than the second threshold, the UE 116 determines a second lowest RSRP range, a second highest CE level, or both. Based on the UE 116 determining the adjusted RSRP is not less than the second threshold, the UE 116 continues a same procedure until the UE 116 reaches a last threshold. For example, the UE 116 can compare the adjusted RSRP with any suitable number of thresholds. Although described herein as a first threshold, second threshold, and last threshold, the UE 116 can compare the adjusted RSRP with more or fewer than three thresholds without departing from the scope of the present disclosure.

In operation 540, the UE 116 compares the adjusted RSRP with a last threshold. If the UE 116 determines the adjusted RSRP is less than the last threshold, the UE 116 proceeds to operation 545. If the UE 116 determines the adjusted RSRP is not less than the last threshold, the UE 116 proceeds to operation 550.

In operation 545, based on the UE 116 determining the adjusted RSRP is less than the last threshold, the UE 116 determines a second highest RSRP range, a second lowest CE level, or both. In operation 550, based on the UE 116 determining the adjusted RSRP is not less than the last threshold, the UE 116 determines a highest RSRP range, a lowest CE level, or both.

In some embodiments, the UE 116 can be provided with a first CE level for a PRACH transmission by higher layers, such as for a PRACH transmission that is not triggered by a PDCCH-order, or by a DCI format, such as for a PRACH transmission triggered by a PDCCH-order. When the UE 116 does not receive a random access response (RAR) or a contention resolution response, if applicable, after a number of PRACH transmissions according to a CE level, the UE 116 can continue with PRACH transmissions using a next/ higher CE level. The number of PRACH transmissions for the CE level can be provided to the UE 116 by higher layer signaling, such as by a SIB, and can be same for all CE levels or provided separately at least for some of the CE levels.

In some embodiments, for each PRACH transmission by an NR-Light UE, the UE 116 can transmit the PRACH preamble with a number of PRACH repetitions and with a same transmission power for each repetition. For example, the number of PRACH repetitions can be indicated by a system information block (SIB) or be provided by UE-specific higher layer signaling, such as for a PRACH transmission that is not triggered by a PDCCH order, or be indicated by a DCI format, from a set of configured or specified numbers, such as for a PRACH transmission that is triggered by a PDCCH-order. In one example, the set of possible numbers for PRACH repetitions can depend on the operating CE level and/or the power class of the NR-Light UE 116. Then, a first UE and a second UE, that have respective RSRP measurements in a same RSRP range, can transmit a PRACH with a different number of repetitions depending on a corresponding UE power class. In another example, the RSRP ranges can be defined with respect to a predetermined UE power class, such as 23 dBm, and a UE 116 can determine the RSRP range by subtracting the difference of the UE power class from 23 dBm from a RSRP that the UE 116 measures. For example, for a first RSRP range of [−80, −90) dBm and a second RSRP range of [−90, −100) dBm, a first UE with 23 dBm power class that measures an RSRP of −87 dBm determines the first RSRP range, and a second UE with 17 dBm power class that measures an RSRP of −87 dBm determines the second RSRP range.

Figure 6:
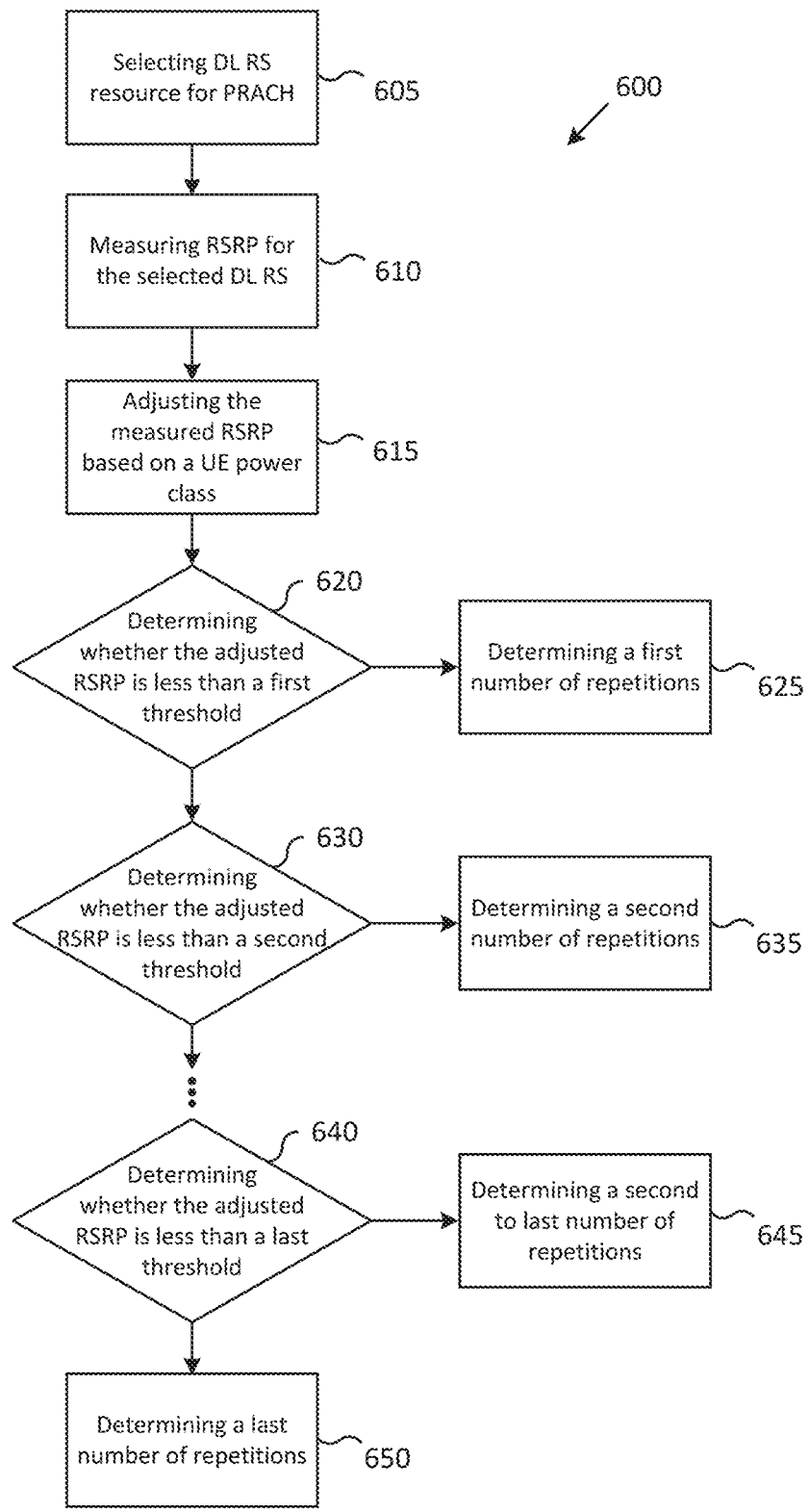
FIG. 6 illustrates a method of determining a number of repetitions based on an RSRP range/CE level and a UE power class according to various embodiments of the present disclosure.

FIG. 6 illustrates a method of determining a number of repetitions based on an RSRP range/CE level and a UE power class according to various embodiments of the present disclosure. Although described herein as being implemented by the UE 116, the method 600 illustrated in FIG. 6 can be implemented by one or more of the UEs 111-116 and a corresponding method can be performed by one or more of the gNBs 101-103 described in FIG. 1. Other embodiments can be used without departing from the scope of the present disclosure.

In operation 605, a UE, such as the UE 116, selects a DL RS resource for PRACH transmission. For example, the DL RS resource can be an SSB or a CSI-RS. In operation 610, the UE 116 measures the RSRP for the selected DL RS resource.

In operation 615, the UE 116 adjusts the measured RSRP value based on the UE power class. For example, the UE 116 can adjust the measured RSRP value based on a difference of the UE power class with a reference UE power class. In operation 620, the UE 116 compares the adjusted RSRP with a first threshold. The first threshold can be indicated by an SIB or configured by RRC. If the UE 116 determines the adjusted RSRP is less than the first threshold, the UE 116 proceeds to operation 625. If the UE 116 determines the adjusted RSRP is not less than the first threshold, the UE 116 proceeds to operation 630.

In operation 625, based on the UE 116 determining the adjusted RSRP is less than the first threshold, the UE 116 determines a first number of repetitions for PRACH transmission. In operation 630, based on the UE 116 determining the adjusted RSRP is not less than the first threshold, the UE 116 compares the adjusted RSRP with a second threshold. The second threshold can be indicated by an SIB or configured by RRC. If the UE 116 determines the adjusted RSRP is less than the second threshold, the UE 116 proceeds to operation 635. If the UE 116 determines the adjusted RSRP is not less than the second threshold, the UE 116 proceeds to operation 640.

In operation 635, based on the UE 116 determining the adjusted RSRP is less than the second threshold, the UE 116 determines a second number of repetitions for PRACH transmission. Based on the UE 116 determining the adjusted RSRP is not less than the second threshold, the UE 116 continues a same procedure until the UE 116 reaches a last threshold. For example, the UE 116 can compare the adjusted RSRP with any suitable number of thresholds. Although described herein as a first threshold, second threshold, and last threshold, the UE 116 can compare the adjusted RSRP with more or fewer than three thresholds without departing from the scope of the present disclosure.

In operation 640, the UE 116 compares the adjusted RSRP with a last threshold. If the UE 116 determines the adjusted RSRP is less than the last threshold, the UE 116 proceeds to operation 645. If the UE 116 determines the adjusted RSRP is not less than the last threshold, the UE 116 proceeds to operation 650.

In operation 645, based on the UE 116 determining the adjusted RSRP is less than the last threshold, the UE 116 determines a second to last number of repetitions for PRACH transmission. In operation 650, based on the UE 116 determining the adjusted RSRP is not less than the last threshold, the UE 116 determines a last number of repetitions for PRACH transmission.

In some embodiments, when the UE 116 transmits a PRACH with repetitions, the UE 116 slots can be indicated to the UE 116 where the UE 116 can transmit the repetitions ("NR-Light-valid" slots or simply valid slots). A same principle can apply for a channel reception with repetitions. For example, for a transmission with repetitions, the UE 116 transmits all repetitions including a first repetition in a valid slot. In another example, for a transmission without repetitions such as a single transmission, the UE 116 can transmit only in a valid slot or the UE 116 can transmit in an invalid slot. NR-Light-valid slots can be indicated, for example, by higher layer signaling in a SIB. A configuration of NR-Light-valid slots increases the likelihood that, in addition to any flexible duplex (TDD) configuration such as one indicated by higher layer parameter TDD-UL-DL-ConfigurationCommon, the UE 116 transmits or receives repetitions of a channel in slots that are controlled by a serving gNB, such as the gNB 102. This can be beneficial when a number of repetitions is large because the gNB 102 can adjust the slots used for repetitions according to characteristics of other traffic types that are served by the gNB 102.

Figure 7A:
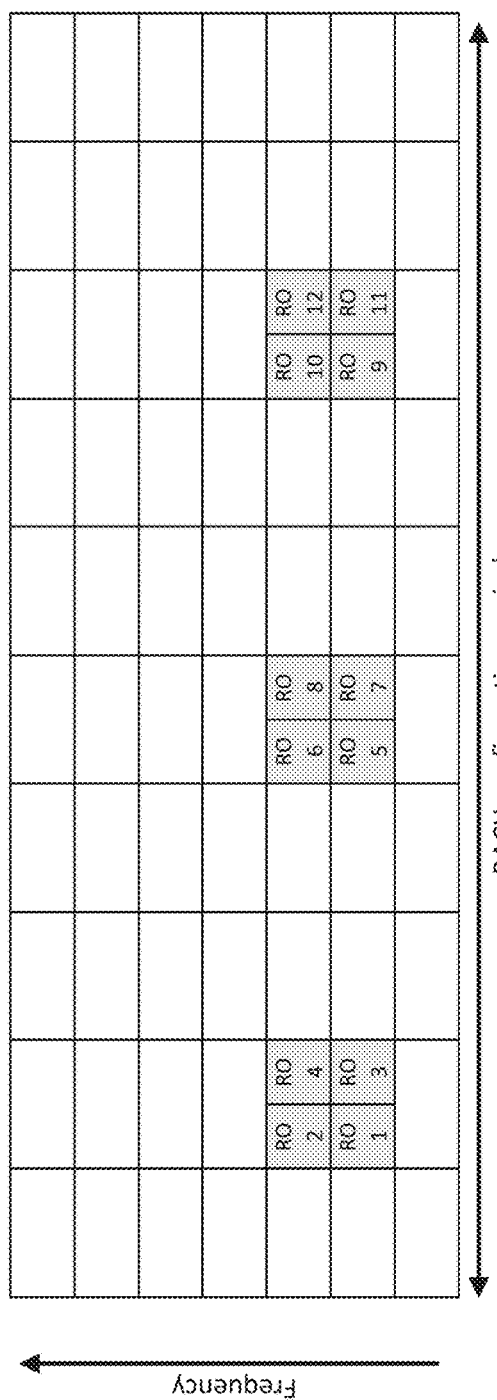
FIGS. 7A and 7B illustrate configuration RACH occasions according to various embodiments of the present disclosure.
Figure 7B:
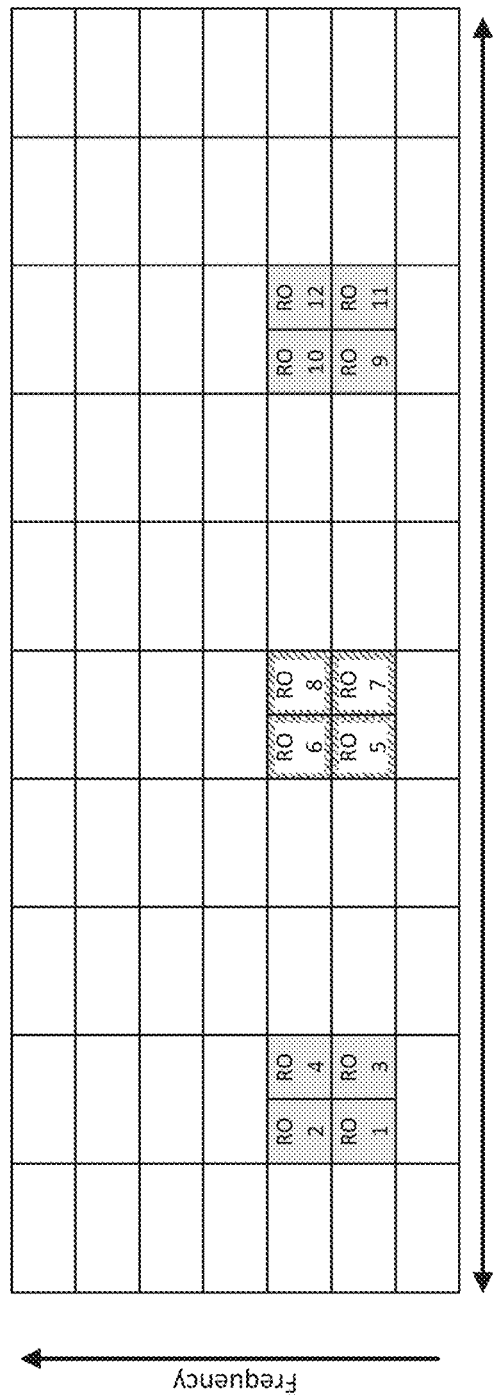

In some embodiments, a configuration of NR-Light-valid slots can be UE-specific in order to adjust the NR-Light-valid slots to a particular service type. This also helps with better coexistence of NR-light with RRC configured transmissions of regular/legacy NR. One possible RRC configuration is as follows:

FIGS. 7A and 7B illustrate configuration RACH occasions according to various embodiments of the present disclosure. FIG. 7A illustrates an example of an original NR Rel-15 configuration RACH occasions (ROs). FIG. 7B illustrates an example of an NR-Light-valid configuration for ROs. The ROs illustrated in FIGS. 7A and 7B can be an example of the NR-Light-valid slots indicated to the UE 116 described herein.

As shown in FIG. 7B, the ROs index 5-8 are not in an NR-Light-valid slot. Because the ROs index 5-8 are not in a valid slot, they ROs index 5-8 are removed from the configuration indicating the valid slots.

Various embodiments of the present disclosure provide a time/frequency allocation (RACH occasion) for PRACH repetitions. The time/frequency allocation (RACH occasion) for PRACH repetitions can be used to enhance transmissions of PRACH preambles for NR-Light UEs.

For example, in one embodiment, the time/frequency configuration for PRACH Occasions remains as in NR Rel-15, repetitions use NR Rel-15 ROs, and no new/additional ROs are introduced to accommodate the repetitions. The same preamble may not be available in all existing ROs that are intended for PRACH repetition, for example NR-Light-valid ROs that are consecutive in time-domain. When the same preamble is not available in all existing ROs, the preamble association rules can be changed, or the UE 116 can skip ROs where a same preamble is not available. When the UE 116 skips ROs, the skipped ROs can be counted toward the number of repetitions so that the UE 116 makes fewer actual repetitions than configured or the skipped ROs may not be counted toward the number of repetitions so that the UE 116 will perform a number of repetitions equal to the configured number of repetitions. In some embodiments, only certain dense PRACH (time) configurations may support PRACH repetition without introducing any new/additional ROs. This can be supported by gNB 102 implementation or by a restriction in the specification in terms of RACH (time) configurations that are allowed for PRACH transmission with repetitions.

Figure 8A:
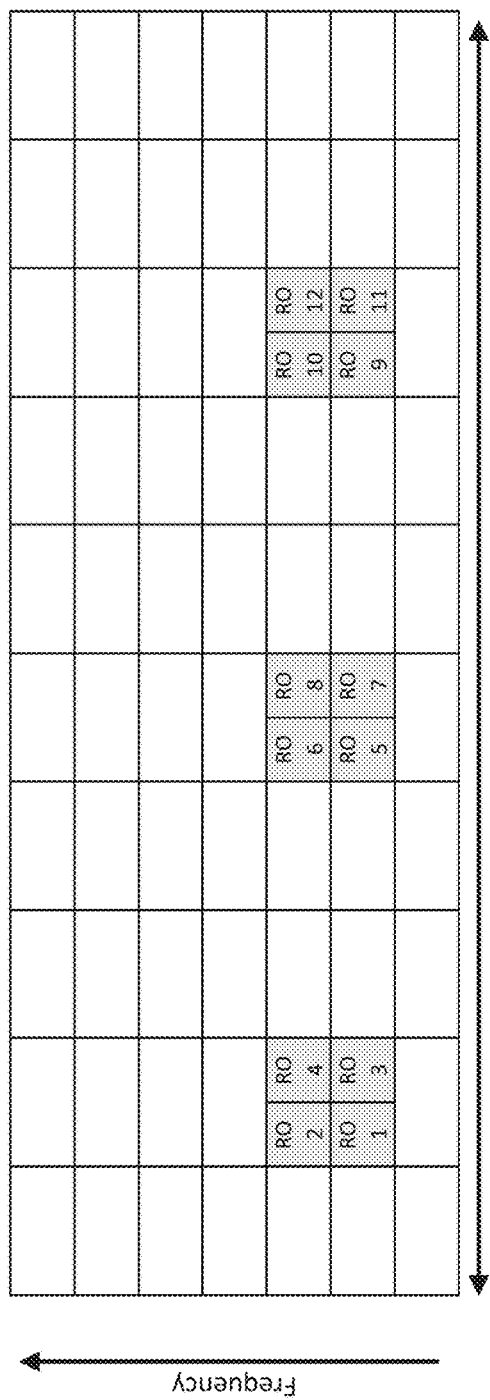
FIGS. 8A and 8B illustrate configuration RACH occasions according to various embodiments of the present disclosure.
Figure 8B:
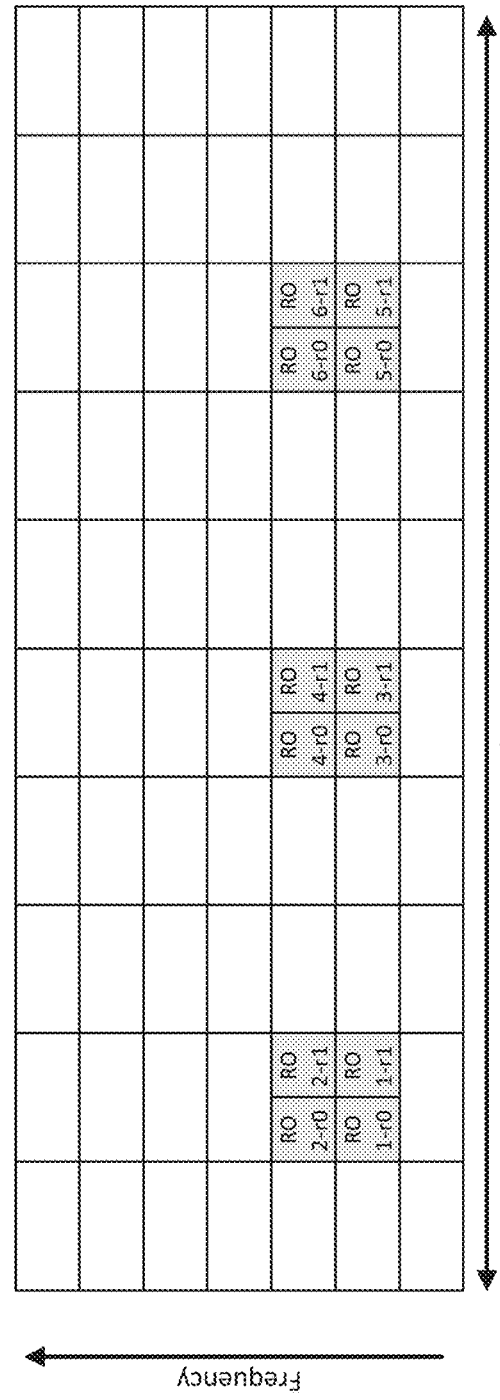

FIGS. 8A and 8B illustrate configuration RACH occasions according to various embodiments of the present disclosure. FIG. 8A illustrates an example of an original NR Rel-15 configuration ROs. FIG. 8B illustrates an example of reusing original NR Rel-15 configuration ROs for each PRACH transmission with repetitions equal to two. FIGS. 8A and 8B can be an example of the time/frequency allocation (RO) for PRACH repetitions described herein.

As shown in FIG. 8B, an original NR Rel-15 configuration RO for PRACH transmission can be reused. In the example shown in FIG. 8B, the number of repetitions is equal to two. In other words, the original NR Rel-15 configuration RO is reused once for two total repetitions. In FIG. 8B, RO 1-r0 refers to the RO for the first repetition of PRACH transmission number 1, RO 1-r1 refers to the RO for the second repetition of PRACH transmission number 1,

```
NR-Light-valid-Downlink-slotBitmap ::=      SEQUENCE {
    referenceSubcarrierSpacing                  SubcarrierSpacing,
    DLslotPattern                               BIT STRING (SIZE ( maxNrofSlots)),
                                                    OPTIONAL, -- Need R
    }
NR-Light-valid-Uplink-slotBitmap ::=         SEQUENCE {
    referenceSubcarrierSpacing                  SubcarrierSpacing,
    ULslotPattern                               BIT STRING (SIZE ( maxNrofSlots)),
                                                    OPTIONAL, -- Need R
    }
```

RO 2-r0 refers to the RO for the first repetition of PRACH transmission number 2, and so on.

In another embodiment of time/frequency allocation (RACH occasion) for PRACH repetitions, the frequency domain configuration of ROs remains as in Rel-15 and new/additional time-domain resources are introduced to increase a number of available ROs. New/additional time-domain resources can be introduced by more SFNs carrying ROs within a PRACH configuration period (that is, further/multiple y values in the equation "n_SFN mod x=y"), more subframes/slots within an SFN that include ROs, more RACH slots within a subframe/slot that includes Ros, more TDMed ROs with a RACH slot, or by time-domain RO resources being configurable by higher layers and new rows introduced as the configuration index (256 values, 8 bits in Rel-15) provided by SIB/RRC to indicate a Table row is increased to also indicate new rows. New/additional time-domain resources can also be based on an offset and repetition of existing ROs in the time-domain. Then, only an offset/repetition value needs to be configured/indicated to a UE by a serving gNB in order for the UE to identify the new/additional resources. For example, for a configuration period of 80 msec (8 radio frames) and with an offset value of 4-SFN, all time-domain ROs from an SFN=0 is replicated to SFN=4 (to provide 2 times more ROs). Similar examples can be generated to replicate RO configurations to new subframes/slots, RACH slots, and so on. New/additional time-domain resources can be introduced by PRACH/RO repetitions being restricted to a subset of RACH (time) configurations. For example, "dense" RACH configurations may not support replications of RACH occasions. This can be supported by a gNB 102 implementation.

Figure 9A:
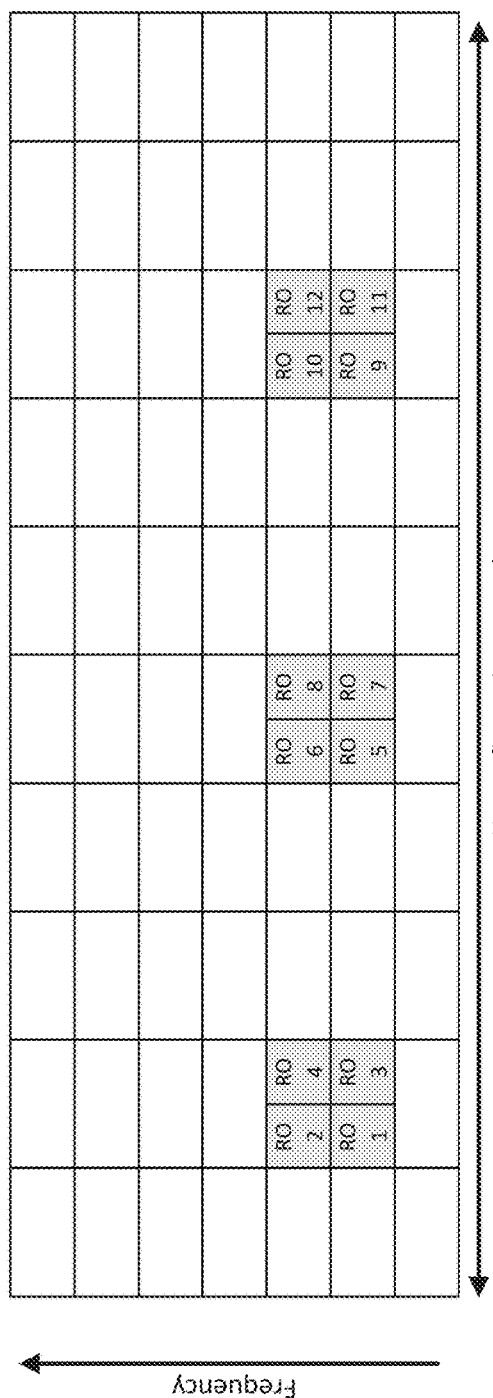
FIGS. 9A and 9B illustrate configuration RACH occasions according to various embodiments of the present disclosure.
Figure 9B:
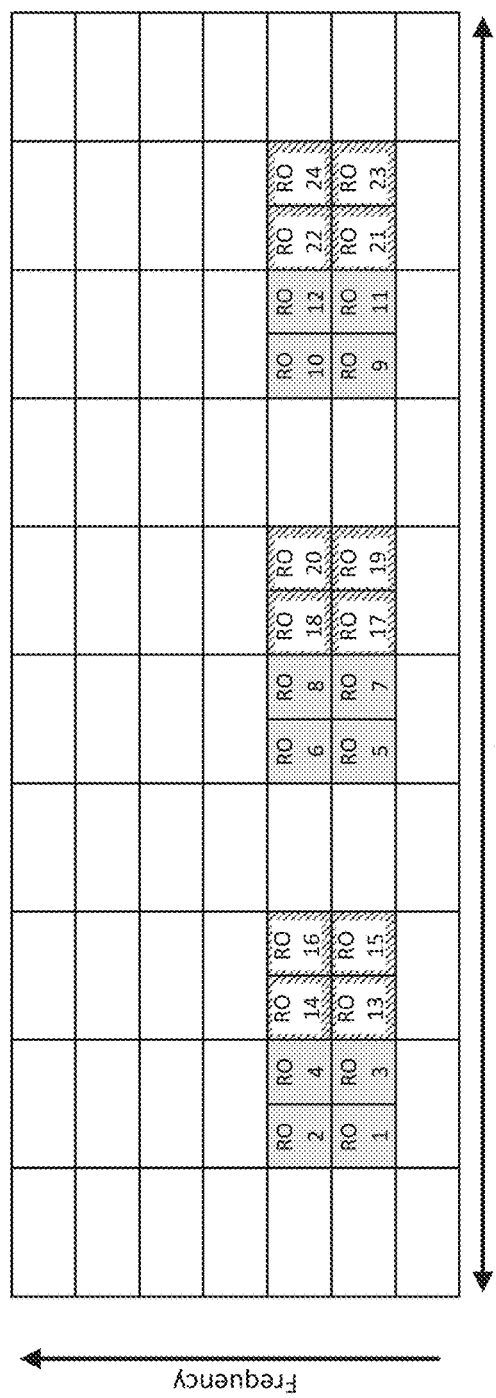

FIGS. 9A and 9B illustrate configuration RACH occasions according to various embodiments of the present disclosure. FIG. 9A illustrates an example of an original NR Rel-15 configuration ROs. FIG. 9B illustrates an example of extending an original NR Rel-15 configuration ROs in time for PRACH transmission. FIGS. 9A and 9B can be an example of new/additional time-domain resources being introduced to increase a number of available ROs as described herein.

As shown in FIG. 9B, the original NR Rel-15 configuration ROs can be extended in time for PRACH transmission. In the example shown in FIG. 9B, the number of repetitions is equal to two. In other words, the original NR Rel-15 configuration RO is extended once for two total repetitions. In FIG. 9B, ROs 14-16, 17-20, and 21-24, which are depicted with shading, are extended ROs for PRACH repetition.

In another embodiment of time/frequency allocation (RACH occasion) for PRACH repetitions, time-domain configuration of ROs can remain as in NR Rel-15 and new/additional frequency-domain resources can be introduced to increase the number of available ROs. For example, the number of FDMed ROs can increase. In NR Rel-15, RRC signaling can indicate one of {1, 2, 4, 8} FDMed ROs. Additional values, such as [16, 24, 32, 48, 64] can be added to the set for NR-Light UEs. The number can be based on how many repetitions are considered and/or on the CE level and/or UE power class. In another example, multiple non-consecutive groups/blocks of frequency domain resources for RO in (e.g., to enable/consistent with frequency hopping) can be introduced. For example, between two and four groups/blocks of FDMed ROs can be introduced in the frequency-domain. The number of groups/blocks of FDMed ROs can be based on how many repetitions are considered, based on the CE level, and/or based on UE power class. The offset among the groups/blocks can be specified in the system operation or can be provided by higher layers such as a SIB. For example, the offset can be in the unit of a PRB in a reference numerology/SCS such as the PRACH numerology, or the active/initial UL BWP (or DL BWP) numerology, or a reference numerology such as 15 kHz for FR1 and 60 kHz for FR2. When there are multiple RO blocks/groups in the frequency-domain, the offset can be the same for all blocks/groups so that a single offset value can be determined or each block can have a different configurable offset, for example, relative to a last PRB of a block/group with a next smaller index.

The configuration of additional ROs in the frequency domain, for example FDMed adjacently to existing ROs in the frequency domain or in multiple non-adjacent frequency blocks, can depend on the operating frequency range/band and/or the supported UE bandwidth. The PRACH design is Rel-15 supports long preamble formats with a bandwidth of 6 or 24 PRBs (in reference 15 kHz SCS), i.e., a bandwidth of about 1 MHz or 4.3 MHz, and supports short preambles with 12 PRBs (in any SCS 15/30/60/120 kHz), i.e., a bandwidth of about 2.1 or 4.3 MHz for FR1 and about 8.6 or 17.2 MHz for FR2. In one example, the number of FDMed preambles and/or multiple chunks/groups of FDMed preambles can depend on the available or reduced bandwidth of an NR-Light UE (e.g., at least that for the initial UL BWP). In another example, the number of FDMed preambles and/or multiple chunks/groups of FDMed preambles can be different for FR1 versus FR2 and/or can be band or band combination dependent. In another example, the minimum NR-Light UE BW is large enough (e.g. 10 MHz for FR1, 50 MHz for FR2), which could avoid any restrictions on the number of FDMed preambles and/or multiple chunks/groups of FDMed preambles. In this embodiment, PRACH repetitions can avoid frequency domain repetition if needed or required. The frequency domain increase can help create additional ROs to accommodate the number of necessary ROs to cover all SSBs, regardless of the method for associating repetitions to time/frequency resources.

FIGS. 10A and 10B illustrate configuration RACH occasions according to various embodiments of the present disclosure. FIG. 10A illustrates an example of an original NR Rel-15 configuration ROs. FIG. 10B illustrates an example of extending an original NR Rel-15 configuration ROs in frequency for PRACH transmission. FIGS. 10A and 10B can be an example of new/additional time-domain resources being introduced to increase a number of available ROs as described herein.

As shown in FIG. 10B, the original NR Rel-15 configuration ROs can be extended in frequency for PRACH transmission. In the example shown in FIG. 10B, the number of repetitions is equal to two. In other words, the original NR Rel-15 configuration RO is extended once for two total repetitions. In FIG. 10B, ROs 14-16, 17-20, and 21-24, which are depicted with shading, are extended ROs for PRACH repetition.

In another embodiment of time/frequency allocation (RACH occasion) for PRACH repetitions, both time-domain and frequency-domain new/additional resources are introduced to increase the number of available ROs.

Figure 11A:
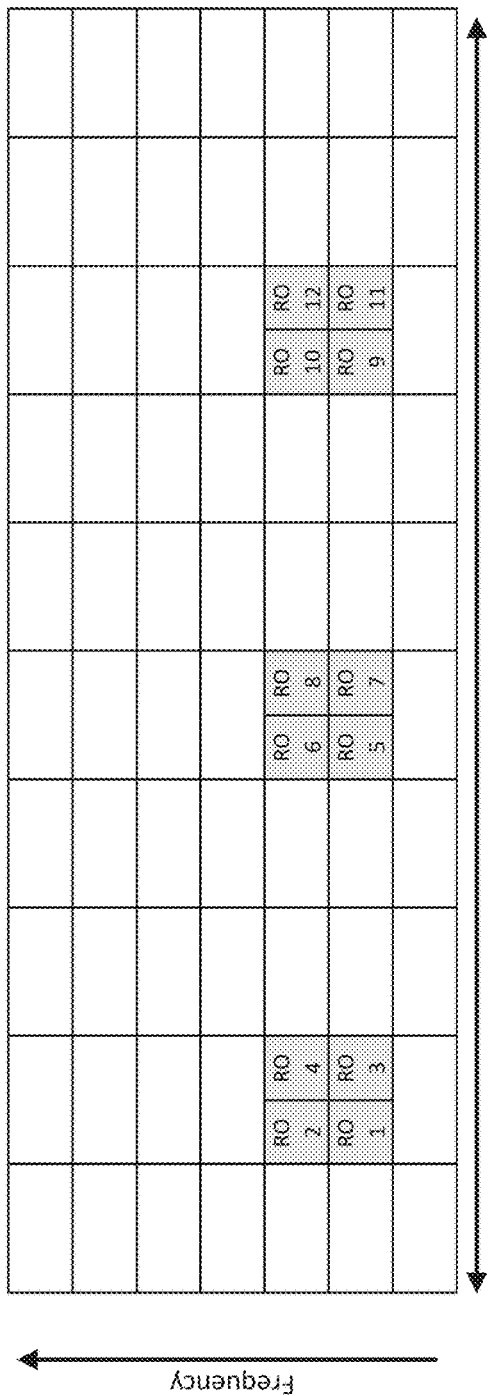
FIGS. 11A and 11B illustrate configuration RACH occasions according to various embodiments of the present disclosure.
Figure 11B:
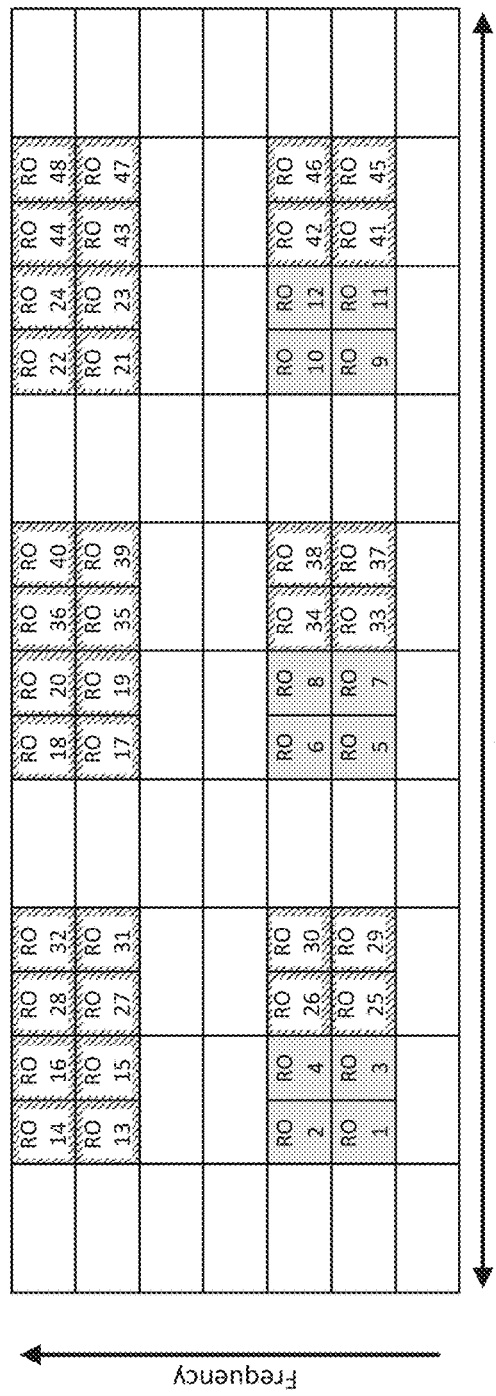

FIGS. 11A and 11B illustrate configuration RACH occasions according to various embodiments of the present disclosure. FIG. 11A illustrates an example of an original NR Rel-15 configuration ROs. FIG. 11B illustrates an example of extending an original NR Rel-15 configuration RACH occasions (ROs) in both time and frequency for PRACH transmission. FIGS. 11A and 11B can be an example of new/additional time-domain resources being introduced to increase a number of available ROs as described herein.

As shown in FIG. 11B, the original NR Rel-15 configuration ROs can be extended in both time and frequency for PRACH transmission. In the example shown in FIG. 11B, the number of repetitions is equal to four. In other words, the original NR Rel-15 configuration RO is extended three times for four total repetitions. In FIG. 11B, ROs 13-46, which are depicted with shading, are extended ROs for PRACH repetition.

In another embodiment of time/frequency allocation (RACH occasion) for PRACH repetitions, for certain PRACH configurations, the existing PRACH (time/frequency) configurations can be used and for certain other PRACH (time) configurations, new/additional PRACH (time/frequency) configurations can be introduced. For example, as described in FIGS. 8A and 8B, the PRACH time/frequency configurations can remain the same and as described in FIG. 9A-11B, new or additional PRACH time/frequency configurations can be introduced.

In some embodiments, there can be multiple ways to distinguish between existing ROs and additional/"extended"/replicated ROs, so that, for example, RO additions/extensions/replications are only usable or visible for NR-Light UEs, but not for legacy UEs. For example, there can be additional fields in a SIB that are visible only by NR-Light UEs, such as an NR-Light SIB or a SIB-Light that is scheduled by PDCCH monitored by NR-Light UEs. In another example, the UE can use Rel-15 CORESET(s) but apply a different RNTI (e.g., L-RNTI) for the DCI scheduling the NR-Light SIB. In yet another example, a SIB-Light may include, in addition to information regarding RO additions/extensions/replications, also information regarding RSRP ranges, CE levels, number of repetitions, and so on.

In some embodiments, for time/frequency resources for PRACH transmission corresponding to different number of repetitions, various considerations are taken into account. For example, time/frequency resources for PRACH transmission with a first number of repetitions (e.g., 2 repetitions) can have an arbitrary overlap in size and location (including no overlap) with time/frequency resources for PRACH transmission with a second number of repetitions (e.g., 4 repetitions). In another example, time/frequency resources for PRACH transmission with different number of repetitions have a "nested" or "scalable" structure, so that, e.g., time/frequency resources for PRACH transmission with a smaller number of repetitions (e.g., 2 repetitions) is a subset of time/frequency resources for PRACH transmission with a larger number of repetitions (e.g., 4 repetitions).

In some embodiments, for each PRACH attempt of an NR-Light UE 116, all repetitions of a PRACH preamble occur in NR-Light-valid ROs that are consecutive in time-domain and FDMed ROs are skipped for repetitions, regardless of whether or not new/additional RO resources are introduced in time domain and/or frequency domain. In one example, PRACH repetitions may span in TDMed ROs within a RACH slot. In another example, PRACH repetitions cannot occur on TDMed ROs within a slot and only occur in different RACH slots. In yet another example, mapping of a same SSB index to different preambles or different frequency resources can be ignored or skipped. As an enhancement, for each PRACH attempt of an NR-Light UE 116, all repetitions of a PRACH preamble can occur in all/any NR-Light-valid ROs, so that FDMed ROs can also be used for repetitions. In one example, repetitions can occur in non-consecutive FDMed ROs, such as in FDMed ROs that are separated by at least [N] PRBs in a reference numerology. Repetitions that occur in non-consecutive FDMed ROs can have advantages, such as when an NR-Light UE 116 operates in unlicensed bands.

Various embodiments of the present disclosure provide a preamble and SSB association for PRACH repetition. The preamble and SSB association for PRACH repetition can be used to enhance transmissions of PRACH preambles for NR-Light UEs.

In some embodiments, for each PRACH attempt of an NR-Light UE, all repetitions of a PRACH preamble are associated with a same DL RS (e.g., a same SS/PBCH block or a same CSI-RS resource).

In some embodiments, for PRACH repetition for an NR-Light UE, a number N of SS/PBCH blocks can be associated with one PRACH occasion. A number R of contention based preambles per SS/PBCH block per valid PRACH occasion by ssb-perRACH-OccasionAndCB-PreamblesPerSSB depends on the RSRP range, CE level, and/or the UE power class. A motivation can be that only a subset of UEs may need support for the largest coverage enhancement and therefore few preambles may need to be reserved. (N, R)—or only one of N or R—can be indicated by the SIB for every CE level identified by a corresponding RSRP range.

In some embodiments, a SIB can indicate a pair (N, R) for each RSRP range (CE level). For example, a SIB can indicate a number (N0,R0) for CE level 0, and a number (N1,R1) for CE level 1, and so on. In other embodiments, a SIB can indicate only one of N or R per RSRP range (CE level), such as the value of N. For example, a SIB can indicate N0 for RSRP range 0, and N1 for RSRP range 1. In some embodiments, the other parameter (such as R) can be same across all RSRP ranges/CE levels such as one single R value can be configured for both RSRP range/CE level 0 and RSRP range/CE level 1. In other embodiments, the other parameter (such as R) is configured only for a reference RSRP range/CE level, such as only a R0 value for RSRP range/CE level 0, and the UE determines the R value for other RSRP ranges/CE levels based on a predetermined rule such as a value R1 for CE level 1 being equal to R0/2. In this manner, a UE can be configured with a single pool of SSBs and preambles, but the UE can only access a fraction of the pool in each RSRP range/CE level.

In some embodiments, a new configuration is not provided compared to NR Rel-15 but the configured values are considered to apply only for a reference CE level such as CE level 0 with N0=N and R0=R. Values of (N, R) for other CE levels can be computed based on the configured values and a specified rule such as (N1, R1) for CE level 1 is determined as N1=N0=N and R1=R0/2=R/2.

The (N, R) values can further depend on a UE power class. A $N_{preamble}^{total}$ value provided by a higher layer parameter totalNumberOfRA-Preambles may depend on the RSRP range (CE level) and/or the UE power class. For example, separate $N_{preamble}^{total}$ values can be provided by higher layer signaling for RSRP range 0 and RSRP range 1. Alternatively, a single $N_{preamble}^{total}$ value can be provided for a reference RSRP range, such as RSRP range 0, and a value $N_{preamble}^{total}$ for RSRP range 1 can be determined from the value for RSRP range 0 and another configuration or a predetermined rule. The embodiments and examples provided herein can apply to contention-based random access (CBRA) and at least SSB-based beam failure recovery (link recovery). In one example, for random access triggered for SI request, the UE can be configured a separate PRACH configuration or can use the configuration with which the UE established RRC connection.

Figure 12:
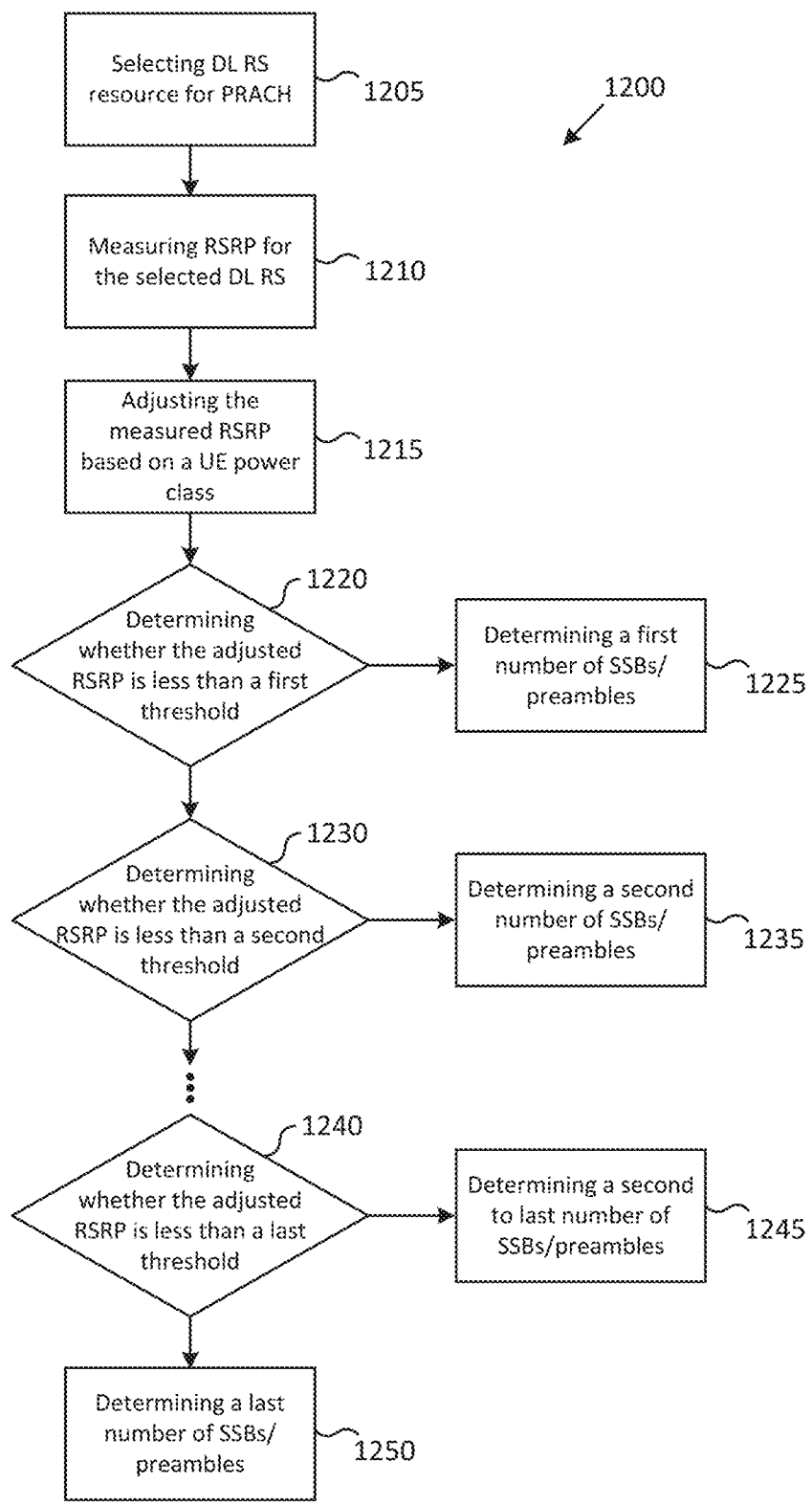
FIG. 12 illustrates a method of determining a number of SSBs and/or preambles according to various embodiments of the present disclosure.

FIG. 12 illustrates a method of determining a number of SSBs and/or preambles according to various embodiments of the present disclosure. In particular, FIG. 12 illustrates a method of determining a number of SSBs per RO and/or a number of preambles per SSB and per RO based on RSRP range/CE level and UE power class according to various embodiments of the present disclosure. Although described herein as being implemented by the UE 116, the method 1200 illustrated in FIG. 12 can be implemented by one or more of the UEs 111-116 and a corresponding method can be performed by one or more of the gNBs 101-103 described in FIG. 1. Other embodiments can be used without departing from the scope of the present disclosure.

In operation 1205, a UE, such as the UE 116, selects a DL RS resource for PRACH transmission. For example, the DL RS resource can be an SSB or a CSI-RS. In operation 1210, the UE 116 measures the RSRP for the selected DL RS resource.

In operation 1215, the UE 116 adjusts the measured RSRP value based on the UE power class. For example, the UE 116 can adjust the measured RSRP value based on a difference of the UE power class with a reference UE power class. In operation 1220, the UE 116 compares the adjusted RSRP with a first threshold. The first threshold can be indicated by an SIB or configured by RRC. If the UE 116 determines the adjusted RSRP is less than the first threshold, the UE 116 proceeds to operation 1225. If the UE 116 determines the adjusted RSRP is not less than the first threshold, the UE 116 proceeds to operation 1230.

In operation 1225, based on the UE 116 determining the adjusted RSRP is less than the first threshold, the UE 116 determines a first number of SSBs per RO and/or a first number of CB preambles per SSB per RO for a PRACH transmission. In operation 1230, based on the UE 116 determining the adjusted RSRP is not less than the first threshold, the UE 116 compares the adjusted RSRP with a second threshold. The second threshold can be indicated by an SIB or configured by RRC. If the UE 116 determines the adjusted RSRP is less than the second threshold, the UE 116 proceeds to operation 1235. If the UE 116 determines the adjusted RSRP is not less than the second threshold, the UE 116 proceeds to operation 1240.

In operation 1235, based on the UE 116 determining the adjusted RSRP is less than the second threshold, the UE 116 determines a second number of SSBs per RO and/or a second number of CB preambles per SSB per RO for a PRACH transmission. Based on the UE 116 determining the adjusted RSRP is not less than the second threshold, the UE 116 continues a same procedure until the UE 116 reaches a last threshold. For example, the UE 116 can compare the adjusted RSRP with any suitable number of thresholds. Although described herein as a first threshold, second threshold, and last threshold, the UE 116 can compare the adjusted RSRP with more or fewer than three thresholds without departing from the scope of the present disclosure.

In operation 1240, the UE 116 compares the adjusted RSRP with a last threshold. If the UE 116 determines the adjusted RSRP is less than the last threshold, the UE 116 proceeds to operation 1245. If the UE 116 determines the adjusted RSRP is not less than the last threshold, the UE 116 proceeds to operation 1250.

In operation 1245, based on the UE 116 determining the adjusted RSRP is less than the last threshold, the UE 116 determines a second to last number of number of SSBs per RO and/or a second to last number of CB preambles per SSB per RO for a PRACH transmission. In operation 1250, based on the UE 116 determining the adjusted RSRP is not less than the last threshold, the UE 116 determines a last number of number of SSBs per RO and/or a last number of CB preambles per SSB per RO for a PRACH transmission.

In some embodiments, for repetitions of PRACH associated with CSI-RS resource for an NR-Light UE, different options for RO association can be used: For example, the list of ROs as indicated by RRC parameter ra-OccasionList includes PRACH repetition associated with a CSI-RS index indicated by csi-RS. In another example, the list of ROs as indicated by RRC parameter ra-OccasionList includes PRACH repetition associated with a CSI-RS index indicated by csi-RS. In another example, the list of ROs as indicated by RRC parameter ra-OccasionList remain as in Rel-15 and does not include PRACH repetition associated with a CSI-RS index indicated by csi-RS. In this example, ROs for repetitions of a PRACH associated with a CSI-RS resource are determined based on a predetermined rule that is captured in the system specifications. For PRACH associated with CSI-RS resources, the next available PRACH occasion can be selected uniformly at random from among the PRACH occasions occurring simultaneously but on different subcarriers (i.e., FDMed), corresponding to the selected CSI-RS. For selection of ROs for repetitions of a PRACH, a same or similar method can be repeated in multiple consecutive NR-Light-valid TDMed ROs from the set of ROs associated with the indicated CSI-RS. In other words, a first RO for a first repetition of PRACH can be selected uniformly at random from among a first in time available set of PRACH occasions occurring simultaneously but on different subcarriers (i.e., FDMed), and a second RO for a second repetition of PRACH can be selected uniformly at random from among a second in time available set of PRACH occasions occurring simultaneously but on different subcarriers (i.e., FDMed), and so on.

In some embodiments, a UE type distinction can be made based on a PRACH configuration. For example, a PRACH configuration can be used to distinguish a UE-type. A PRACH configuration can include a configuration for one or more of PRACH preambles, RACH occasions, PUSCH occasions (in case of 2-step RACH), and DL RS associated with PRACH transmission. A configuration can be by UE-common higher layer signaling, including by a MIB or a SIB, or a UE-specific higher layer signaling. A UE-type can include a type/category or a set/group of types/categories for UEs with a predetermined or higher layer indicated set of features, such as a legacy UE type of Rel-15/16 UEs, or a reduced-capability (RedCap) UE type for example with smaller bandwidth/number of antennas/UE power class, such as NR-Light UEs.

In some embodiments, a first UE of a first UE-type can be configured with a first PRACH configuration, such as one or more of a first set of PRACH preambles, a first set of RACH occasions, a first set of PUSCH occasions for 2-step RACH, and a first set of DL RS resources for PRACH transmission. A second UE of a second UE-type can be configured with a second PRACH configuration, such as one or more of a second set of PRACH preambles, a second set of RACH occasions, a second set of PUSCH occasions for 2-step RACH, and a second set of DL RS resources for PRACH transmission. The first UE-type and second UE-type can be different, the first PRACH configuration and the second PRACH configuration can be different, and in both PRACH configurations, at least one of the respective first sets and one of the respective second sets are different.

For example, a legacy UE can use a first set of preambles while a reduced-capability UE/NR-Light UE can use a second, different set of preambles. In another example, a legacy UE can use a first set of PRACH occasions in time and/or frequency while a reduced-capability UE/NR-Light UE can use a second, different set of PRACH occasions, or PUSCH occasions for 2-step RACH, in time and/or frequency.

By using UEs configured with different PRACH configurations, the gNB 102 or network can identify and distinguish UEs from different types. For example, a legacy UE can be distinguished from a non-legacy UE, reduced-capability UE, or NR-Light UE. The gNB 102 can later use the identification for transmission of a PDSCH providing a random access response (RAR) to multiplex RARs for UEs of a same type, for example, only legacy UEs or only non-legacy UEs, reduced-capability UEs, or NR-Light UEs. In one example, a SIB can provide separate PRACH preambles for legacy/Rel-16 UEs compared to PRACH preambles for non-legacy UEs, reduced-capability UEs, or NR-Light UEs so that the gNB 102 can identify the UE type and avoid mixing the two UE types in a same Msg2 PDSCH.

In some embodiments, UE measurements can be linked to a configuration of resources for PRACH. For example, a UE 116 can be provided, by higher layers including by a SIB, a mapping between a number of two or more PRACH configurations and a number of DL RS measurement ranges. A DL RS can be an SSB or a CSI-RS resource associated with PRACH and a measurement can be a physical layer (L1) or a filtered L3 measurement such as RSRP, RSRQ, RSSI, SNR, SINR, and so on. For example, SIB can provide an SSB RSRP threshold, such that all UEs or all UEs within a UE-type/category whose SSB RSRP measurement exceed the SIB-indicated threshold use a first PRACH configuration, for example a first set of PRACH preambles or a first set of ROs and/or POs, while all other UEs or all other UEs within a UE-type/category whose SSB RSRP measurement does not exceed the SIB-indicated threshold use a second, different PRACH configuration, for example a second set of PRACH preambles or a second set of ROs and/or POs, which are different from the respective first set(s). For example, the first PRACH configuration(s) can be same as a PRACH configuration for legacy UEs. Therefore, only some of the non-legacy UEs with a stronger channel link quality above a threshold can coexist with legacy UEs on PRACH resources and non-legacy UEs with a channel link quality below the threshold can have separate PRACH resources, thereby enabling a serving gNB to provide enhanced coverage, such as for a PDSCH transmission providing random access responses, only for a subset of non-legacy UEs. In one example, a link between UE measurements and a configuration of resources for PRACH can be same as a link that defines CE levels based on UE measurements. In this example, a PRACH configuration for NR-Light UEs/RedCap UEs can be CE-level specific, and correspondingly, the gNB multiplexes RARs for multiple UEs with a same CE level.

In some embodiments, multiple considerations can be made for association of PRACH repetitions with SSBs, at least for CBRA/SI-request/beam failure recovery. In one embodiment, SSBs can be mapped to or associated with valid ROs as in Rel-15 NR (preambles first, then FMDed ROs, then TDMed ROs within a PRACH slot, then PRACH slots) regardless of whether or not an RO belongs to a Rel-15 NR PRACH configuration or to an extended NR Rel-15 PRACH configuration, either implicitly or explicitly. This can result in a different SSB-to-RO association between legacy UEs and NR-Light UEs. For example, when an Rel-15 NR PRACH configuration is extended in frequency or time, the ROs in the Rel-15 NR PRACH configuration, which are also shared with the "extended" PRACH configuration, can map to different SSBs when used under the Rel-15 PRACH configuration than when used under the extended PRACH configuration because the SSB-to-RO association rule remains the same. The choice of SSBs used for repetitions may depend on a number of repetitions, a number of RACH slots, or a number of FDMed ROs. Therefore, for a gNB 102 to use a correct SSB when handling PRACH in a given RO, the gNB should be aware of a corresponding type for a UE 116 transmitting a PRACH, such as a Rel-15 NR UE or NR-Light UE. Also, for the NR-Light UE, the gNB 102 is aware of a corresponding RSRP range/CE level and/or PRACH repetition value since the associated SSB can change for a given RO for different RSRP ranges/CE levels.

In this embodiment, consecutive in time domain ROs can map to different SSBs. Therefore, a UE may not be able to simultaneously confirm that the UE uses consecutive in time domain ROs and that all PRACH repetitions for a given PRACH preamble attempt correspond to a same SSB. For example, when a same SSB is associated with all repetitions of a PRACH preamble transmission, then non-consecutive in time-domain ROs are used.

FIGS. 13A and 13B illustrate configuration RACH occasions according to various embodiments of the present disclosure. FIG. 13A illustrates an example of an original NR Rel-15 configuration ROs. FIG. 13B illustrates an example of extended configuration ROs in time with two repetitions. FIGS. 13A and 13B can be an example of SSBs being mapped with valid ROs as described herein.

FIG. 13A illustrates SSB-to-RO association for an original NR Rel-15 configuration of RACH occasions (ROs). The SSB-to-RO association in FIG. 13A considers six actually transmitted SSBs and ½ SSB per RO. In other words, one SSB maps to two ROs. FIG. 13B illustrates SSB-to-RO association for an extended configuration of ROs in time with a number of repetitions equal to two. The shaded ROs, illustrated as shaded SSBs 1-6, refer to extended ROs for PRACH repetition. In FIG. 13B, the SSB-to-RO association rule is maintained as in Rel-15 regardless of RO repetitions so that a same original RO can map to different SSBs in the original configuration compared with the extended configuration.

Figure 14A:
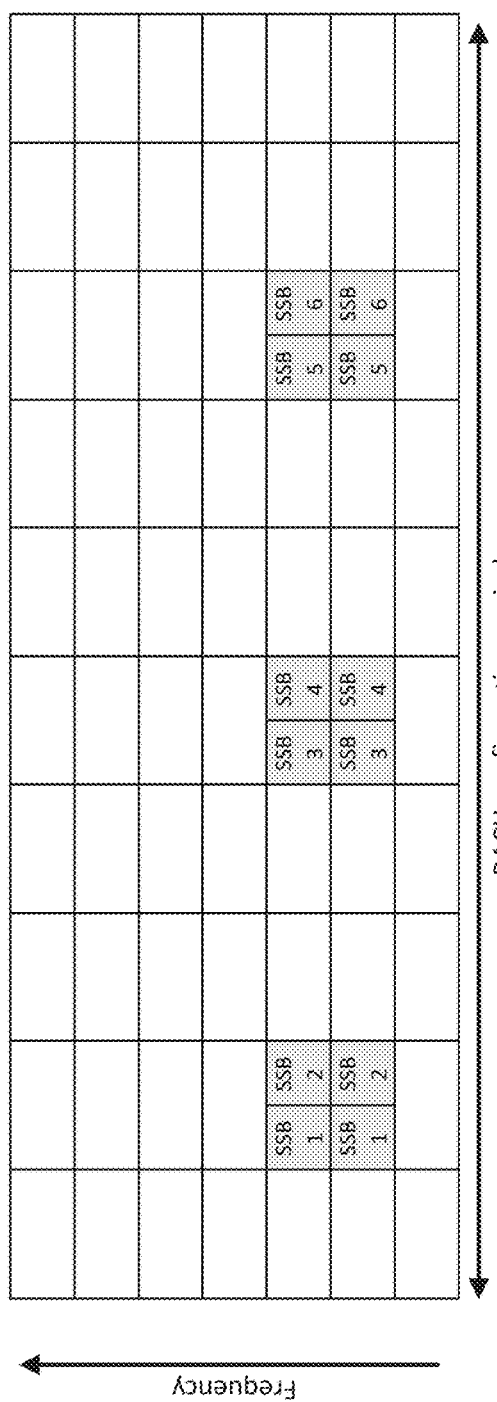
FIGS. 14A and 14B illustrate configuration RACH occasions according to various embodiments of the present disclosure.
Figure 14B:
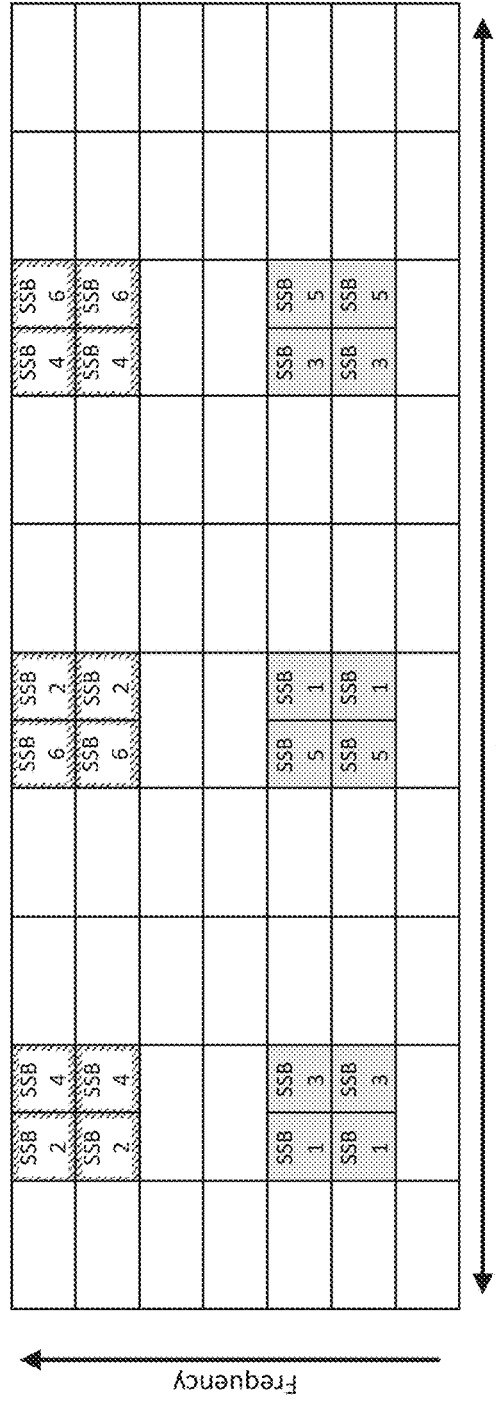

FIGS. 14A and 14B illustrate configuration RACH occasions according to various embodiments of the present disclosure. FIG. 14A illustrates an example of an original NR Rel-15 configuration ROs. FIG. 14B illustrates an example of extended configuration ROs in frequency with two repetitions. FIGS. 14A and 14B can be an example of SSBs being mapped with valid ROs as described herein.

FIG. 14A illustrates SSB-to-RO association for an original NR Rel-15 configuration of RACH occasions (ROs). The SSB-to-RO association in FIG. 14A considers six actually transmitted SSBs and ½ SSB per RO. In other words, one SSB maps to two ROs. FIG. 14B illustrates SSB-to-RO association for an extended configuration of ROs in frequency with a number of repetitions equal to two. The shaded ROs, illustrated as shaded SSBs 2, 4, and 6, refer to extended ROs for PRACH repetition. In FIG. 14B, the SSB-to-RO association rule is maintained as in Rel-15 regardless of RO repetitions so that a same original RO can map to different SSBs in the original configuration compared with the extended configuration.

In another embodiment of association of PRACH repetitions with SSBs, at least for CBRA/SI-request/beam failure recovery, when a Rel-15 PRACH configuration is extended in time and/or frequency domains to accommodate PRACH repetitions, the 3GPP NR Rel-15 SSB-to-RO association rule, which is preambles first, then FMDed ROs, then TDMed ROs within a PRACH slot, then PRACH slots, can be maintained for the original ROs in the Rel-15 PRACH configuration. For the extended, additional, or replicated ROs within the PRACH configuration, the same SSBs can be assigned as in the corresponding original RO. Therefore, any extended, additional, or replicated RO is discarded/ignored when associating/mapping SSBs to ROs. Accordingly, the Rel-15 rule for SSB-to-RO association is not followed when the entire set of ROs within the extended PRACH configuration is considered. When a Rel-15 NR PRACH configuration is extended in frequency and/or time, the ROs in the original PRACH configuration, which are also shared with the "extended" PRACH configuration, are mapped to the same SSBs when used under the Rel-15 PRACH configuration and when used under the extended PRACH configuration. Then, the gNB 102 does not need to consider the UE type, such as Rel-15 NR UE or NR-Light UE or, for the NR-Light UE, the corresponding RSRP range/CE level and/or PRACH repetition value because the associated SSBs are the same for a fixed or given original RO.

FIGS. 15A and 15B illustrate configuration RACH occasions according to various embodiments of the present disclosure. FIG. 15A illustrates an example of an original NR Rel-15 configuration ROs. FIG. 15B illustrates an example of extended configuration ROs in time with two repetitions. FIGS. 15A and 15B can be an example of the NR Rel-15 configuration rule being maintained for original ROs and being ignored for extended ROs as described herein.

FIG. 15A illustrates SSB-to-RO association for an original NR Rel-15 configuration of RACH occasions ROs. The SSB-to-RO association in FIG. 15A considers six actually transmitted SSBs and ½ SSB per RO. In other words, one SSB maps to two ROs. FIG. 15B illustrates SSB-to-RO association for an extended configuration of ROs in time with a number of repetitions equal to two. The shaded ROs, illustrated as shaded SSBs 1-6, refer to extended ROs for PRACH repetition. In FIG. 15B, the NR Rel-15 SSB-to-RO association rule is applied only to original ROs and then an SSB associated with an original RO is associated to corresponding extended RO, so that a same original RO and corresponding extended ROs map to same SSBs in the original configuration and the extended configuration.

Figure 16A:
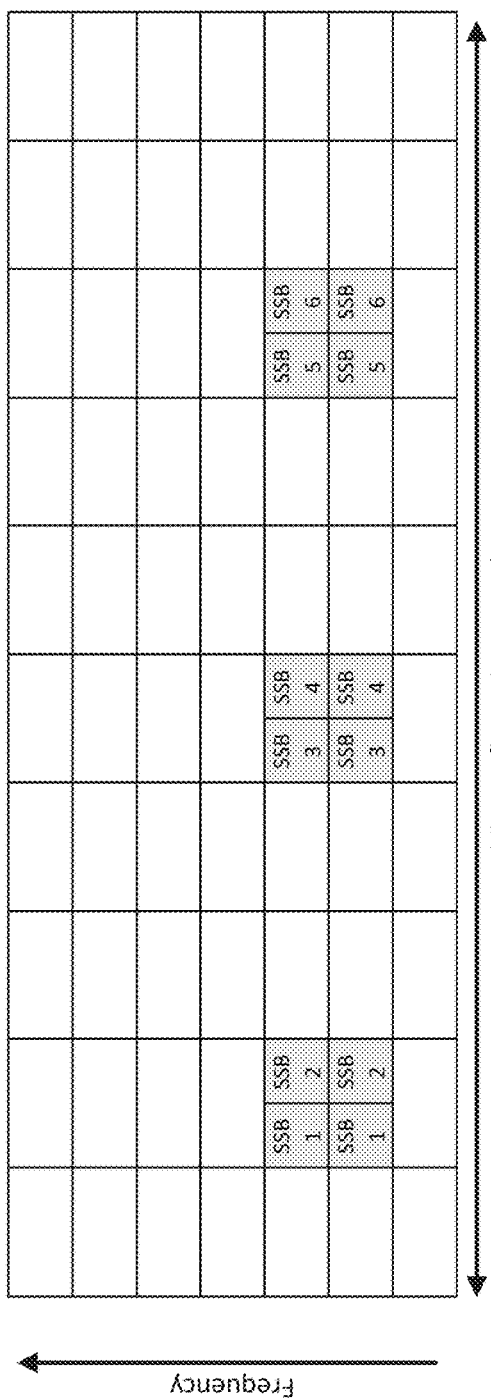
FIGS. 16A and 16B illustrate configuration RACH occasions according to various embodiments of the present disclosure.
Figure 16B:
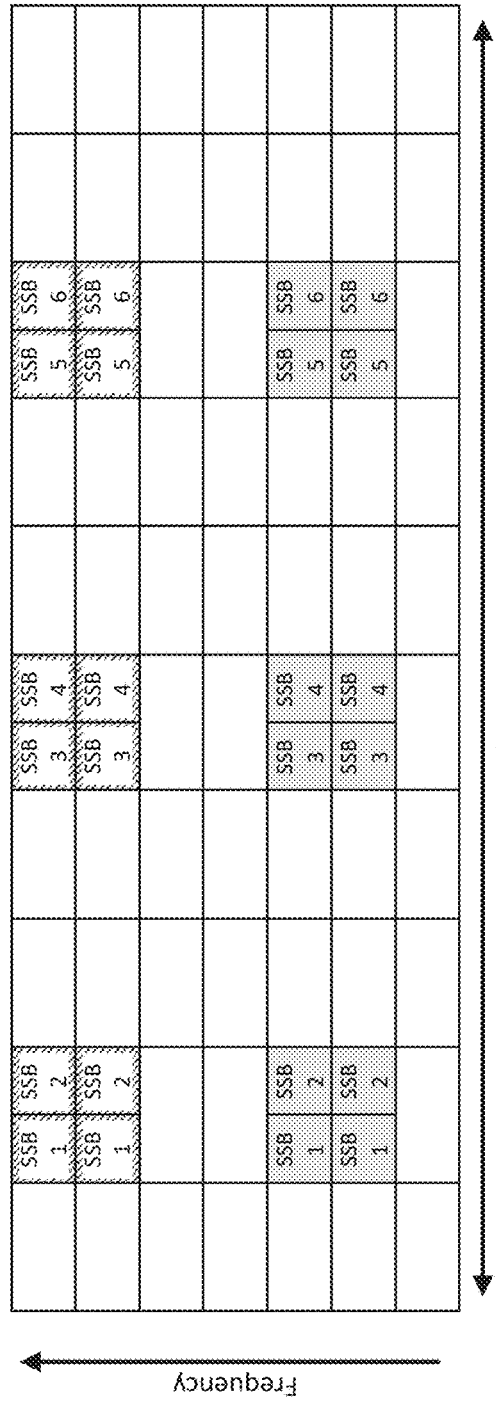

FIGS. 16A and 16B illustrate configuration RACH occasions according to various embodiments of the present disclosure. FIG. 16A illustrates an example of an original NR Rel-15 configuration ROs. FIG. 16B illustrates an example of extended configuration ROs in frequency with two repetitions. FIGS. 16A and 16B can be an example of the NR Rel-15 configuration rule being maintained for original ROs and being ignored for extended ROs as described herein.

FIG. 16A illustrates SSB-to-RO association for an original NR Rel-15 configuration of RACH occasions ROs. The SSB-to-RO association in FIG. 16A considers six actually transmitted SSBs and ½ SSB per RO. In other words, one SSB maps to two ROs. FIG. 16B illustrates SSB-to-RO association for an extended configuration of ROs in frequency with a number of repetitions equal to two. The shaded ROs, illustrated as shaded SSBs 1-6, refer to extended ROs for PRACH repetition. In FIG. 16B, the NR Rel-15 SSB-to-RO association rule is applied only to original ROs and then an SSB associated with an original RO is associated to corresponding extended RO, so that a same original RO and corresponding extended ROs map to same SSBs in the original configuration and the extended configuration.

In some embodiments, for the multiple considerations can be made for association of PRACH repetitions with SSBs, at least for CBRA/SI-request/beam failure recovery described herein, similar considerations can be made when SSBs are replaced with CSI-RS resources.

In some embodiments, for each PRACH attempt of an NR-Light UE, a same set of preambles are associated with ROs that are extensions/repetitions of an original RO, such as a Rel-15 NR RO, in a PRACH configuration, at least for the case of PRACH configuration extension and at least when the Rel-15 NR SSB-to-RO association rule is only applied to the original ROs in the PRACH configuration.

Various embodiments of the present disclosure provide an SSB association pattern or period for PRACH repetitions. The SSB association pattern or period for PRACH repetitions can be used to enhance transmissions of PRACH preambles for NR-Light UEs.

In some embodiments, an SSB association period, during which each actually transmitted SSB is mapped at least once to an NR-Light-valid RO, is defined in case of repetitions for a PRACH transmission. The mapping uses several considerations.

In one embodiment, SSBs are mapped to the entire set of ROs within a PRACH configuration regardless of whether or not the ROs correspond to a Rel-15 NR PRACH configuration or whether they correspond to PRACH repetitions. Additionally, all PRACH repetitions are mapped to same SSBs. When all PRACH repetitions are mapped to the same SSBs and PRACH repetitions skip or discard FDMed ROs and only use TDMed ROs, an association period of length 160 msec or less (as used in NR Rel-15) may not always be accommodated such as for example when a number of PRACH repetitions is large. For example, for an operation in FR2 and for a PRACH configuration period equal to 160 msec (x=16 in the PRACH equation n_SFN mod x=y), a number of TDMed ROs may be as few as 16 (format A3/B3, index 238), or 20 (format B4, index 113), or 30 (format C2, index 174, or format A2, index 30, or format A2/B2, index 221). However, in FR2, a number of actually transmitted SSBs can be large, such as up to 64 and mapping all SSBs in few TDMed ROs may be infeasible. Therefore, multiple consecutive periods of length 160 msec can be linked to form an association period or the limit on the length of the association period can be increased, such as to 240 msec. Additionally or alternatively, a mapping can be defined from a pair of PRACH configuration period & PRACH repetition number to a set of numbers for PRACH configuration periods that define the SSB association period. The set of number may be also updated, for example to include entries such as {1,2,4,8,16,32} or {1,2,4,8,16,32,64}. In addition, the mapping can further depend on the RSRP range/CE level and/or the UE power class.

For example, SSBs can be mapped N>=1 times in an association period and PRACH repetitions can be associated with an SSB index as long as they are TDM. In addition, there can be an association pattern that repeats several times depending on the PRACH configuration, up to or including once every 160 msec. In another example, PRACH repetitions can occur in an association pattern and there may be constraints in the total number of PRACH repetitions within 160 msec, e.g., for FR2 (when there are many SSBs). In yet another example, if the minimum number of TDM repetitions for a given large number of SSBs is not a specified/configure value, e.g., 10 (for a e.g., 10 dB CE), an association pattern for PRACH repetitions can link 160 msec periods. In another example, such a linkage is not needed.

In this embodiment, a constraint can be considered on how much NR-light-valid configurations can limit the available slots for repetitions of PRACH transmission and so prolong an association period. In one example, system specification ensures a constraint, for example no more than [N] NR-Light-invalid slots during [M] slots/radio frames and so on, so that an SSB association period remains equal to 160 msec as in Rel-15 or a new specified value. In another example, setting such a constraint and/or how to ensure the length of an SSB association period is left to gNB implementation.

In another embodiment, when SSBs are mapped only to Rel-15 NR ROs and do not map to extensions/repetitions that accommodate PRACH repetitions, the SSB association period can be defined in terms of the SSB mapping to the Rel-15 NR ROs. Therefore, the same numbers for SSB association period as in NR Rel-15 can be re-used. In this embodiment, the association period can remain within the 160 msec period as in NR Rel-15.

In another embodiment, for repetitions of a CFRA/BFR PRACH associated with CSI-RS, the indexing of the PRACH occasions (e.g., as indicated by ra-OccasionList) may be reset per association pattern period as in Rel-15 or may be reset per extended/linked/combined SSB association period(s).

Various embodiments of the present disclosure provide repetition of the PDCCH order. The repetition of the PDCCH order can be used to enhance transmissions of PRACH preambles for NR-Light UEs.

In some embodiments, for a PDCCH-ordered PRACH transmission, a number of reserved bits of a DCI format providing a PDCCH order that triggers a PRACH transmission, such as a number of 2 or 3 bits from 10 reserved bits, can be used to indicate a number of repetitions for the PRACH transmission from a set of specified or SIB-indicated/RRC configured numbers. The number of repetitions for the PRACH transmission indicated by the DCI format overrides/overwrites a SIB-indicated/RRC configured number. The set of numbers for repetitions of a PRACH transmission can be same for all RSRP ranges/CE levels or different sets can be specified or configured for different RSRP ranges/CE levels. The UE power class can also be included in determining a RSRP range/CE level that can be defined relative to a reference UE power class as previously described. When a set of numbers for repetition of PRACH is the same for all RSRP ranges, an indication for a number of repetitions of a PRACH transmission can be relative to a predetermined RSRP range, such as a first RSRP range, and be adjusted, such as increased, for other RSRP ranges according to a rule. For example, for a second RSRP range that is 6 dB smaller than a first RSRP range, an actual number of repetitions for a PRACH transmission can be four times larger than the one indicated by a corresponding PDCCH order. Regardless of whether or not a number of repetitions is the same or different among different RSRP ranges/CE levels/UE power class, a set of repetition numbers can be fixed in the specifications or a set of numbers can be in terms of several fractions, for example {Y/8, Y/4, Y/2, Y} for the case of 2-bit field, of a configured maximum repetition number [Y], where [Y] can be same or different among different RSRP ranges/CE levels/UE power class, as discussed herein. In another example, a fixed value such as '00' or '000' of the field in PDCCH order indicating number of repetitions for PRACH can be reserved to indicate no overriding or overwriting of the SIB/RRC indicated value for number of repetitions for PRACH. In this example, the other values of this field, which can be used to indicate several numbers for PRACH repetition or several fractions (e.g., {Y/4, Y/2, Y} for the case of 2-bit field, of a configured maximum repetition number [Y], where [Y] can be same or different among different RSRP ranges/CE levels/UE power class, as discussed herein.

In another embodiment, for a PDCCH-ordered PRACH transmission, a PRACH mask field in a DCI format providing an associated PDCCH order indicates a RO for a first repetition of the PRACH transmission and for remaining repetitions. In one example, the PRACH mask field in the PDCCH order indicates only the RO for the first repetition of PRACH transmission while ROs for remaining repetitions are determined based on a rule, such as using consecutive "NR-light valid slots", or next TDMed ROs that are mapped to a same SSB as the first RO, and so on. In another example, the PRACH mask field in the PDCCH order can indicate ROs for all repetitions of the PRACH transmission, for example using a modified/extended table. When the modified table includes more entries, a larger number of bits, such as 5 or 6 bits instead of the 4 bits in Rel-15 NR, can be used for the PRACH mask field in the PDCCH order.

In another embodiment, for PRACH triggered by PDCCH order, the indexing, and reset thereof, of ROs for a PRACH triggered by PDCCH order is related to the SSB-to-RO association period. For example, the indexing of ROs, for example as indicated by the mask index value in the PDCCH order, applies to all ROs regardless of whether or not an RO is an original RO from NR Rel-15 or an RO is an additional, replicated, or extended RO to accommodate repetitions of PRACH transmission. In this example, the indexing for ROs can be reset per mapping cycle of consecutive PRACH occasions per SS/PBCH block index as in NR Rel-15 or per SSB association period as in Rel-15 or per extended, linked, or combined SSB association periods. As another example, the indexing of ROs, for example as indicated by the mask index value in the PDCCH order, applies only to the original ROs as defined in NR Rel-15 and does not apply to extensions, replications, or additions of ROs that are intended for repetitions of PRACH. In this example, the indexing for ROs is reset per mapping cycle of consecutive PRACH occasions per SS/PBCH block index as in NR Rel-15.

The various embodiments of repetition of the PDCCH order are shown in Table 3 below.

TABLE 3

| DCI format flag | NUL/SUL indicator | FDRA variable size | Preamble index | SSB index | PRACH mask index | Number of repetitions for PRACH | Reserved bits |
|---|---|---|---|---|---|---|---|
| 1 bit | 1 bit | | 6 bits | 6 bits | 4 bits (5 bits) | 2 bits | 10 bits 8 bits (7 bits) |

Various embodiments of the present disclosure provide details of a PRACH sequence or structure design for NR-Light UEs. The PRACH sequence or structure design for NR-Light UEs can be used to enhance transmissions of PRACH preambles for NR-Light UEs.

In some embodiments, a new PRACH design and/or structure is considered to avoid increasing a collision probability when a number of UEs accessing a serving gNB can be large. For example, compared to Rel-15 NR PRACH design, new preambles corresponding to new root sequences and/or new cyclic shifts/zero CorrolationZone can be additionally supported. In other embodiments, longer sequences for PRACH preambles can be supported. In another example, features of the Rel-15 NR PRACH design can be limited or disabled for NR-Light UEs. This may also depend on the operating carrier frequency as it relates to a corresponding frequency range such as FR1 or FR2. For example, a number of FDMed ROs can be limited to $\{1, 2, 4\}$ or $\{1, 2\}$ compared to the NR Rel-15 values of $\{1, 2, 4, 8\}$ or may be disabled, such as disabling FDM of ROs for NR-Light UEs, due to limited/reduced UE bandwidth capability. In another example, the selection of preamble format and/or preamble SCS may be linked to the RSRP range/CE level. For example, in FR1, both short and long preamble formats may be used for a first RSRP range/CE level, but only the long preamble may be used for a second RSRP range/CE level, wherein the second RSRP range is lower than the first RSRP range or equivalently, the second CE level is larger/higher than the first CE level. In one example, for coverage recovery and/or enhancement, the UE 116 can transmit a PRACH preamble with repetition in time so that a same PRACH preamble sequence is repeated in multiple time-domain symbols. A number of symbols for repetition can be provided by UE-common signaling, including by a SIB, or by UE-specific signaling, separately or jointly with some other PRACH configuration parameters. A number of symbols for repetition can be based on one or more of CE level, RSRP range, UE power class, and PRACH preamble format/SCS/sequence.

Various embodiments of the present disclosure provide PRACH transmission power for a NR-Light UE. PRACH transmission power for a NR-Light UE can be used to enhance transmissions of PRACH preambles for NR-Light UEs.

In some embodiments, for a largest PRACH CE level (lowest RSRP range), a UE sets $P_{PRACH}(i)$ to $P_{CMAX,c}(i)$. The CE level (RSRP range) determination can also be adjusted based on the UE power class as previously described. For other CE levels, a UE determines a transmission power for a physical random access channel (PRACH) transmission, $P_{PRACH,b,f,c}(i)$, on active UL BWP b of carrier f of serving cell c based on DL RS for serving cell c in transmission occasion i as $P_{PRACH,b,f,c}(i) = \min\{P_{CMAX,f,c}(i), P_{PRACH,target,f,c} + PL_{b,f,c}\}$ [dBm]. For example, the value of target received power for PRACH preamble can depend on one or more of RSRP range, CE level, and/or UE power class.

In some embodiments, transmission power-control related parameters can depend on the CE level and/or the UE power class. In one example, a power ramping step size and/or a power ramping counter for Msg1/MsgA PRACH and/or Msg3/MsgA PUSCH can depend on the CE level and/or the UE power class. In another example, a cell-specific open-loop component of a Msg3/MsgA PUSCH transmission power is an offset, such as the NR Rel-15 delta_preamble as defined in Tables 4 and 5, reproduced from TS 38.321 Rel-15 V15.6.0, or a 2-step-RACH variant thereof, relative to preamble received target power. The offset value can depend on the RSRP range/CE level and/or the UE power class.

Table 4 shows DELTA_PREAMBLE values for long preamble formats.

TABLE 4

| Preamble Format | DELTA_PREAMBLE values |
|---|---|
| 0 | 0 dB |
| 1 | −3 dB |
| 2 | −6 dB |
| 3 | 0 dB |

Table 5 shows DELTA-PREAMBLE values for short preamble formats. In Table 5, $\mu$ is the sub-carrier spacing configuration determined by msg1-SubcarrierSpacing and Table 4.2-1 in [TS 38.211], and the preamble formats are given by prach-ConfigurationIndex and Tables 6.3.3.2-2 and 6.3.3.2-3 in [TS 38.211].

TABLE 5

| Preamble Format | DELTA_PREAMBLE values (dB) |
|---|---|
| A1 | $8 + 3 \times \mu$ |
| A2 | $5 + 3 \times \mu$ |
| A3 | $3 + 3 \times \mu$ |
| B1 | $8 + 3 \times \mu$ |
| B2 | $5 + 3 \times \mu$ |
| B3 | $3 + 3 \times \mu$ |
| B4 | $3 \times \mu$ |
| C0 | $11 + 3 \times \mu$ |
| C2 | $5 + 3 \times \mu$ |

Embodiments of the present disclosure recognize and take into consideration that an element for improving a detection/miss probability at a serving gNB for a PRACH transmission from a NR-Light UE or a low-capability UE is to increase a SINR for the PRACH reception at the gNB. Embodiments of the present disclosure recognize that one approach to increase the SINR is by repeating the PRACH transmission in multiple occasions. Such repetitions can increase a probability of correct detection by the gNB of the PRACH preamble or to reduce a collision probability among a large number of NR-Light UEs as well as other coexisting UEs, such as "legacy" Rel-15 UEs. A reduced collision probability for PRACH transmissions or an increased probability of a detection for a PRACH transmission at a gNB results to faster (initial) access, connection setup, UL synchronization, and so on.

Embodiments of the present disclosure recognize and take into consideration that use of repetitions for a PRACH transmission is considered in LTE MTC (e.g., LTE Rel-13) to improve coverage. However, embodiments of the present disclosure recognize that the PRACH transmissions are omni-directional. In 3GPP NR Rel-15, such as for operation in frequency range 2 (FR2), DL/UL transmissions including a PRACH transmission are beamformed and can use different spatial transmission filters corresponding to DL/UL RS resources, such as same quasi-collocation (QCL) properties with a DL resource. In particular, NR Rel-15 specifies the UE behavior for association of RACH occasions (ROs) with PRACH preambles and DL RS resources (SSB or CSI-RS). However, embodiments of the present disclosure recognize that use of repetitions for a PRACH transmission is not supported in NR Rel-15. Furthermore, NR Rel-16 considers 2-step RACH in addition to 4-step RACH. However, PRACH transmission with repetitions is not considered for 2-step RACH in NR Rel-16.

Various embodiments of the present disclosure address challenges considering PRACH repetitions in a beamforming-based operation or with a 2-step RACH procedure, such as whether PRACH repetitions can correspond to different spatial filters/beam/precoders, how to select between 4-step RACH and 2-step RACH for PRACH repetitions, and how to perform repetitions for a 2-step RACH procedure. In some embodiments, other than UL coverage enhancement due to lower UE power class, PRACH repetitions can be utilized for faster beam management.

Embodiments of the present disclosure address the above issues and provide additional design aspects for supporting a PRACH transmission with repetitions, for supporting a random access procedure where associated messages are transmitted with repetitions and provide solutions discussed below. For example, various embodiments provide methods for repetition of a PRACH transmission including: PRACH repetition groups, where each group is associated with a different DL-RS and can be further associated, possibly along with a DL-RS cycling operation; PRACH repetition groups, where each group is associated with a different precoder, and can be further associated possibly along with a precoder cycling operation; ese of CSI-RS as a DL-RS for a PRACH transmission initiated by PDCCH order; criteria for selection of PRACH mode procedure type (2-step versus 4-step) for a PRACH transmission with repetitions, such as e.g., based on RSRP range/CE level/UE power class/UE capability; methods for repetitions in a 2-step RACH mode procedure, such as e.g., in terms of repetitions of ROs and PUSCH occasions (POs); and rules for deciding whether to drop PRACH versus other overlapping UL transmissions. Additionally, while certain embodiments may refer to NR-Light UE or RedCap UEs with reduced capability, cost, and/or complexity compared to legacy UEs, at least some of examples above can be also applicable, instead/in addition to NR-Light UEs/RedCap UEs, to any type of UE including, for example, UEs with the same, similar, or more capabilities compared to legacy UEs that seek coverage or ability enhancements for fast beam management, etc.

As used herein, unless otherwise explicitly mentioned, higher layer signaling refers to either UE-common RRC signaling provided by a SIB), such as a SIB1, or UE-specific RRC signaling. As used herein, an association between a DL RS, such as a SSB or a CSI-RS, and a PRACH preamble is with respect to QCL properties or a transmission configuration indicator (TCI) state.

Various embodiments of the present disclosure provide cycling DL RS associated with PRACH repetitions. Cycling DL RS associated with PRACH repetitions can be used to enhance transmissions of PRACH preambles for NR-Light UEs. As described herein, cycling DL RS associated with PRACH repetitions can enhance the transmission of a PRACH preamble for NR-Light UEs according to various embodiments of the present disclosure.

For each PRACH attempt by a UE, for example the UE 116, repetitions of a PRACH preamble transmission can be categorized in multiple groups such as PRACH repetition groups. Each PRACH repetition group is associated with a same DL RS, such as a same SS/PBCH block or a same CSI-RS resource, while different groups can be associated with a different DL RS, such as a different SS/PBCH block or a different CSI-RS resource. A benefit of such association can be in terms of improved spatial diversity for repetitions of a PRACH preamble transmission because the UE 116 can transmit a PRACH preamble using one or more different SSBs/CSI-RS resources irrespective of PRACH slot counts and FDMed/TDMed ROs. For example, an association of SSBs with groups of PRACH repetitions/ROs can depend on a configuration of serving cell/active BWP, an RSRP range/CE level or a number of repetitions for the PRACH transmission, the PRACH attempt counter index, and the UE power class.

In one embodiment, a DL-RS cycling for repetitions of a PRACH transmission as described herein can be applied when the UE 116 detects multiple SSBs. For example, a DL-RS cycling pattern for PRACH repetitions is with respect to the multiple detected SSBs. For example, the UE 116 can be configured with a first number $N_1$ PRACH repetitions associated with a first detected SSB and a second number $N_2$ PRACH repetitions associated with a second detected SSB. As another example, a total number N of PRACH repetitions can be configured and the UE 116 performs a first number $\alpha_1 \cdot N$ of PRACH repetitions associated with a first detected SSB and a second number $\alpha_2 \cdot N$ of PRACH repetitions associated with a second detected SSB, with $\alpha_1+\alpha_2=1$. In one example, $\alpha_1$ and $\alpha_2$ are fixed in the system specifications, such as $\alpha_1=\alpha_2=\frac{1}{2}$. In another example, $\alpha_1$ and $\alpha_2$ are indicated by higher layers.

In another embodiment, a UE applies DL-RS cycling for repetitions of a PRACH transmission even when the UE detects only one SSB. According to this example, higher layers can provide to the UE additional TCI states for the UE to transmit PRACH and repetitions of a PRACH transmission can be mapped to different SSBs/TCI states. For example, the UE can be configured a first number of $N_1$ repetitions associated with a detected SSB, a second number of $N_2$ repetitions associated with a first TCI state/QCL properties, and a third number of $N_3$ repetitions associated with a second TCI state/QCL properties. Alternatively, a total/maximum number N of PRACH repetitions can be configured, and the UE can perform $\alpha_1 \cdot N$ PRACH repetitions associated with a detected SSB, $\alpha_2 \cdot N$ PRACH repetitions associated with a first TCI state/QCL properties, and $\alpha_3 \cdot N$ PRACH repetitions associated with a second TCI state/QCL properties, with $\alpha_1+\alpha_2+\alpha_3=1$. In one example, $\alpha_1$, $\alpha_2$ and $\alpha_3$ are fixed in the system specifications, such as $\alpha_1=\alpha_2=\alpha_3=\frac{1}{3}$. In another example, $\alpha_1$, $\alpha_2$ and $\alpha_3$ are provided by higher layers. In some of these examples, some of the additional TCI state(s) can be QCL'ed with a detected SSB and/or an actually transmitted SSB, while in other examples, some of the additional TCI state(s) can be not QCL'ed with a detected SSB and/or an actually transmitted SSB.

Figure 17:
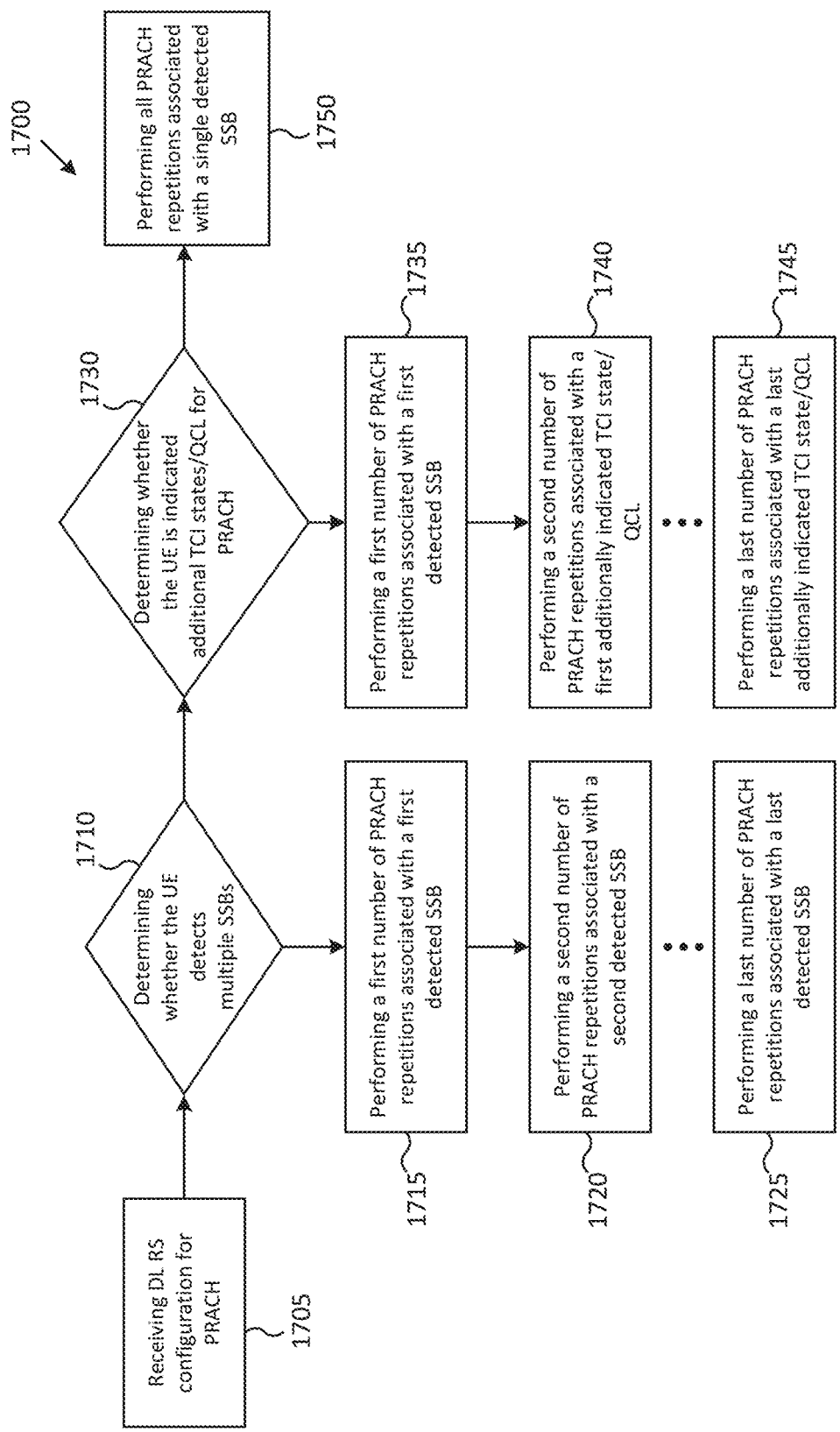
FIG. 17 illustrates a method of determining PRACH repetition groups according to various embodiments of the present disclosure.

FIG. 17 illustrates a method of determining PRACH repetition groups according to various embodiments of the present disclosure. In particular, FIG. 17 illustrates a method of determining PRACH repetition groups based on multiple detected SSBs or additionally indicated TCI states/QCL according to various embodiments of the present disclosure. Although described herein as being implemented by the UE 116, the method 1700 illustrated in FIG. 17 can be implemented by one or more of the UEs 111-116 and a corresponding method can be performed by one or more of the gNBs 101-103 described in FIG. 1. Other embodiments can be used without departing from the scope of the present disclosure.

In operation 1705, a UE, such as the UE 116, receives a configuration for DL RS for association with a PRACH transmission. In operation 1710, the UE 116 measures the configured DL RS and determines a number of detected DL RS/SSBs. The UE 116 can determine how many DL RS/SSBs are detected based on a measured RPRP being larger than a RSRP threshold provided by higher layers. If multiple SSBs are detected, the UE 116 can proceed to operation 1715. If multiple SSBs are not detected, the UE 116 can proceed to operation 1730.

In operation 1715, based on the UE 116 detecting multiple SSBs, the UE 116 performs a first number of PRACH repetitions associated with a first detected SSB. In operation 1720, the UE 116 performs a second number of PRACH repetitions associated with a second detected SSB. The UE 116 can perform any suitable number of PRACH repetitions associated with the detected SSBs, corresponding to the number of SSBs detected in operation 1710. In operation 1725, the UE 116 performs a last number of PRACH repetitions associated with the last SSB detected in operation 1710.

In operation 1730, based on the UE 116 not detecting multiple SSBs in operation 1710, the UE 116 determines whether additional TCI states/QCL properties for PRACH are indicated to the UE 116. If additional TCI states/QCL properties are indicated to the UE 116, the UE 116 proceeds to operation 1735. If additional TCI states/QCL properties are not indicated to the UE 116, the UE 116 proceeds to operation 1750.

In operation 1735, based on the UE 116 receiving an indication for additional TCI states/QCL, the UE 116 performs a first number of PRACH repetitions associated with a first detected SSB. In operation 1740, the UE 116 performs a second number of PRACH repetitions associated with a first additionally associated TCI state/QCL properties. The UE 116 can perform any suitable number of PRACH repetitions associated with additionally associated TCI states/QCLs, corresponding to the associated TCI state/QCL properties detected in operation 1730. In operation 1745, the UE 116 performs a last number of PRACH repetitions associated with a last additionally associated TCI state/QCL properties.

In operation 1750, based on the UE 116 detecting only a single SSB and not receiving an indication by higher layers for any TCI states/QCL, the UE 116 performs all PRACH repetitions associated with the single detected SSB.

In some embodiments, the UE 116 can determine PRACH groups associated with both multiple detected DL RS/SSBs as well as one or multiple TCI states/QCL properties provided by higher layers. In some embodiments, PRACH repetition groups can be with respect to one or more CSI-RS resources instead of or in addition to one or multiple SSB(s).

In some embodiments, a number of repetitions associated of a PRACH transmission associated with a DL-RS in a DL-RS cycling pattern, such as values $N_1$, $N_2$, $\alpha_1$, and/or $\alpha_2$, can depend on an RSRP range/CE level, the UE power class, and/or so on. According to these examples, the RSRP range/CE level can be determined based on a first detected DL RS, or based on a default/indicated DL RS/TCI state. In one example, when a PRACH transmission is associated with multiple DL RS resources and/or one or multiple indicated TCI states, an RSRP range is determined with respect to a DL RS/TCI state with a lowest/highest index. In another example, a number of repetitions for each repetition group is determined based on an RSRP range corresponding to a DL RS or an indicated TCI state for that PRACH repetition group. For example, there is a mapping between a set of RSRP ranges and a set of parameters for DL-RS cycling pattern such as a set of values for $N_1$, $N_2$, $\alpha_1$, and/or $\alpha_2$.

In one example, the UE 116 can apply a DL-RS cycling pattern for repetitions of a PRACH transmission when a total, across all associated DL-RS, number of repetitions for a PRACH transmission is larger than a threshold. In some embodiments, the threshold can in be fixed in the system specifications. In other embodiments, the threshold can be provided by higher layer signaling.

In some embodiments, groups of repetitions according to different RS resources can be applied to other DL transmissions and UL transmissions other than PRACH, for example, PUSCH, PUCCH, PDSCH, and PDCCH. In some embodiments, UL-RS, such a sounding reference signal (SRS) can be used for repetition groups such that RS cycling is with respect to one or both of DL-RS cycling and UL-RS cycling.

In some embodiments, for each PRACH transmission by the UE 116, either before the RRC_CONNECTED state, after the RRC_CONNECTED state, or both, the UE 116 can transmit different groups of PRACH preamble repetitions using different precoders for an associated SSB. Transmitting different groups of PRACH preamble repetitions using different precoders for an associated SSB provides a generation or use of narrower beams to potentially achieve, on average, fewer PRACH repetitions, at least when a maximum number of PRACH repetitions is relatively large. Such a method can be considered as precoded PRACH transmission and/or codebook-based PRACH transmission.

For example, multiple precoders can be explicitly specified or indicated to the UE 116 by higher layers from among a set of precoders that are defined in the system specification, for example, a subset, superset, or same set as a set of precoders provided in the system specifications for codebook-based PUSCH. The UE 116 can select one precoder per group of PRACH repetitions and continue with a different precoder for a next group of PRACH repetitions in a predetermined order, such as a sequential precoder cycling. As another example, the UE 116 can select a precoder based on various guidelines, such as in order of RSRP/pathloss measurements for multiple precoders associated with respective multiple SSBs. The set of precoders can be based on or mapped to DL RS resources/beams, such as ones for pathloss or RRM measurements, for which the UE 116 has available measurements so that the UE 116 can select the precoders based on an decreasing order of RSRP or an increasing order of pathloss. Quality thresholds, such as Q_in and Q_out, can also be used in the selection similarly to those for PRACH and RLM/RLF/BFR.

A UE can apply precoder cycling or codebook-based operation also for other UL/DL transmission such as PDCCH. In some embodiments, a precoder for repetitions of a PDCCH that schedules a PDSCH providing a RAR can be determined from precoders for repetitions of a PRACH transmission associated with the RAR. At least when a DL beam and an UL beam are same, and accordingly have beam reciprocity—same QCL properties, a precoder for all or a group of repetitions of a PDCCH transmission can be the same as a precoder used for all or a group of repetitions for a corresponding PRACH preamble transmission. When there is no beam reciprocity, each repetition or group of repetitions of a PDCCH transmission can apply a different precoder and the UE 116 can cycle among a set of specified precoders or a subset of precoders indicated by higher layers for different PDCCH repetitions or repetition groups. Further, each PDCCH repetition or group of PDCCH repetitions can apply a precoder from a set of specified precoders or a subset of precoders indicated by higher layers in decreasing order of RSRP or increasing order of pathloss when such measurements are available to the UE 116. The particular scheme can be indicated to the UE by higher layers.

Figure 18:
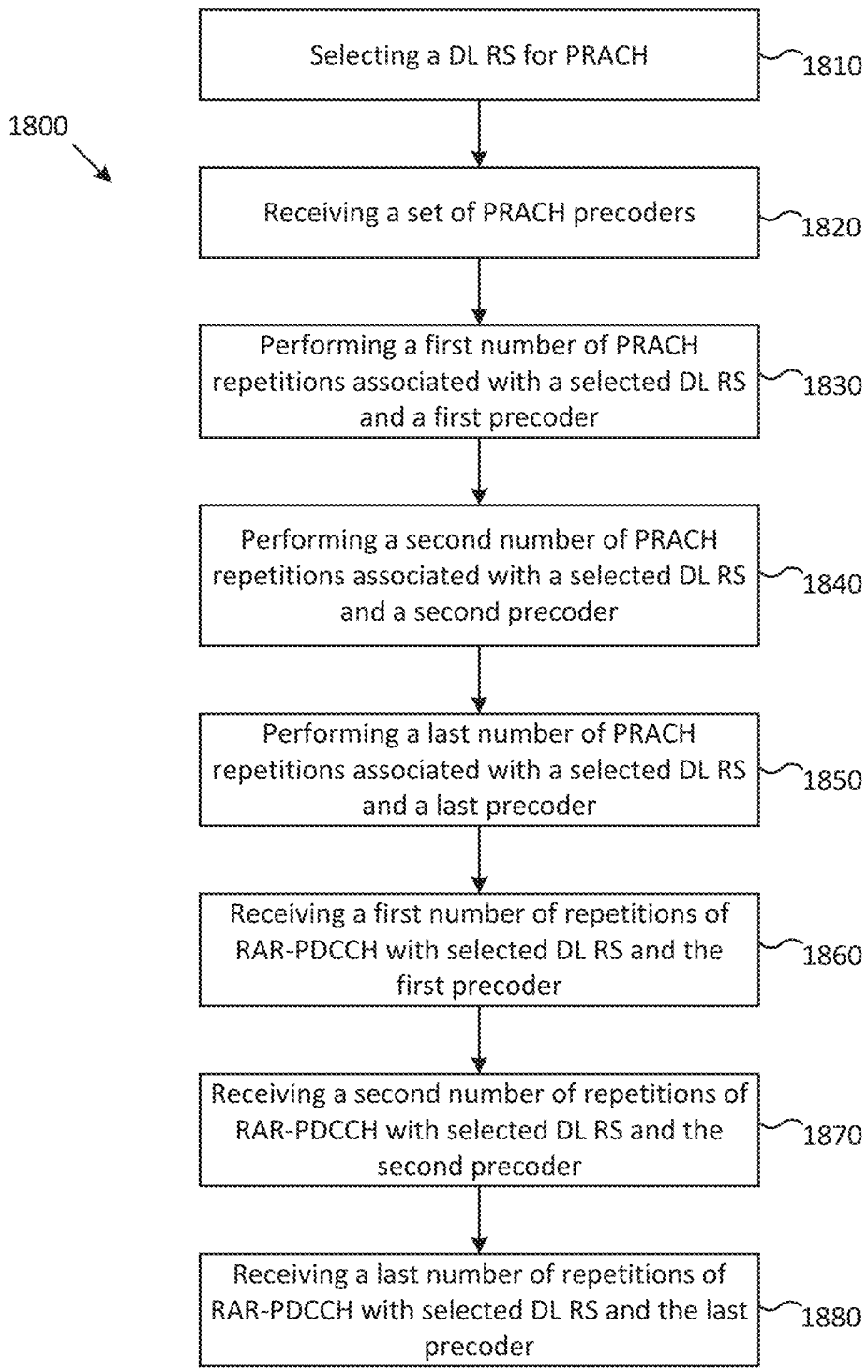
FIG. 18 illustrates a method of determining PRACH repetition groups according to various embodiments of the present disclosure.

FIG. 18 illustrates a method of determining PRACH repetition groups according to various embodiments of the present disclosure. More particularly, FIG. 6 illustrates a method of determining PRACH repetition groups by a UE based on multiple PRACH precoders and a use of those precoders by the UE to receive a PDCCH that schedules a RAR (RAR-PDCCH). Although described herein as being implemented by the UE 116, the method 1800 illustrated in FIG. 18 can be implemented by one or more of the UEs 111-116 and a corresponding method can be performed by one or more of the gNBs 101-103 described in FIG. 1. Other embodiments can be used without departing from the scope of the present disclosure.

In operation 1810, a UE, such as the UE 116, selects a DL RS for determining QCL properties of a PRACH transmission. In some embodiments, the selected DL RS can be an SSB. In operation 1820, the UE 116 receives a set of precoders for PRACH transmission.

In operation 1830, the UE 116 performs a first number of repetitions for a PRACH transmission using QCL properties associated with the selected DL RS and a first precoder. In operation 1840, the UE 116 performs a second number of repetitions for PRACH associated with the selected DL RS and a second precoder. The UE 116 can perform any suitable number of repetitions for PRACH associated with the selected DL RS and precoders. In operation 1850, the UE 116 eventually performs a last number of repetitions for PRACH associated with the selected DL RS and the last precoder.

In operation 1860, for receiving a PDCCH that schedules a PDSCH for RAR (RAR-PDCCH), the UE 116 receives a first number of repetitions of RAR-PDCCH with the selected DL RS and the first precoder. In operation 1870, the UE 116 receives a second number of repetitions of RAR-PDCCH with the selected DL RS and the second precoder. The UE 116 can receive any suitable number of repetitions for RAR-PDCCH with the selected DL RS and a precoder. In operation 1880, the UE 116 eventually receives the last number of repetitions of RAR-PDCCH with the selected DL RS and a last precoder.

In some embodiments, before RRC connection for a UE, a precoder for at least one of PRACH or PDCCH can be a precoder of a cell-defining SSB (e.g., an SSB the UE uses to obtain system information). In these embodiments, a combination of the precoder and the spatial filter/beam for the cell defining beam can be a narrower beam and can reduce repetitions with respect to a wide beam of the cell defining SSB.

In some embodiments, different repetitions in different ROs can correspond to transmission of multiple preambles or transmission of the same preamble. In other embodiments, at least one of precoder selection or beam sweeping can be up to implementation.

In some embodiments, all of SSB, system information blocks (SIB1, SIB x>1), and Paging have same QCL properties using a same wide beam such as for a cell defining SSB beam/spatial filter. In another example, one or more of SSB, system information blocks (SIB1, SIB x>1), and Paging can have different QCL assumptions, for example to allow narrower beams for SIBs and Paging, and an indication for a separate QCL can be in SIB1.

In some embodiments, a spatial transmission filter/beam for PRACH is specified in the system operation, or indicated in SIB/UE-specific RRC or a spatial transmission filter/beam for Msg3 is indicated to the UE, for example in Msg2/MsgB. Such specification or indication can allow a serving gNB, such as the gNB 102, to know what beam the UE 116 uses to establish RRC connection and to assign the UE 116 with a narrow beam for following at least one of DL or UL transmissions instead of using a wide, cell, defining, beam from a SSB when the UE 116 used a narrow beam to establish RRC connection. In other embodiments, when the UE 116 used a narrow beam to establish RRC connection but the gNB 102 has no information on what narrow beam the UE 116 used for PRACH or Msg3 transmission to establish the RRC connection, the gNB 102 may not be able to select a corresponding narrow beam for the following at least one of DL or UL transmissions. As a consequence, the gNB practically has to use a wide beam, such as a beam of the cell-defining SSB, to communicate with the UE and this may result to the UE being out of coverage when the UE used a narrow beam to establish RRC connection. Subsequently, if possible, the UE may have to perform link/beam failure recovery (BFR).

In some embodiments, a PRACH transmission initiated by PDCCH-order can be associated with CSI-RS. For example, a contention based PRACH transmission, such as for SR or UL synchronization, can be associated with a CSI-RS.

Various embodiments of the present disclosure provide repetition of 2-step RACH for a NR light UE. Repetition of 2-step RACH for a NR-Light UE can be used to enhance transmissions of PRACH preambles for NR-Light UEs. For example, different PRACH operation types, such as so-called 2-step RACH (Type-1 L1 random access procedure) and 4-step RACH (Type-2 L1 random access procedure), can be used depending on at least one of a UE operating CE level, RSRP range, a UE power class, or whether or not a PRACH transmission is with repetitions. As described herein, repetition of 2-step RACH can enhance the transmission of a PRACH preamble for NR-Light UEs according to various embodiments of the present disclosure.

In some embodiments, one PRACH type is used per CE level/UE power class. A selection of the PRACH type for each CE level/RSRP range, UE power class can be either specified in system operations or configured by higher layers such as by a SIB or UE-specific RRC signaling or by L1 signaling. The UE power class can be common or UE-specific. For UEs that do not transmit PRACH with repetitions, a SIB/RRC/PDCCH-order can indicate one of a 2-step RACH or 4-step RACH procedure. For UEs that transmit PRACH with repetitions, a 4-step RACH procedure can be the default procedure. For example. a 2-step RACH procedure can result in worse performance, such as a required time for completion, for UEs that have poor coverage.

In other embodiments, such as for PRACH transmission before RRC connection, groups of UEs can be configured with different RACH modes. For example, an SIB, such as a SIB1, can indicate whether 4-step RACH or 2-step RACH can apply for a first RSRP range, such as one not associated with repetitions of a PRACH transmission, while a 4-step RACH can be the default procedure for other RSRP ranges and no indication is provided by the SIB. An SIB for UEs with a first set of capabilities, such as UE power class or number of antennas, can indicate whether the UEs should use a 4-step RACH or a 2-step RACH for establishing RRC connection with a gNB, such as the gNB 102, while a 4-step RACH procedure can be the default procedure for UEs with a second set of capabilities, such as reduced capabilities relative to the first set of capabilities. In one example, an indication of PRACH procedure type (2-step or 4-step) can be implicit, at least in some case, such as when 2-step RACH and 4-step RACH correspond to separate PRACH preambles and when a PRACH preamble is explicitly provided by higher layer signalling for SI request or CFRA or BFR, or provided by PDCCH for PDCCH-ordered PRACH. In one example, a UE that transmits PRACH with repetitions, performs all repetitions of a PRACH transmission attempt using a same RACH type (either 2-step or 4-step) as selected for the first repetition of that PRACH transmission attempt.

Figure 19:
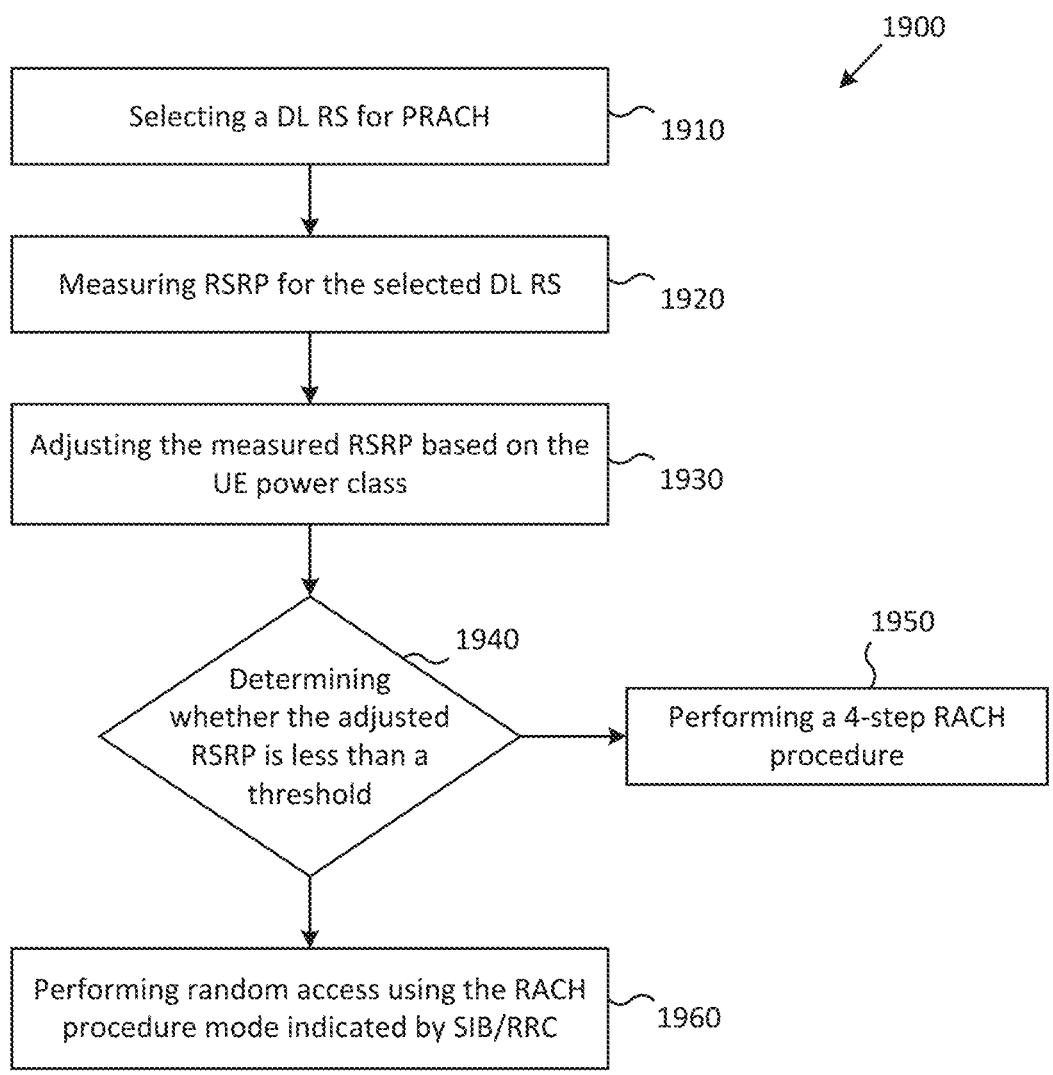
FIG. 19 illustrates a method of determining a PRACH mode for a UE according to various embodiments of the present disclosure.

FIG. 19 illustrates a method of determining a PRACH mode for a UE according to various embodiments of the present disclosure. More particularly, FIG. 19 illustrates a method of determining a PRACH mode, such as 2-step RACH versus 4-step RACH, for an NR-light UE according to various embodiments of the present disclosure. Although described herein as being implemented by the UE 116, the method 1900 illustrated in FIG. 19 can be implemented by one or more of the UEs 111-116 and a corresponding method can be performed by one or more of the gNBs 101-103 described in FIG. 1. Other embodiments can be used without departing from the scope of the present disclosure.

In operation 1910, a UE, such as the UE 116, selects a DL RS resource for association with a PRACH transmission. For example, the DL RS resource can be an SSB or a CSI-RS. In operation 1920, the UE 116 measures a RSRP for the selected DL RS. In operation 1930, the UE 116 adjusts the measured RSRP based on the power class of the UE 116.

In operation 1940, the UE 116 compares the adjusted RSRP with a threshold. Based on the comparison, the UE 116 determines whether the adjusted RSRP exceeds the threshold. When the adjusted RSRP does not exceed the threshold, the UE 116 proceeds to operation 1950. When the adjusted RSRP exceeds the threshold, the UE 116 proceeds to operation 1960.

In operation 1950, based on the UE 116 determining the adjusted RSRP does not exceed the threshold in operation 1940, the UE 116 performs random access using a 4-step RACH procedure. In operation 1960, based on the UE 116 determining the adjusted RSRP exceeds the threshold in operation 1940, the UE 116 performs random access using the RACH procedure mode as indicated by SIB/RRC. For example, the SIB/RRC can indicate a 2-step RACH procedure or a 4-step RACH procedure.

In some embodiments, a 2-step RACH procedure (Type-2 L1 random access procedure) can be supported for the UE 116 that transmits a PRACH with repetitions. These embodiments consider various examples of repetitions of a PRACH preamble and PUSCH in MsgA.

In one example of 2-step RACH procedures that are supported for transmission of a PRACH with repetitions, the UE 116 completes all repetitions of PRACH preamble transmission in MsgA before the UE 116 starts repetitions of PUSCH transmission in MsgA. A number of repetitions for a PRACH preamble transmission and a number of repetitions for PUSCH transmission in MsgA can be provided by a same configuration or by separate configurations from higher layers. When the two numbers are provided by the same configuration, the two numbers can be the same or the number of repetitions for the PUSCH transmission can be derived from the configured number using a rule, such as depending on a TB size in the PUSCH (e.g., PRACH preamble groups) or by scaling the configured number by a predetermined value.

Figure 20:
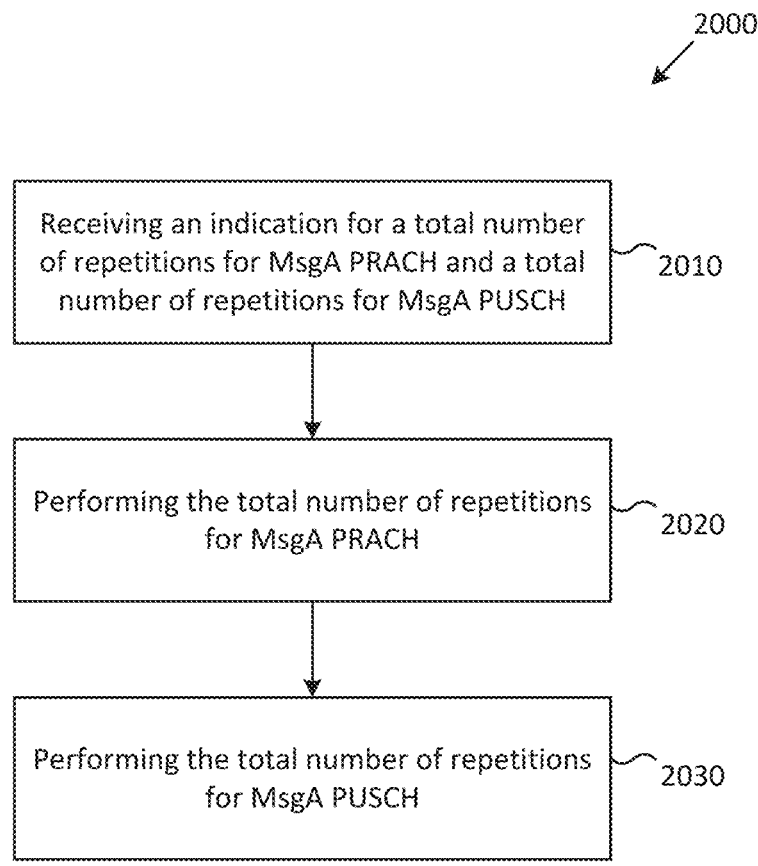
FIG. 20 illustrates a method of performing repetition for a 2-step RACH operation according to various embodiments of the present disclosure.

FIG. 20 illustrates a method for performing repetition for a 2-step RACH operation according to various embodiments of the present disclosure. Although described herein as being implemented by the UE 116, the method 2000 illustrated in FIG. 20 can be implemented by one or more of the UEs 111-116 and a corresponding method can be performed by one or more of the gNBs 101-103 described in FIG. 1. Other embodiments can be used without departing from the scope of the present disclosure.

In operation 2010, a UE, such as the UE 116, receives an indication and/or configuration for a total number of repetitions for MsgA PRACH and a total number of repetitions for MsgA PUSCH. In operations 2020 and 2030, the UE 116 performs the repetitions.

More particularly, in operation 2020, the UE 116 performs the total number of repetitions for MsgA PRACH. Then, in operation 2030, the UE 116 performs the total number of repetitions for MsgA PUSCH.

In another example of 2-step RACH procedures that are supported for transmission of a PRACH with repetitions, the UE 116 performs, in an alternating manner, a first number of repetitions of a PRACH preamble transmission in MsgA and a second number of repetitions of PUSCH transmission in MsgA until a total number of repetitions for both PRACH and PUSCH are completed. The first and second numbers can be configured or derived from the total number of repetitions. For example, the first and second numbers can be configured or derived by splitting, or dividing, the total number of repetitions by a factor that is specified or configured by higher layers. As described in various embodiments herein, a number of repetitions for PRACH preamble transmission and a number of repetitions for PUSCH in MsgA can be provided by a same configuration or by separate configurations.

Figure 21:
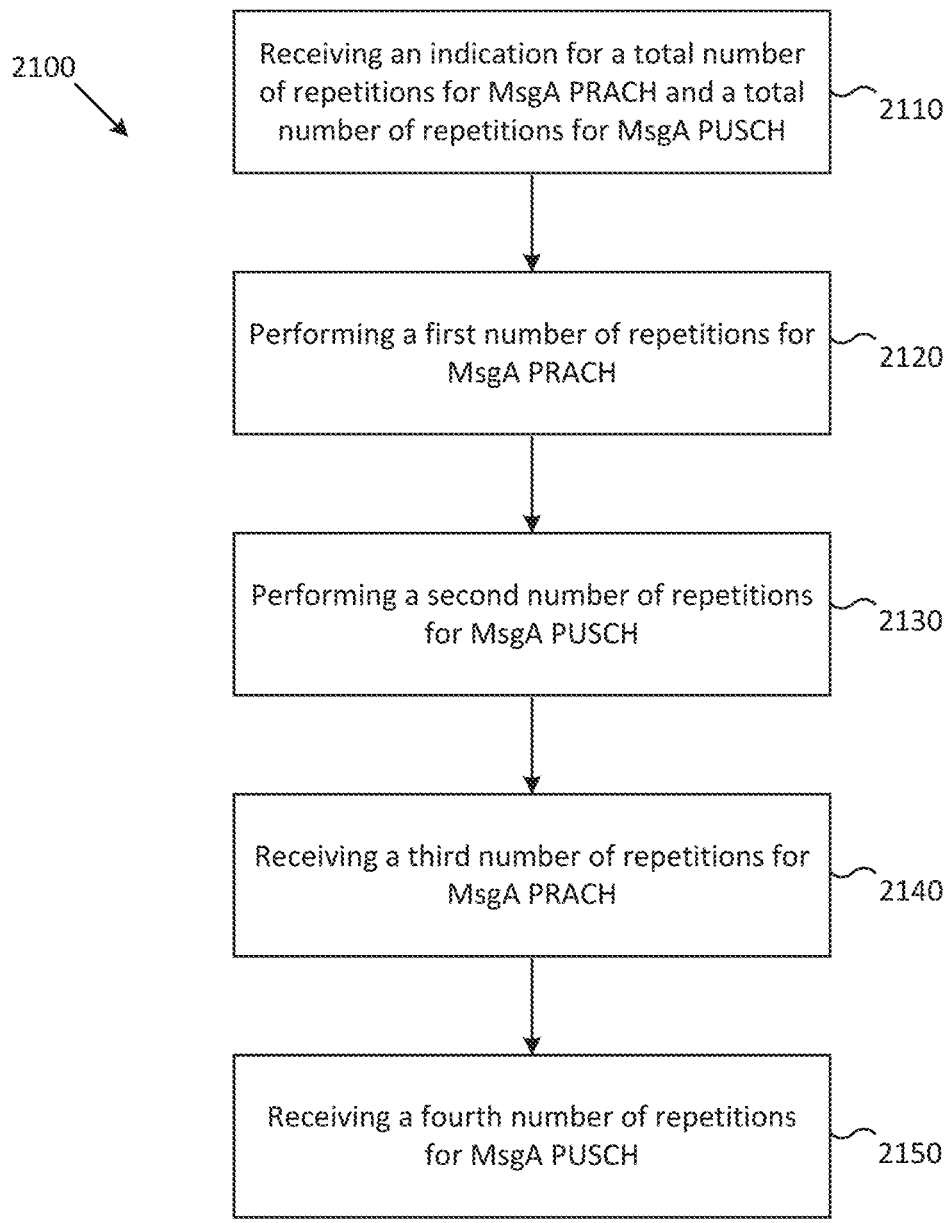
FIG. 21 illustrates a method of performing repetition for a 2-step RACH operation according to various embodiments of the present disclosure.

FIG. 21 illustrates a method for performing repetition for a 2-step RACH operation according to various embodiments of the present disclosure. Although described herein as being implemented by the UE 116, the method 2100 illustrated in FIG. 21 can be implemented by one or more of the UEs 111-116 and a corresponding method can be performed by one or more of the gNBs 101-103 described in FIG. 1. Other embodiments can be used without departing from the scope of the present disclosure.

In operation 2110, a UE, such as the UE 116, receives an indication or configuration for a total number of repetitions for MsgA PRACH and a total number of repetitions for MsgA PUSCH. In operations 2120-2150, the UE 116 performs the repetitions.

More particularly, in operation 2120, the UE 116 performs a first number of repetitions for MsgA PRACH. In operation 2130, the UE 116 performs a second number of repetitions for MsgA PUSCH. In operation 2140, the UE 116 performs a third number of repetitions for MsgA PRACH. In operation 2150, the UE 116 performs a fourth number of repetitions for MsgA PUSCH.

In some embodiments, the selected approach for repetitions of a PRACH/PUSCH for a 2-step random access procedure can depend on a mapping among preambles in RACH Occasions (ROs) and the PUSCH Occasion or PUSCH resource unit. For example, the mapping can be one-to-one, multiple-to-one, one-to-multiple. A configurable number, including one or multiple, of PRACH preambles/ROs for MsgA are mapped to one or multiple PUSCH resource units or PUSCH occasions. In another example, the time/frequency allocation of repetitions for MsgA PRACH transmission and MsgA PUSCH transmission within the configured ROs and/or PUSCH occasion (POs) in a 2-step RACH procedure can be the same as repetitions of a PRACH transmission with a 4-step RACH procedure. In yet another example, a MsgA PUSCH configuration period can also include a number of repetitions for a MsgA PUSCH transmission. For example, a number of repetitions for a MsgA PUSCH can be jointly coded/configured and indicated with a time domain resource allocation (TDRA) for the MsgA PUSCH. In various embodiments, particularly for the case of TDD operation when PRACH occasions or PUSCH occasions may become invalid due to TDD UL/DL configuration and extend a completion time for 2-step RACH, a UE can transmit PRACH repetitions or PUSCH repetitions as soon as the UE identifies a valid RO or PO, respectively, without any predefined order between PRACH repetitions and PUSCH repetitions. In one example, the UE can be configured by higher layer parameters (e.g., dedicated or broadcast/SIB) with multiple Msg-A PUSCH configurations (associated with different PRACH preamble groups, different RO partitions, different DMRS ports/sequences, etc.) per CE level/RSRP range (which can, in turn, depend on the UE power class, via e.g., a modified/adjusted RSRP based on the UE power class), where in one option, each Msg-A PUSCH configuration provides a separate (same or different) configuration of a number of repetitions for MsgA PUSCH, while in another option, a number of repetitions for MsgA PUSCH can be a common higher layer parameter for all of the multiple Msg-A PUSCH configurations.

In another example, the time-domain granularity of Msg-A PUSCH repetition can depend on PUSCH mapping type (e.g., A or B). For example, when Msg-A PUSCH mapping is of Type-A, then the time-domain granularity of Msg-A PUSCH repetitions are slot based, so that a second repetition of a Msg-A PUSCH occurs in same symbols of a second slot as those of a first slot for a first repetition, where the first slot and the second slot are distinct. In another example, when Msg-A PUSCH mapping is of Type-B (a.k.a., "mini-slot"), then the time-domain granularity of Msg-A PUSCH repetitions are "mini-slot" based, e.g., based on the length of Msg-A PUSCH as indicated by the SLIV field (e.g., per higher layer configuration/indication or per default specified Tables) possibly plus some guard time. In the latter case, a second repetition of a Msg-A PUSCH can occur in non-overlapping symbols of a same slot as for the first repetition, or a second repetition of a Msg-A PUSCH can occur in different symbols of a different slot as for the first repetition.

To help with congestion control during random access by a large number of UEs, embodiments of the present disclosure recognize a benefit to move UEs to different BWPs to avoid overloading of a single BWP. In one example, when a Msg-B includes a unicast response to a Msg-A transmission from a UE, e.g., when a Msg-B PDCCH is addressed to a UE-specific RNTI such as a C-RNTI, the Msg-B PDCCH can contain a DL BWP indicator to indicate a DL BWP in which the UE can receive a Msg-B PDSCH. In another example, when a Msg-B multiplexes responses to multiple Msg-A transmissions from multiple UEs, e.g., when a Msg-B PDCCH is addressed to a common RNTI such as a msgB-RNTI, the Msg-B PDCCH can contain a DL BWP indicator to indicate a DL BWP in which the UEs can receive a Msg-B PDSCH. In a further example, when the multiplexed response includes one or multiple fallbackRAR(s)—to indicate successful reception of Msg-A PRACH preamble but not Msg-A PUSCH payload—then, the/each fallbackRAR(s) can include an UL BWP indicator in the corresponding RAR UL grant contained in the/each fallbackRAR(s), in which case, the UL BWP in the fallbackRAR indicates the UL BWP (same or different from the UL BWP used for MsgA transmission) in which the UE needs to transmit a Msg3 PUSCH.

Various embodiments of the present disclosure provide rules, or guidelines, for PRACH dropping when colliding with other UL transmissions. Rules or guidelines for PRACH dropping when colliding with other UL transmissions can be used to enhance transmissions of PRACH preambles for NR-Light UEs. As described herein, rules, or guidelines, for PRACH dropping when colliding with other UL transmissions can enhance the transmission of a PRACH preamble for NR-Light UEs according to various embodiments of the present disclosure.

In some embodiments, for single cell operation or for operation with carrier aggregation in a same frequency band, when the UE 116 is requested by higher layers or by a PDCCH order to transmit a PRACH preamble, and the UE 116 has received a configuration or indication for a PUSCH/PUCCH/SRS transmission in the same slot or with a short gap such as less than N symbols from the PRACH transmission, then the UE 116 can determine on which UL transmission to perform based on the prioritization rule for power allocation. If the PRACH, including for BFR, transmission is on the PCell, the UE 116 prioritizes the PRACH transmission; otherwise, the UE prioritizes the PUSCH/PUCCH/SRS transmission.

For example, the UE 116 can determine an UL transmission to perform based on the UE implementation. In another example, the UE performs an UL transmission that starts first or ends first or whose length is smaller/larger and the UE drops the other UL transmission. In a further example, the UE performs UL transmission associated with a lowest or highest subcarriers spacing, or numerology or highest priority and drops the other UL transmissions. In another example, the UE 116 can be scheduled to transmit data in resource blocks reserved for random access channel preamble transmission. These embodiments can apply to a legacy UE such as a UE configured with at least one of CA operation or SUL operation.

Figure 22:
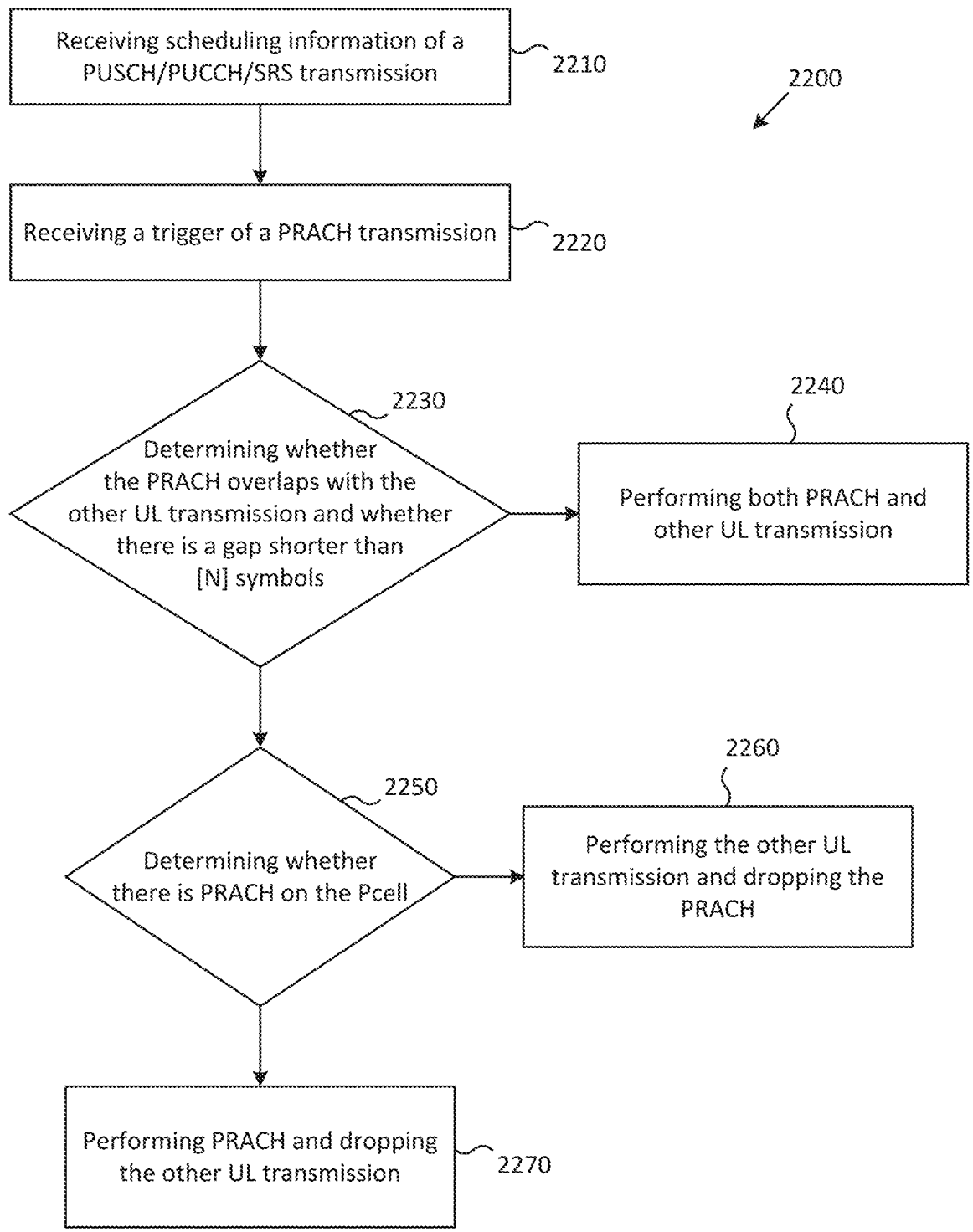
FIG. 22 illustrates a method of dropping rules, or guidelines, when a PRACH overlaps with another UL transmission according to various embodiments of the present disclosure.

FIG. 22 illustrates a method of dropping rules, or guidelines, when a PRACH overlaps with another UL transmission according to various embodiments of the present disclosure. Although described herein as being implemented by the UE 116, the method 2200 illustrated in FIG. 22 can be implemented by one or more of the UEs 111-116 and a corresponding method can be performed by one or more of the gNBs 101-103 described in FIG. 1. Other embodiments can be used without departing from the scope of the present disclosure.

In operation 2210, a UE, such as the UE 116, receives scheduling information for a PUSCH/PUCCH/SRS transmission. In operation 2220, the UE 116 receives a trigger of a PRACH transmission. Although described herein as being performed in sequence, operations 2210 and 2220 can be performed in any order or performed simultaneously.

In operation 2230, the UE 116 determines whether the PRACH overlaps with the other UL transmission and whether the gap between the transmissions is less than [N] symbols. If either the PRACH transmission does not overlap with the other UL transmission or the gap between the transmissions is not less than [N] symbols, the UE 116 proceeds to operation 2240. If the PRACH transmission overlaps with the other UL transmission and the gap between the transmissions is less than [N] symbols, the UE 116 proceeds to operation 2250.

In operation 2240, based on the UE 116 determining either the PRACH transmission does not overlap with the other UL transmission or the gap between the transmissions is not less than [N] symbols, the UE 116 performs both PRACH and the other UL transmission. In operation 2250, based on the UE 116 determining the PRACH transmission overlaps with the other UL transmission and the gap between the transmissions is less than [N] symbols, the UE 116 determines whether the PRACH transmission is on the PCell. If the PRACH transmission is not on the PCell, the UE 116 proceeds to operation 2260. If the PRACH transmission is on the PCell, the UE 116 proceeds to operation 2270.

In operation 2260, based on the UE 116 determining the PRACH transmission is not on the PCell, the UE 116 drops the PRACH and performs transmission of the other UL transmission. In operation 2270, based on the UE 116 determining the PRACH transmission is on the PCell, the UE 116 performs the PRACH and drops the other UL transmission. Various embodiments provide for cross-cell/BWP random access for PDCCH-ordered PRACH. In one embodiment, a DCI format triggering PDCCH-ordered PRACH includes indication(s) for one or both of a cross-cell random access and cross-BWP random access. In one example, a new field including n bits from the (e.g., 10) reserved bits in a DCI format 1_0 that triggers a PDCCH-ordered PRACH, as validated by a frequency domain resource allocation (FDRA) field set to all is and using a C-RNTI, is introduced and used as an UL BWP indicator to indicate an UL BWP in which the UE transmits the PDCCH-ordered PRACH. In another example, if an active DL BWP index (of the SpCell) is not equal to an active UL BWP index (of the serving cell), the UE switches the active DL BWP to one with a same BWP index as the UL BWP index. In yet another example, an additional field including n bits from the (e.g., 10) reserved bits in a DCI format 1_0 that triggers a PDCCH-ordered PRACH is introduced and used as a DL BWP indicator to indicate a DL BWP (of the SpCell) in which the UE receives a random access response for the PDCCH-ordered PRACH. In some examples, n can be equal to 0, 1 or 2 bits as determined by the number of UL/DL BWPs $n_{BWP,RRC}$ configured by higher layers, that can exclude the initial UL/DL bandwidth part. The bit-width for this field is determined as $\lceil \log_2 (n_{BWP}) \rceil$ bits, where:

$n_{BWP}=n_{BWP,RRC}+1$ if $n_{BWP,RRC} \leq 3$, in which case the bandwidth part indicator is equivalent to the ascending order of the higher layer parameter BWP-Id;

otherwise $n_{BWP}=n_{BWP,RRC}$, in which case the bandwidth part indicator is defined in TS 38.212 Table 7.3.1.1.2-1 provided below.

TABLE 6

Bandwidth part indicator (TS 38.212 Table 7.3.1.1.2-1)

| Value of BWP indicator field 2 bits | Bandwidth part |
|---|---|
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

If a UE does not support active BWP change via DCI, the UE may ignore this bit field. In one example, 3 of the 10 reserved bits in a DCI format 1_0 that is used for PDCCH-ordered PRACH, as validated by a FDRA field set to all is and using a C-RNTI, is used as a CIF to indicate an index for a "scheduled" cell index (for example, per higher layer configuration in CrossCarrierSchedulingConfig) in which the UE transmits PDCCH-ordered PRCAH.

Various embodiments provide a BWP indication for non-PDCCH-ordered PRACH. In one embodiment, a UE transmits a non-PDCCH-ordered PRACH in an UL BWP, different from the Initial UL BWP, as indicated by higher layers.

A configuration information for a (second/secondary/alternative) UL BWP, different from the Initial UL BWP, can be predetermined in system specification or can be explicitly or implicitly indicated by the network/higher layers for example using one or more of: MIB, SIB1, UE-common RRC configuration, and UE-specific RRC configuration. For example, the configuration information for the (second/secondary/alternative) UL BWP can be relative to the configuration of the initial UL BWP, such as a frequency gap or a relative size (in number of PRB s in a reference numerology) compared to the Initial UL BWP.

In one example, at least for a UE that is not in RRC_CONNECTED state or for a UE before receiving dedicated RRC configuration, system information, such as SIB1, can provide an indication for an UL BWP, different from the initial UL BWP, in which the UE transmits PRACH. In another example, for a UE in RRC_CONNECTED state, a UE-specific RRC configuration can provide the indication for an UL BWP, different from the initial UL BWP, for the UE to transmit a PRACH. In one example, a UE-specific higher layer configuration for CF-RA and/or BFR can include an indication for the UL BWP, different from the initial UL BWP, for the UE to transmit a PRACH.

In one example, the UE is provided an explicit or implicit indication of an UL BWP, different from the initial UL BWP, to transmit a PRACH. For example, the UE is provided a mapping between UE category/type and an UL BWP for PRACH transmission; for example, a first UE category/type such as a legacy NR Rel-15/16 UE transmits PRACH in a first BWP such as an Initial BWP, while a second UE category/type such as a predetermined non-legacy UE category/type transmits PRACH in a second BWP. In another example, the UE is provided by MIB/SIB1/RRC a measurement threshold, such as an L1 RSRP threshold for an SSB or CSI-RS associated with the PRACH, so that a first UE whose L1 SSB/CSI-RS RSRP measurements exceeds the threshold, transmits on a first UL BWP, while a second UE whose L1 SSB/CSI-RS RSRP measurements does not exceed the threshold, transmits on a second UL BWP.

The above methods can be useful for congestion control for non-legacy UEs, such as large number of UEs with reduced capabilities. In addition, these methods are beneficial to coverage recovery/enhancements for RAR, since RAR for UEs in different BWPs can be multiplexed separately.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a physical random access channel (PRACH), the method comprising:
   receiving first information for:
      a set of numbers of repetitions for PRACH transmissions,
      a set of downlink reference signals (DL RSs),
      a set of reference signal received power (RSRP) ranges, and
      a first mapping between the set of RSRP ranges and the set of numbers of repetitions; and determining:
a first DL RS and a second DL RS from the set of DL RSs,
a first RSRP for the first DL RS and a second RSRP for the second DL RS,
a first RSRP range that includes the first RSRP and a second RSRP range that includes the second RSRP, the first and second RSRP ranges being from the set of RSRP ranges,
a first number of repetitions and a second number of repetitions from the set of numbers of repetitions based on the first mapping and, respectively, on the first RSRP range and the second RSRP range, and
a first spatial setting based on the first DL RS and a second spatial setting based on the second DL RS; and
transmitting a first PRACH with the first number of repetitions using the first spatial setting and with the second number of repetitions using the second spatial setting.

2. The method of claim 1, wherein the set of DL RSs include one of:
synchronization signal and physical broadcast channel (SS/PBCH) blocks, or
non-zero-power channel state information reference signals (CSI-RSs).

3. The method of claim 1, further comprising:
receiving second information for:
a first set of random access channel occasions (ROs),
a second mapping among the first set of ROs and a second set of ROs, and
a third mapping among first set of ROs and the set of DL RSs;
determining:
a first RO from the first set of ROs that is mapped to the first DL RS based on the third mapping, and
a second RO from the second set of ROs that is mapped to the first RO based on the second mapping; and
wherein transmitting the first PRACH further comprises transmitting:
a first repetition of the first PRACH in the first RO, and
a second repetition of the first PRACH in the second RO.

4. The method of claim 1, further comprising:
receiving:
a first physical downlink control channel (PDCCH) with same quasi-collocation (QCL) properties as the first DL RS or a second PDCCH with same QCL properties as the second DL RS, wherein the first PDCCH schedules a reception of a first PDSCH or the second PDCCH schedules a reception of a second PDSCH; and
the first PDSCH with same QCL properties as the first DL RS or the second PDSCH with same QCL properties as the second DL RS, wherein the first PDSCH includes a first random access response (RAR) or the second PDSCH includes a second RAR.

5. The method of claim 4, further comprising:
determining a spatial setting for transmission of a physical uplink shared channel (PUSCH) based on:
the first DL RS when the PUSCH transmission is scheduled by information provided by the first RAR, or
the second DL RS when the PUSCH transmission is scheduled by information provided by the second RAR; and
transmitting the PUSCH using the spatial setting.

6. The method of claim 4, further comprising:
receiving a third PDCCH and a third PDSCH, wherein:
the third PDCCH schedules the reception of the third PDSCH,
the third PDSCH provides system information or a paging message, and
the third PDCCH or the third PDSCH reception is with same QCL properties as (i) the first PDCCH or the first PDSCH, respectively, or (ii) the second PDCCH or the second PDSCH, respectively.

7. The method of claim 1, further comprising:
receiving a physical downlink control channel (PDCCH) providing a downlink control information (DCI) format that:
triggers transmission of a second PRACH, and
indicates:
a third number of repetitions for the second PRACH transmission, and
a first random access channel occasion (RO) for a first repetition of the second PRACH transmission.

8. A user equipment (UE) comprising:
a transceiver configured to receive first information for:
a set of numbers of repetitions for physical random access channel (PRACH) transmissions,
a set of downlink reference signals (DL RSs),
a set of reference signal received power (RSRP) ranges, and
a first mapping between the set of RSRP ranges and the set of numbers of repetitions; and
a processor operably coupled to the transceiver, the processor configured to determine:
a first DL RS and a second DL RS from the set of DL RSs,
a first RSRP for the first DL RS and a second RSRP for the second DL RS,
a first RSRP range that includes the first RSRP and a second RSRP range that includes the second RSRP, the first and second RSRP ranges being from the set of RSRP ranges,
a first number of repetitions and a second number of repetitions from the set of numbers of repetitions based on the first mapping and, respectively, on the first RSRP range and the second RSRP range, and
a first spatial setting based on the first DL RS and a second spatial setting based on the second DL RS;
wherein the transceiver is further configured to transmit a first PRACH with the first number of repetitions using the first spatial setting and with the second number of repetitions using the second spatial setting.

9. The UE of claim 8, wherein the set of DL RSs include one of:
synchronization signal and physical broadcast channel (SS/PBCH) blocks, or
non-zero-power channel state information reference signals (CSI-RSs).

10. The UE of claim 8, wherein:
the transceiver is further configured to receive second information for:
a first set of random access channel occasions (ROs),
a second mapping among the first set of ROs and a second set of ROs, and a third mapping among first set of ROs and the set of DL RSs;
the processor is further configured to determine:
a first RO from the first set of ROs that is mapped to the first DL RS based on the third mapping, and
a second RO from the second set of ROs that is mapped to the first RO based on the second mapping; and
the transceiver is further configured to transmit:
a first repetition of the first PRACH transmission in the first RO, and
a second repetition of the first PRACH transmission in the second RO.

11. The UE of claim 8, wherein:
the transceiver is further configured to receive:
a first physical downlink control channel (PDCCH) with same quasi-collocation (QCL) properties as the first DL RS or a second PDCCH with same QCL properties as the second DL RS, wherein the first PDCCH schedules a reception of a first PDSCH or the second PDCCH schedules a reception of a second PDSCH; and
the first PDSCH with same QCL properties as the first DL RS or the second PDSCH with same QCL properties as the second DL RS, wherein the first PDSCH includes a first random access response (RAR) or the second PDSCH includes a second RAR.

12. The UE of claim 11, wherein:
the processor is further configured to determine a spatial setting for transmission of a physical uplink shared channel (PUSCH) based on:
the first DL RS when the PUSCH transmission is scheduled by information provided by the first RAR, or
the second DL RS when the PUSCH transmission is scheduled by information provided by the second RAR; and
the transceiver is further configured to transmit the PUSCH using the spatial setting.

13. The UE of claim 11, wherein:
the transceiver is further configured to receive a third PDCCH and a third PDSCH,
the third PDCCH schedules the reception of the third PDSCH,
the third PDSCH provides system information or a paging message, and
the third PDCCH or the third PDSCH reception is with same QCL properties as (i) the first PDCCH or the first PDSCH, respectively, or (ii) the second PDCCH or the second PDSCH, respectively.

14. The UE of claim 8, wherein:
the transceiver is further configured to receive a physical downlink control channel (PDCCH) providing a downlink control information (DCI) format that:
triggers transmission of a second PRACH, and
indicates:
a third number of repetitions for the second PRACH transmission, and
a first random access channel occasion (RO) for a first repetition of the second PRACH transmission.

15. A base station comprising:
a transceiver configured to:
transmit first information for:
a set of numbers of repetitions for physical random access channel (PRACH) transmissions,
a set of downlink reference signals (DL RSs),
a set of reference signal received power (RSRP) ranges, and
a first mapping between the set of RSRP ranges and the set of numbers of repetitions; and
receive a first PRACH with a first number of repetitions using a first spatial setting and with a second number of repetitions using a second spatial setting, wherein:
the first number of repetitions and the second number of repetitions are from the set of numbers of repetitions,
the first spatial setting is based on a first DL RS and the second spatial setting is based on a second DL RS, and
the first DL RS and the second DL RS are from the set of DL RSs.

16. The base station of claim 15, wherein the set of DL RSs include one of:
synchronization signal and physical broadcast channel (SS/PBCH) blocks, or
non-zero-power channel state information reference signals (CSI-RSs).

17. The base station of claim 15, wherein:
the transceiver is further configured to:
transmit second information for:
a first set of random access channel occasions (ROs),
a second mapping among the first set of ROs and a second set of ROs, and
a third mapping among first set of ROs and the set of DL RSs; and
receive:
a first repetition of the first PRACH reception in a first RO, and
a second repetition of the first PRACH reception in a second RO, wherein:
the first RO is from the first set of ROs and is mapped to the first DL RS based on the third mapping, and
the second RO is from the second set of ROs and is mapped to the first RO based on the second mapping.

18. The base station of claim 15, wherein:
the transceiver is further configured to transmit:
a first physical downlink control channel (PDCCH) with same quasi-collocation (QCL) properties as the first DL RS or a second PDCCH with same QCL properties as the second DL RS, wherein the first PDCCH schedules a transmission of a first PDSCH or the second PDCCH schedules a transmission of a second PDSCH; and
the first PDSCH with same QCL properties as the first DL RS or the second PDSCH with same QCL properties as the second DL RS, wherein the first PDSCH includes a first random access response (RAR) or the second PDSCH includes a second RAR.

19. The base station of claim 18, wherein:
the transceiver is further configured to transmit a third PDCCH and a third PDSCH,
the third PDCCH schedules the transmission of the third PDSCH,
the third PDSCH provides system information or a paging message, and
the third PDCCH or the third PDSCH transmission is with same QCL properties as (i) the first PDCCH or the first PDSCH, respectively, or (ii) the second PDCCH or the second PDSCH, respectively.

20. The base station of claim 15, wherein:
the transceiver is further configured to transmit a physical downlink control channel (PDCCH) providing a downlink control information (DCI) format that:
triggers a second PRACH reception, and
indicates:
a third number of repetitions for the second PRACH reception, and
a first random access channel occasion (RO) for a first repetition of the second PRACH reception.

* * * * *